US012778236B2

(12) United States Patent
Corbeil et al.

(10) Patent No.: US 12,778,236 B2
(45) Date of Patent: Nov. 3, 2026

(54) SKATES AND OTHER FOOTWEAR COMPRISING ADDITIVELY-MANUFACTURED COMPONENTS

(71) Applicant: BAUER HOCKEY LLC, Exeter, NH (US)

(72) Inventors: Jean-Francois Corbeil, Prevost (CA); Thierry Krick, Coteau-du-Lac (CA); Alexis Seguin, Laval (CA); Raymond Boissonneault, St-Hippolyte (CA)

(73) Assignee: BAUER HOCKEY LLC, Exeter, NH (US)

( * ) Notice: Subject to any disclaimer, the term of this patent is extended or adjusted under 35 U.S.C. 154(b) by 574 days.

(21) Appl. No.: 17/766,384

(22) PCT Filed: May 21, 2020

(86) PCT No.: PCT/CA2020/050684

§ 371 (c)(1),
(2) Date: Apr. 4, 2022

(87) PCT Pub. No.: WO2021/062519

PCT Pub. Date: Apr. 8, 2021

(65) Prior Publication Data

US 2023/0337781 A1 Oct. 26, 2023

Related U.S. Application Data

(60) Provisional application No. 62/910,002, filed on Oct. 3, 2019.

(51) Int. Cl.
*A43B 5/16* (2006.01)
*A63C 1/02* (2006.01)
(Continued)

(52) U.S. Cl.
CPC .................. *A43B 5/16* (2013.01); *A63C 1/02* (2013.01); *A63C 1/42* (2013.01); *B33Y 80/00* (2014.12)

(58) Field of Classification Search
CPC ........... A43B 5/16; A43B 5/1625; A63C 1/02; A63C 1/30; A63C 1/32; A63C 1/40; A63C 1/42; A63C 1/303; B33Y 80/00
See application file for complete search history.

(56) References Cited

U.S. PATENT DOCUMENTS 3,276,784 A 10/1966 Anderson
4,042,238 A 8/1977 Theriault
(Continued)

FOREIGN PATENT DOCUMENTS

CA 2294301 1/2000
CA 2145520 C * 3/2006 ............... A63C 1/30
(Continued)

OTHER PUBLICATIONS

Communication pursuant to Article 94(3) EPC issued on Jul. 3, 2024 in connection with European Patent Application No. 20810281.4, 8 pages.

(Continued)

*Primary Examiner* — Steve Clemmons

(57) ABSTRACT

A skate or other footwear comprising one or more additively-manufactured components designed to enhance performance and use of the skate or other footwear, such as fit and comfort, power transfer (e.g., to a skating surface during skating strides), and/or other aspects of the skate or other footwear.

33 Claims, 47 Drawing Sheets

(51) Int. Cl.
*A63C 1/42* (2006.01)
*B33Y 80/00* (2015.01)

(56) References Cited

U.S. PATENT DOCUMENTS 4,124,208 A 11/1978 Burns
4,134,155 A 1/1979 Robertson
4,324,400 A 4/1982 Tse
5,217,221 A 6/1993 Baum
5,333,857 A 8/1994 Lallemand
5,524,641 A 6/1996 Battaglia
5,544,367 A 8/1996 March, II
5,593,158 A 1/1997 Filice
5,613,916 A 3/1997 Sommer
5,661,854 A 9/1997 March, II
5,865,696 A 2/1999 Calapp et al.
5,946,734 A 9/1999 Vogan
6,015,156 A 1/2000 Pratt
6,033,328 A 3/2000 Bellefleur et al.
6,079,056 A 6/2000 Fogelberg
6,129,962 A 10/2000 Quigley et al.
6,247,181 B1 6/2001 Hirsch et al.
6,763,611 B1 7/2004 Fusco
6,775,928 B2 * 8/2004 Grande .................. A43C 11/20 36/50.1
6,805,642 B2 10/2004 Meyer
6,918,847 B2 7/2005 Gans
7,008,338 B2 3/2006 Pearson
7,097,577 B2 8/2006 Goldsmith et al.
7,120,941 B2 10/2006 Glaser
7,178,428 B2 2/2007 Schroder
7,207,907 B2 4/2007 Guenther et al.
7,219,900 B2 * 5/2007 Meibock .............. A43B 5/0427 280/11.12
7,244,196 B2 7/2007 Kennedy et al.
7,382,959 B1 6/2008 Jacobsen
7,387,578 B2 6/2008 Palumbo et al.
7,424,967 B2 9/2008 Ervin
7,476,167 B2 1/2009 Garcia
7,510,206 B2 3/2009 Walker
7,614,969 B2 11/2009 Meyer et al.
7,625,625 B2 12/2009 Rios et al.
7,627,938 B2 12/2009 Kim
7,786,243 B2 8/2010 Wu et al.
7,824,591 B2 11/2010 Gans
7,906,191 B2 3/2011 Pratt
7,931,549 B2 4/2011 Pearson et al.
7,941,875 B1 5/2011 Doctor et al.
7,963,868 B2 6/2011 Mcgrath
7,994,269 B2 8/2011 Ricci et al.
8,007,373 B2 8/2011 Soracco et al.
8,052,551 B2 11/2011 Blotteaux et al.
8,088,461 B2 1/2012 Fujihana et al.
8,287,403 B2 10/2012 Chao et al.
8,323,130 B1 12/2012 LeVault et al.
8,387,286 B2 * 3/2013 Koyess ............. A43B 23/0255 36/88
8,449,411 B2 5/2013 LeVault et al.
8,505,222 B2 * 8/2013 Koyess .................... A43B 5/16 36/89
8,602,923 B2 12/2013 Jeanneau
8,608,597 B2 12/2013 Avnery et al.
8,623,490 B2 1/2014 Lin et al.
8,663,027 B2 3/2014 Morales et al.
8,801,550 B2 8/2014 Jeanneau et al.
8,921,702 B1 12/2014 Carter
8,998,754 B2 4/2015 Shocklee et al.
9,044,657 B2 6/2015 Jeanneau
9,056,229 B2 6/2015 Hungerbach et al.
9,086,229 B1 7/2015 Roper
9,116,428 B1 8/2015 Jacobsen
9,119,433 B2 9/2015 Leon
9,199,139 B2 12/2015 Kronenberg et al.
9,201,988 B2 12/2015 Stanhope et al.
9,283,895 B2 3/2016 Sumi et al.
9,320,316 B2 4/2016 Guyan et al.
9,320,317 B2 4/2016 Bernhard et al.
9,375,041 B2 6/2016 Plant
9,409,065 B2 8/2016 Morales et al.
9,415,269 B2 8/2016 Tomita et al.
9,452,323 B2 9/2016 Kronenberg et al.
9,468,823 B2 10/2016 Mitton et al.
9,486,679 B2 11/2016 Goldstein et al.
9,498,014 B2 11/2016 Princip et al.
9,539,487 B2 1/2017 Henry
9,566,758 B2 2/2017 Cheung et al.
9,573,024 B2 2/2017 Bender
9,586,112 B2 3/2017 Sola et al.
9,594,368 B2 3/2017 Kronenberg et al.
9,668,531 B2 6/2017 Nordstrom et al.
9,694,540 B2 7/2017 Trockel
9,737,747 B1 8/2017 Walsh et al.
9,756,894 B2 9/2017 Mcdowell et al.
9,756,899 B2 9/2017 Waatti
9,788,594 B2 10/2017 Jarvis
9,788,603 B2 10/2017 Jarvis
9,795,181 B2 10/2017 Jarvis
9,839,251 B2 12/2017 Pannikottu et al.
9,841,075 B2 12/2017 Russo
9,878,217 B2 1/2018 Morales et al.
9,889,347 B2 2/2018 Morales et al.
9,892,214 B2 2/2018 Morrow et al.
9,914,274 B2 * 3/2018 Jones .................... B29C 64/112
9,925,440 B2 3/2018 Davis et al.
10,010,133 B2 7/2018 Guyan
10,010,134 B2 7/2018 Guyan
10,016,013 B2 7/2018 Kormann et al.
10,034,519 B2 7/2018 Lussier
10,039,343 B2 8/2018 Guyan
10,052,223 B2 8/2018 Turner
10,085,508 B2 10/2018 Surabhi
10,104,934 B2 10/2018 Guyan
10,143,252 B2 12/2018 Nordstrom et al.
10,143,266 B2 12/2018 Spanks
10,155,855 B2 12/2018 Farris et al.
10,212,983 B2 2/2019 Knight
10,226,098 B2 3/2019 Guyan et al.
10,226,103 B2 * 3/2019 Mark ..................... B33Y 80/00
10,231,510 B2 3/2019 Wawrousek et al.
10,231,511 B2 3/2019 Guyan et al.
10,241,498 B1 * 3/2019 Beard .................... B33Y 50/02
10,244,818 B2 4/2019 Desjardins et al.
10,258,093 B2 4/2019 Smart
10,259,041 B2 4/2019 Gessler et al.
10,259,236 B2 * 4/2019 Miller ................... B29C 70/682
10,264,851 B2 4/2019 Waatti
10,279,235 B2 5/2019 Jean et al.
10,279,581 B2 * 5/2019 Ashcroft .............. A43B 13/223
10,293,565 B1 5/2019 Tran et al.
10,299,722 B1 5/2019 Tran et al.
10,322,320 B2 6/2019 Morales et al.
10,327,700 B2 6/2019 Lee et al.
10,335,646 B2 7/2019 Morales et al.
10,343,031 B1 7/2019 Day et al.
10,362,829 B2 7/2019 Lowe
10,384,106 B2 8/2019 Hunt et al.
10,390,578 B2 8/2019 Kuo et al.
10,394,050 B2 8/2019 Rasschaert et al.
10,398,948 B2 9/2019 Cardani et al.
10,413,804 B2 * 9/2019 Lefebvre .............. A43B 23/025
10,426,213 B2 10/2019 Hyman
10,452,053 B2 * 10/2019 Lalish ..................... G06F 30/00
10,455,896 B2 10/2019 Sterman et al.
10,463,525 B2 11/2019 Littlefield et al.
10,470,519 B2 11/2019 Guyan et al.
10,470,520 B2 11/2019 Guyan et al.
10,517,381 B2 12/2019 Frash
10,525,315 B1 1/2020 Wells et al.
10,575,586 B2 3/2020 Guyan et al.
10,575,587 B2 3/2020 Guyan
10,575,588 B2 3/2020 Perrault et al.
10,591,257 B1 3/2020 Barr et al.
10,624,413 B2 4/2020 Kirk et al.
10,631,592 B2 4/2020 Lee-Sang

(56) References Cited

U.S. PATENT DOCUMENTS 10,632,010 B2 4/2020 Hart et al.
10,638,805 B2 5/2020 Fella
10,638,810 B1 5/2020 Cheyney et al.
10,638,927 B1 5/2020 Beard et al.
10,646,356 B2 5/2020 Deshpande et al.
10,668,334 B2 6/2020 Madson et al.
10,695,642 B1 6/2020 Robinson
10,696,066 B2 6/2020 Miller
10,702,012 B2 7/2020 Guyan
10,702,740 B2 7/2020 Tarkington et al.
10,721,990 B2 7/2020 Campos et al.
10,737,147 B2 8/2020 Morales et al.
10,743,610 B2 8/2020 Guyan et al.
10,750,820 B2 8/2020 Guyan
10,751,590 B1 8/2020 Wells et al.
10,779,614 B2 9/2020 Re et al.
10,791,787 B2 10/2020 Hector et al.
10,792,541 B2 10/2020 Cardani et al.
10,829,640 B2 11/2020 Beyer et al.
10,835,786 B2 11/2020 Morales et al.
10,842,210 B2 11/2020 Nordstrom et al.
10,850,165 B2 12/2020 Nurmberg et al.
10,850,169 B1 12/2020 Day et al.
10,864,105 B2 12/2020 Dillingham
10,864,676 B2 12/2020 Constantinou et al.
10,875,239 B2 12/2020 Mccluskey
10,881,167 B2 1/2021 Jeng et al.
10,888,754 B2 1/2021 Wells et al.
10,890,970 B2 1/2021 Emokpae
10,893,720 B2 1/2021 Atta
10,899,868 B2 1/2021 Rolland et al.
10,918,157 B2 2/2021 Choukeir
10,932,500 B2 3/2021 Thomas et al.
10,932,515 B2 3/2021 Busbee
10,932,521 B2 3/2021 Perrault et al.
10,933,609 B2 3/2021 Gupta et al.
10,945,488 B2* 3/2021 Davis .................. A43B 13/181
10,946,583 B2 3/2021 Constantinou et al.
10,948,898 B1 3/2021 Pietrzak et al.
10,974,447 B2 4/2021 Constantinou et al.
11,026,482 B1 6/2021 Unis
11,033,796 B2 6/2021 Bologna et al.
11,052,597 B2 7/2021 Maccurdy et al.
D927,084 S 8/2021 Bologna et al.
11,076,656 B2 8/2021 Kormann et al.
11,090,863 B2 8/2021 Constantinou et al.
11,111,359 B2 9/2021 Kunc et al.
11,155,052 B2 10/2021 Jessiman et al.
11,167,198 B2 11/2021 Bologna et al.
11,167,395 B2 11/2021 Merlo et al.
11,167,475 B2 11/2021 Donovan
11,172,719 B2 11/2021 Briggs
11,178,938 B2 11/2021 Kulenko et al.
11,185,123 B2 11/2021 Waatti et al.
11,185,125 B2 11/2021 Blanche et al.
11,191,319 B2* 12/2021 Weisskopf ............. A43B 13/32
11,206,895 B2 12/2021 Hopkins et al.
11,219,270 B2 1/2022 Oleson et al.
11,224,265 B2 1/2022 Jarvis
11,229,259 B2 1/2022 Farris et al.
11,547,912 B2 1/2023 Davis et al.
11,684,104 B2 6/2023 Laperriere et al.
11,774,084 B2 10/2023 Davis et al.
11,779,821 B2 10/2023 Davis et al.
11,844,986 B2 12/2023 Davis et al.
12,369,668 B2 7/2025 Laperriere et al.
2004/0102115 A1* 5/2004 Chou ...................... B32B 27/42
428/407
2005/0027025 A1 2/2005 Erb
2005/0245103 A1 11/2005 Mori
2005/0251898 A1 11/2005 Domingos
2006/0179686 A1* 8/2006 Labonte ............... A43B 5/1691
36/89
2007/0000025 A1 1/2007 Picotte
2007/0204378 A1 9/2007 Behar
2007/0270253 A1 11/2007 Davis
2007/0277296 A1 12/2007 Bullock
2008/0172906 A1* 7/2008 Jou ...................... A43B 23/081
12/147 R
2009/0191989 A1 7/2009 Lammer et al.
2009/0264230 A1 10/2009 Thouin
2010/0156058 A1 6/2010 Koyess
2010/0160095 A1 6/2010 Chauvin
2010/0251465 A1 10/2010 Milea et al.
2010/0263231 A1* 10/2010 Smirman ................. A43B 7/14
36/43
2011/0111954 A1 5/2011 Li
2012/0297526 A1 11/2012 Leon
2013/0025031 A1 1/2013 Aperriere
2013/0025032 A1 1/2013 Durocher
2013/0143060 A1 6/2013 Jacobsen
2013/0196175 A1 8/2013 Levit
2013/0232674 A1 9/2013 Behrend et al.
2013/0269215 A1* 10/2013 Smirman ............. A43B 5/1641
36/102
2014/0013492 A1 1/2014 Bottland
2014/0013862 A1 1/2014 Lind
2014/0075652 A1 3/2014 Hanson et al.
2014/0090155 A1 4/2014 Johnston et al.
2014/0109440 A1 4/2014 Mcdowell et al.
2014/0163445 A1 6/2014 Pallari et al.
2014/0182170 A1* 7/2014 Wawrousek ............. A43B 5/02
702/155
2014/0259327 A1 9/2014 Demarest
2014/0272275 A1 9/2014 Yang
2014/0311315 A1 10/2014 Isaac
2014/0323250 A1 10/2014 Jeanneau
2015/0018136 A1 1/2015 Goldstein et al.
2015/0121609 A1 5/2015 Cote
2015/0246496 A1* 9/2015 Jones ................... A43B 23/026
425/113
2015/0272258 A1 10/2015 Preisler
2015/0298443 A1 10/2015 Hundley
2015/0307044 A1 10/2015 Hundley
2015/0313305 A1 11/2015 Daetwyler et al.
2015/0328512 A1 11/2015 Davis et al.
2016/0135537 A1 5/2016 Wawrousek et al.
2016/0192741 A1 7/2016 Mark
2016/0206048 A1 7/2016 Weidl et al.
2016/0235158 A1 8/2016 Desjardins
2016/0235560 A1 8/2016 Cespedes et al.
2016/0302494 A1 10/2016 Smart
2016/0302496 A1 10/2016 Ferrara
2016/0327113 A1 11/2016 Shelley
2016/0332036 A1 11/2016 Molinari et al.
2016/0333152 A1 11/2016 Cook et al.
2016/0349738 A1 12/2016 Sisk
2016/0353825 A1 12/2016 Bottlang et al.
2016/0374428 A1 12/2016 Kormann et al.
2016/0374431 A1 12/2016 Tow
2017/0021246 A1 1/2017 Goldstein et al.
2017/0105475 A1 4/2017 Huang
2017/0106622 A1 4/2017 Bonin
2017/0164899 A1 6/2017 Yang et al.
2017/0185070 A1 6/2017 Kronenberg et al.
2017/0239933 A1 8/2017 Shiettecatte et al.
2017/0251747 A1 9/2017 Pippin
2017/0273386 A1 9/2017 Kuo et al.
2017/0282030 A1 10/2017 Foortse
2017/0303622 A1 10/2017 Stone et al.
2017/0318900 A1 11/2017 Charlesworth et al.
2017/0332733 A1 11/2017 Cluckers et al.
2017/0350555 A1 12/2017 Jertson et al.
2017/0360148 A1 12/2017 Hayes et al.
2018/0007996 A1 1/2018 Sedwick et al.
2018/0027914 A1 2/2018 Cook
2018/0027916 A1 2/2018 Smallwood
2018/0028336 A1 2/2018 Pallari et al.
2018/0036944 A1 2/2018 Jarvis
2018/0085647 A1 3/2018 Caron Kardos et al.
2018/0098589 A1 4/2018 Diamond
2018/0098919 A1 4/2018 Pallari et al.
2018/0103704 A1 4/2018 Smart
2018/0104922 A1* 4/2018 Büsgen .................. B33Y 10/00

(56) References Cited

U.S. PATENT DOCUMENTS

2018/0116329 A1* 5/2018 Champagne ......... A43B 5/1616
2018/0132556 A1 5/2018 Laperriere et al.
2018/0140898 A1 5/2018 Kasha
2018/0184732 A1 7/2018 Plant
2018/0185735 A1* 7/2018 Labonte ................... A63C 1/02
2018/0200591 A1 7/2018 Davis et al.
2018/0231347 A1 8/2018 Tyler et al.
2018/0237600 A1 8/2018 Cox et al.
2018/0253774 A1 9/2018 Soracco et al.
2018/0264749 A1 9/2018 Bensely et al.
2018/0290044 A1 10/2018 Jin et al.
2018/0339445 A1 11/2018 Loveder
2018/0339478 A1 11/2018 Lee
2018/0341286 A1 11/2018 Markovsky et al.
2018/0345575 A1 12/2018 Constantinou et al.
2018/0361217 A1 12/2018 Yanoff et al.
2019/0029367 A1 1/2019 Yangas
2019/0029369 A1 1/2019 Vanwagen et al.
2019/0037960 A1 2/2019 Busbee et al.
2019/0037961 A1 2/2019 Busbee et al.
2019/0039311 A1 2/2019 Busbee et al.
2019/0045857 A1 2/2019 Fan et al.
2019/0045879 A1* 2/2019 Labont ............... A43B 23/0275
2019/0075876 A1 3/2019 Burek
2019/0082785 A1 3/2019 Sparks
2019/0090576 A1 3/2019 Guinta
2019/0098960 A1 4/2019 Weisskopf et al.
2019/0104792 A1 4/2019 Diamond
2019/0133235 A1 5/2019 Domanskis et al.
2019/0150549 A1 5/2019 Dunten et al.
2019/0167463 A1 6/2019 Littlefield et al.
2019/0184629 A1 6/2019 Kerrigan
2019/0191794 A1 6/2019 Boria
2019/0200703 A1 7/2019 Mark
2019/0223797 A1 7/2019 Tran et al.
2019/0231018 A1 8/2019 Boutin
2019/0232591 A1 8/2019 Sterman et al.
2019/0232592 A1 8/2019 Tran et al.
2019/0240896 A1 8/2019 Achten et al.
2019/0246741 A1 8/2019 Busbee et al.
2019/0248067 A1 8/2019 Achten et al.
2019/0248089 A1 8/2019 Busbee et al.
2019/0269194 A1 9/2019 Pietrzak et al.
2019/0289934 A1 9/2019 Lee
2019/0290981 A1 9/2019 Davis et al.
2019/0290982 A1 9/2019 Davis et al.
2019/0290983 A1 9/2019 Davis et al.
2019/0313732 A1 10/2019 Russell et al.
2019/0329491 A1 10/2019 Yu et al.
2019/0335838 A1 11/2019 Hoshizaki
2019/0344150 A1 11/2019 Dreve
2019/0358486 A1 11/2019 Higginbotham
2019/0365021 A1* 12/2019 Okajima .............. A43B 1/0009
2019/0365045 A1 12/2019 Kiederle et al.
2019/0381389 A1 12/2019 Nysaether
2019/0382089 A1 12/2019 O'Brien
2020/0015543 A1 1/2020 Roser
2020/0022444 A1 1/2020 Stone et al.
2020/0029654 A1 1/2020 Yangas
2020/0034016 A1 1/2020 Boissonneault et al.
2020/0046062 A1 2/2020 Perillo et al.
2020/0046075 A1 2/2020 Sterman et al.
2020/0060377 A1 2/2020 Dua et al.
2020/0061412 A1 2/2020 Crosswell
2020/0085606 A1 3/2020 Turner
2020/0094473 A1 3/2020 Constantinou et al.
2020/0100554 A1 4/2020 Bologna et al.
2020/0101252 A1 4/2020 Oddo
2020/0113267 A1 4/2020 Light et al.
2020/0114178 A1 4/2020 Waterford et al.
2020/0121991 A1 4/2020 Emadikotak et al.
2020/0128914 A1 4/2020 Bosmans et al.
2020/0154803 A1 5/2020 Goulet et al.
2020/0154818 A1 5/2020 Fu
2020/0154822 A1 5/2020 Kita et al.
2020/0163408 A1 5/2020 Guyan
2020/0164582 A1 5/2020 Siegl et al.
2020/0170341 A1 6/2020 Guyan et al.
2020/0171742 A1 6/2020 Constantinou et al.
2020/0196706 A1 6/2020 Perrault et al.
2020/0206020 A1 7/2020 Hart et al.
2020/0215415 A1 7/2020 Bologna et al.
2020/0215746 A1 7/2020 Miller
2020/0238604 A1 7/2020 Hart et al.
2020/0255618 A1 8/2020 Krick et al.
2020/0255660 A1 8/2020 Durand et al.
2020/0268077 A1 8/2020 Schmidt et al.
2020/0268080 A1 8/2020 Schmidt et al.
2020/0276770 A1 9/2020 Zheng
2020/0281310 A1 9/2020 Guyan
2020/0283683 A1 9/2020 Yakacki
2020/0297051 A1 9/2020 Quadling et al.
2020/0299452 A1 9/2020 Vontorcik et al.
2020/0305534 A1 10/2020 Chilson
2020/0305552 A1 10/2020 Cheyney et al.
2020/0324464 A1 10/2020 Reese et al.
2020/0329811 A1 10/2020 Davis
2020/0329814 A1 10/2020 Wang et al.
2020/0329815 A1 10/2020 Schmid
2020/0359728 A1 11/2020 Plant
2020/0367607 A1 11/2020 Cheyney et al.
2020/0368588 A1 11/2020 Morales et al.
2020/0375270 A1 12/2020 Holschuh et al.
2020/0390169 A1 12/2020 Waterloo
2020/0391085 A1 12/2020 Shassian
2020/0406537 A1 12/2020 Cross et al.
2021/0001157 A1 1/2021 Rashaud et al.
2021/0001560 A1 1/2021 Cook et al.
2021/0016139 A1 1/2021 Cardani et al.
2021/0022429 A1 1/2021 Ostergard
2021/0023775 A1 1/2021 Poelma
2021/0024775 A1 1/2021 Rolland et al.
2021/0030107 A1 2/2021 Pratt et al.
2021/0030113 A1 2/2021 Schuster
2021/0037908 A1 2/2021 Busbee
2021/0038947 A1 2/2021 Nurnberg et al.
2021/0052955 A1 2/2021 Demille et al.
2021/0068475 A1 3/2021 Coccia et al.
2021/0068495 A1 3/2021 Telatin et al.
2021/0069556 A1 3/2021 Morales et al.
2021/0076771 A1 3/2021 Guyan et al.
2021/0077865 A1 3/2021 Morales et al.
2021/0079970 A1 3/2021 Betteridge et al.
2021/0085012 A1 3/2021 Alvaro
2021/0101331 A1 4/2021 Su
2021/0112906 A1 4/2021 Bologna et al.
2021/0117589 A1 4/2021 Banadyha et al.
2021/0145116 A1 5/2021 Kvamme
2021/0145125 A1 5/2021 Miller et al.
2021/0146227 A1 5/2021 Bhagwat
2021/0169179 A1 6/2021 Louko
2021/0177090 A1 6/2021 Vandercruys et al.
2021/0177093 A1 6/2021 Perrault et al.
2021/0186151 A1 6/2021 Gross
2021/0186152 A1 6/2021 Kumar et al.
2021/0186154 A1 6/2021 Yuasa
2021/0187897 A1 6/2021 Reinhall et al.
2021/0195982 A1 7/2021 Pietrzak et al.
2021/0195989 A1 7/2021 Iwasa et al.
2021/0195995 A1 7/2021 Sakamoto et al.
2021/0206054 A1 7/2021 Constantinou et al.
2021/0246959 A1 8/2021 Kabaria et al.
2021/0283855 A1 9/2021 Bologna et al.
2021/0299543 A1 9/2021 Bologna et al.
2021/0321713 A1 10/2021 Busbee
2021/0321716 A1 10/2021 Kormann et al.
2021/0341031 A1 11/2021 Kabaria et al.
2021/0347112 A1 11/2021 Su et al.
2021/0347114 A1 11/2021 Boettcher et al.
2021/0354413 A1 11/2021 Jones et al.
2021/0358097 A1 11/2021 Harig
2021/0368910 A1 12/2021 Moller et al.
2021/0368912 A1 12/2021 Russell et al.
2021/0370400 A1 12/2021 Benichou et al.

(56) References Cited

U.S. PATENT DOCUMENTS

| | | | | |
|---|---|---|---|---|
| 2021/0401109 | A1* | 12/2021 | Labonte | A63C 1/40 |
| 2022/0000212 | A1 | 1/2022 | Busbee | |
| 2022/0000216 | A1 | 1/2022 | Carlucci et al. | |
| 2022/0007785 | A1 | 1/2022 | Mitchell et al. | |
| 2022/0016861 | A1* | 1/2022 | Carlucci | B29D 99/0089 |
| 2022/0022594 | A1 | 1/2022 | Dippel et al. | |
| 2022/0079280 | A1 | 3/2022 | Laperriere et al. | |
| 2022/0142284 | A1 | 5/2022 | Laperriere et al. | |
| 2022/0296975 | A1 | 9/2022 | Krick et al. | |
| 2023/0346065 | A1 | 11/2023 | Laperriere et al. | |
| 2024/0123305 | A1 | 4/2024 | Davis et al. | |
| 2025/0344796 | A1 | 11/2025 | Laperrière et al. | |
| 2026/0114536 | A1 | 4/2026 | Laperriere et al. | |

FOREIGN PATENT DOCUMENTS

| | | |
|---|---|---|
| CA | 2949062 | 2/2020 |
| CA | 3054525 | 2/2022 |
| CA | 3054536 | 3/2022 |
| CA | 3054547 | 3/2022 |
| CA | 3054530 | 5/2022 |
| CA | 3140503 | 6/2022 |
| CA | 3140505 | 2/2024 |
| CA | 3157206 C | 11/2025 |
| CN | 105218939 | 1/2016 |
| EP | 3142753 | 8/2019 |
| EP | 3253243 | 4/2020 |
| EP | 3972707 B1 | 10/2025 |
| WO | 2013025800 | 2/2013 |
| WO | 2013151157 | 10/2013 |
| WO | 2014100462 | 6/2014 |
| WO | 2015175541 | 11/2015 |
| WO | 2016209872 | 12/2016 |
| WO | 2017062945 | 4/2017 |
| WO | 2017136890 | 8/2017 |
| WO | 2017136941 | 8/2017 |
| WO | 2017182930 | 10/2017 |
| WO | 2017208256 | 12/2017 |
| WO | 2018072017 | 4/2018 |
| WO | 2018072034 | 4/2018 |
| WO | 2018157148 | 8/2018 |
| WO | 2018161112 | 9/2018 |
| WO | 2018234876 | 12/2018 |
| WO | 2019073261 | 4/2019 |
| WO | 2019086546 | 5/2019 |
| WO | 2019211822 | 11/2019 |
| WO | 2020028232 | 2/2020 |
| WO | 2020074910 | 4/2020 |
| WO | 2020104505 | 5/2020 |
| WO | 2020104506 | 5/2020 |
| WO | 2020104511 | 5/2020 |
| WO | 2020115708 | 6/2020 |
| WO | 2020118260 | 6/2020 |
| WO | 2020201666 | 10/2020 |
| WO | 2020232550 | 11/2020 |
| WO | 2020232552 | 11/2020 |
| WO | 2020232555 | 11/2020 |
| WO | 2020236930 | 11/2020 |
| WO | 2020245609 | 12/2020 |
| WO | 2021026406 | 2/2021 |
| WO | 2021046376 | 3/2021 |
| WO | 2021062079 | 4/2021 |
| WO | 2021062519 | 4/2021 |
| WO | 2021080974 | 4/2021 |
| WO | 2021101967 | 5/2021 |
| WO | 2021101970 | 5/2021 |
| WO | 2021114534 | 6/2021 |
| WO | 2021228162 | 11/2021 |
| WO | 2021238856 | 12/2021 |

OTHER PUBLICATIONS

Examiner Report issued on Dec. 5, 2023 in connection with Canadian Patent Application No. 3,158,266, 3 pages.

Examiner Report issued on Apr. 18, 2024 in connection with Canadian Patent Application No. 3,157,206, 4 pages.

Examiner's Report issued on Nov. 29, 2023 in connection with Canadian Patent Application No. 3,157,206, 3 pages.

Final Office Action issued on May 1, 2024 in connection with U.S. Appl. No. 17/526,489, 8 pages.

Notice of Allowance issued on Feb. 14, 2018 in connection with U.S. Appl. No. 14/276,739, 2 pages.

Notice of Allowance issued on Nov. 16, 2017 in connection with U.S. Appl. No. 14/276,739, 3 pages.

Examiner's Report issued on Jan. 2, 2024 in connection with CA patent application No. 3,141,358, 4 pages.

Non-Final Office Action issued on Dec. 21, 2023 in connection with U.S. Appl. No. 17/526,489, 11 pages.

Notice of Allowance issued on Jun. 14, 2023 in connection with U.S. Appl. No. 16/440,691, 15 pages.

Notice of Allowance issued on Jun. 7, 2023 in connection with U.S. Appl. No. 16/440,691, 17 pages.

Notice of Allowance issued on Jun. 16, 2023 in connection with U.S. Appl. No. 16/440,655, 11 pages.

Corrected Notice of Allowability issued on Jul. 19, 2023 in connection with U.S. Appl. No. 16/440,655, 9 pages.

Extended European Search Report issued on Jan. 5, 2023 in connection with European Patent Application No. 20810281.4, 10 pages.

Final Office Action issued on Jan. 10, 2023 in connection with U.S. Appl. No. 16/440,655, 38 pages.

Final Office Action issued on Jan. 10, 2023 in connection with U.S. Appl. No. 16/440,691, 33 bages.

Non-Final Office Action issued on Jan. 10, 2023 in connection with U.S. Appl. No. 15/922,526, 22 pages.

Examiner Report issued on Mar. 3, 2023 in connection with Canadian Patent Application No. 3,140,505, 3 pages.

Notice of Allowance issued on Feb. 16, 2023 in connection with U.S. Appl. No. 17/611,262, 9 pages.

Non-Final Office Action issued Sep. 7, 2021 in connection with U.S. Appl. No. 15/922,526, 22 pages.

Non-Final Office Action issued Mar. 14, 2022 in connection with U.S. Appl. No. 17/611,262, 36 pages.

Notice of Allowance issued on Sep. 9, 2022 in connection with U.S. Appl. No. 16/440,717, 18 pages.

Notice of Allowability issued on Nov. 16, 2017 in connection with U.S. Appl. No. 14/276,739, 3 pages.

Notice of Allowance issued on Nov. 9, 2017 in connection with U.S. Appl. No. 14/276,739, 7 pages.

Restriction Requirement issued on Jul. 17, 2020 in connection with U.S. Appl. No. 16/440,655, 9 pages.

Restriction Requirement issued on Jul. 20, 2020 in connection with U.S. Appl. No. 16/440,691, 6 pages.

Restriction Requirement issued on Jun. 9, 2015 in connection with U.S. Appl. No. 14/276,739, 5 bages.

Restriction Requirement issued on Mar. 5, 2019 in connection with U.S. Appl. No. 15/922,526, 6 bages.

Supplemental Notice of Allowability issued on Feb. 14, 2018 in connection with U.S. Appl. No. 14/276,739, 2 pages.

Written Opinion issued on Aug. 20, 2020 in connection with International PCT application No. PCT/CA2020/050683, 8 pages.

Written Opinion issued on Aug. 21, 2020 in connection with International PCT application No. PCT/CA2020/050686, 5 pages.

Written Opinion issued on Aug. 25, 2020 in connection with International PCT application No. PCT/CA2020/050684, 6 pages.

Written Opinion issued on Dec. 14, 2021 in connection with International PCT application No. PCT/ CA2020/050684, 7 pages.

Jacobsen et al., "Interconnected self-propagating photopolymer waveguides: An alternative to stereolithography for rapid formation of lattice-based open-cellular materials", Twenty-First Annual International Solid Freeform Fabrication Symposium, TX, Aug. 9, 2010, 846-856.

Wang, X. et al., 3D printing of polymer matrix composites: A review and prospective, Composites Part B, 2017, vol. 110, pp. 442-458.

Wirth, D. M. et al. Highly expandable foam for litographic 3D printing, ACS Appl. Mater. Interfaces, 2020, 12 pages 19033-19043.

(56) References Cited

OTHER PUBLICATIONS

Notice of Allowance issued on Aug. 11, 2023 in connection with U.S. Appl. No. 15/922,526, 11 pages.
Restriction Requirement issued on Nov. 17, 2023 in connection with U.S. Appl. No. 17/526,489, 6 pages.
Advisory Action issued on Jun. 14, 2016 in connection with U.S. Appl. No. 14/276,739, 3 pages.
Advisory Action issued on Mar. 17, 2021 in connection with U.S. Appl. No. 15/922,526, 3 pages.
Advisory Action issued on Mar. 21, 2017 in connection with U.S. Appl. No. 14/276,739, 3 pages.
Applicant-Initiated Interview Summary issued on Aug. 15, 2017 in connection with U.S. Appl. No. 14/276,739, 3 pages.
Applicant-Initiated Interview Summary issued on Jun. 13, 2016 in connection with U.S. Appl. No. 14/276,739, 2 pages.
European Search Report issued on Jan. 22, 2018 in connection with European Patent Application 15793488.6, 8 pages.
Examiner Report issued on Apr. 27, 2021 in connection with Canadian Patent Application No. 3,054,525, 3 pages.
Examiner Report issued on Apr. 27, 2021 in connection with Canadian Patent Application No. 3,054,530, 4 pages.
Examiner Report issued on Apr. 27, 2021 in connection with Canadian Patent Application No. 3,054,536, 5 pages.
Examiner Report issued on Apr. 27, 2021 in connection with Canadian Patent Application No. 3,054,547, 5 pages.
Examiner Report issued on Aug. 2, 2021 in connection with Canadian Patent Application No. 3,054,530, 3 pages.
Examiner Report issued on Nov. 24, 2020, in connection with Canadian Patent Application No. 3,054,525, 5 pages.
Examiner Report issued on Nov. 25, 2020 in connection with Canadian Patent Application No. 3054530, 7 pages.
Examiner Report issued on Nov. 25, 2020 in connection with Canadian Patent Application No. 3054536, 5 pages.
Examiner Report issued on Nov. 25, 2020 in connection with Canadian Patent Application No. 3054547, 5 pages.
Examiner's Report issued on Jul. 29, 2019 in connection with Canadian Patent Application 2,949,062, 3 pages.
Examiner's Report issued on Sep. 20, 2017 in connection with Canadian Patent Application 2,949,062, 3 pages.
Final Office Action issued on Sep. 8, 2022 in connection with U.S. Appl. No. 17/611,262, 17 pages.
Non-Final Office Action issued on Sep. 9, 2022 in connection with U.S. Appl. No. 16/440,655, 39 pages.
Final Office Action issued on Apr. 4, 2022 in connection with U.S. Appl. No. 15/922,526, 24 pages.
Final Office Action issued on Apr. 4, 2022 in connection with U.S. Appl. No. 16/440,655, 39 pages.
Final Office Action issued on Apr. 4, 2022 in connection with U.S. Appl. No. 16/440,691, 31 pages.
Final Office Action issued on Apr. 4, 2022 in connection with U.S. Appl. No. 16/440,717, 20 pages.
Final Office Action issued on Dec. 9, 2016 in connection with U.S. Appl. No. 14/276,739, 5 pages.
Final Office Action issued on Feb. 9, 2021 in connection with U.S. Appl. No. 16/440,655, 39 pages.
Final Office Action issued on Feb. 9, 2021 in connection with U.S. Appl. No. 16/440,691, 41 pages.
Final Office Action issued on Feb. 9, 2021 in connection with U.S. Appl. No. 16/440,717, 35 pages.
Final Office Action issued on Mar. 7, 2016 in connection with U.S. Appl. No. 14/276,739, 6 pages.
Final Office Action issued on Nov. 23, 2020 in connection with U.S. Appl. No. 15/922,526, 17 pages.
International Preliminary Report on Patentability issued on Oct. 1, 2021 in connection with International Patent Application PCT/CA2020/050689, 31 pages.
International Preliminary Report on Patentability issued on Sep. 14, 2021 in connection with International Patent Application PCT/CA2020/050683, 17 pages.
International Preliminary Report on Patentability issued on Sep. 3, 2021 in connection with International Patent Application PCT/CA2020/050686, 54 pages.
International Preliminary Report on Patentability issued on Feb. 8, 2022 in connection with International Patent Application PCT/CA2020/050684, 11 pages.
International Search Report and Written Opinion issued on Aug. 19, 2020 in connection with International Patent Application PCT/CA2020/050689, 11 pages.
International Search Report and Written Opinion issued on Jul. 31, 2015 in connection with International Patent Application PCT/US2015/030383, 14 pages.
International Search Report issued on Aug. 20, 2020 in connection with International PCT application No. PCT/CA2020/050683, 5 pages.
International Search Report issued on Aug. 21, 2020 in connection with International PCT application No. PCT/CA2020/050686, 4 pages.
International Search report issued on Aug. 25, 2020 in connection with International PCT application No. PCT/CA2020/050684, 7 pages.
Non-Final Office Action issued on Aug. 24, 2015 in connection with U.S. Appl. No. 14/276,739, 5 pages.
Non-Final Office Action issued on Jul. 20, 2016 in connection with U.S. Appl. No. 14/276,739, 5 pages.
Non-Final Office Action issued on Jun. 19, 2019 in connection with U.S. Appl. No. 15/922,526, 15 pages.
Non-Final Office Action issued on Jun. 5, 2020 in connection with U.S. Appl. No. 15/922,526, 16 pages.
Non-Final Office Action issued on May 1, 2017 in connection with U.S. Appl. No. 14/276,739, 7 pages.
Non-Final Office Action issued on Oct. 15, 2020 in connection with U.S. Appl. No. 16/440,655, 41 pages.
Non-Final Office Action issued on Oct. 15, 2020 in connection with U.S. Appl. No. 16/440,691, 33 pages.
Non-Final Office Action issued on Oct. 15, 2020 in connection with U.S. Appl. No. 16/440,717, 37 pages.
Non-Final Office Action issued on Sep. 9, 2022 in connection with U.S. Appl. No. 16/440,991, 32 pages.
Non-Final Office Action issued on Sep. 7, 2021 in connection with U.S. Appl. No. 16/440,655, 35 pages.
Non-Final Office Action issued on Sep. 7, 2021 in connection with U.S. Appl. No. 16/440,691, 33 pages.
Non-Final Office Action issued on Sep. 7, 2021 in connection with U.S. Appl. No. 16/440,717, 31 pages.
Non-Final Office Action issued on Nov. 18, 2024 in connection with U.S. Appl. No. 18/196,023, 11 pages.
Restriction requirement issued on Sep. 12, 2024 in connection with U.S. Appl. No. 18/196,023, 7 pages.
Examiner Report issued on Dec. 4, 2024 in connection with Canadian Patent Application No. 3,158,266, 3 pages.
Corrected Notice of Allowability issued on Apr. 14, 2025 in connection with U.S. Appl. No. 18/196,023, 2 pages.
Examiner-Initiated Interview Summary issued on Mar. 26, 2025 in connection with U.S. Appl. No. 18/196,023, 1 page.
Non-Final Office Action issued on Feb. 11, 2025 in connection with U.S. Appl. No. 18/386,924, 9 pages.
Non-Final Office Action issued on Mar. 18, 2025 in connection with U.S. Appl. No. 17/612,553, 25 pages.
Notice of Allowance issued on Mar. 26, 2025 in connection with U.S. Appl. No. 18/196,023, 9 pages.
Examiner Report issued on Jul. 8, 2025 in connection with Canadian Patent Application No. 3141358, 5 pages.
Intention to grant issued by the European Patent Office on Jun. 11, 2025 in connection with European Patent Application No. 20810281.4, 5 pages.
Notice of Allowance issued on Jul. 17, 2025 in connection with U.S. Appl. No. 18/386,924, 7 pages.
Examiner Report issued on Oct. 21, 2025 in connection with Canadian Patent Application No. 3158266, 4 pages.
Final Office Action issued on Oct. 21, 2025 in connection with U.S. Appl. No. 17/612,553, 28 pages.

(56) References Cited

OTHER PUBLICATIONS

Protest under 37 CFR 1.291 filed with the United States Patent and Trademark Office on Sep. 25, 2025 in connection with U.S. Appl. No. 18/788,214, 5 pages.
Yakacki et al., "Ultra-Dissipative Padding Made form Liquid-Crystal Elastomers". Jan. 12, 2018, https://www.nfl.com/news/nfl-reveals-1st-and-future-safety-innovation-winners-0ap3000000913820.
"NFL 1st & Future Award" published on Feb. 3, 2018, https://www.nfl.com/playerhealthandsafety/equipment-and-innovation/1st-and-future/nfl-comcast-nbc-mayo-clinic-announce-winners-1st-future-super-bowl-competition.
"Meet the 2018 Winners of the NFL's 1st and Future Start-Up Competition" published on Mar. 23, 2018. https://www.nfl.com/playerhealthandsafety/equipment-and-innovation/1st-and-future/meet-the 2018-winners-of-the-nfl-s-1st-and-future-start-up-competition.
"Meet the Winners of HeadHealth TECH Challenge III" published on May 8, 2018. https://www.nfl.com/playerhealthandsafety/equipment-and-innovation/headhealthtech/meet-the-winners-of-headhealthtech-challenge-iii.
Notice of Allowance issued on Oct. 31, 2025 in connection with U.S. Appl. No. 18/386,924, 7 pages.
Examiner Report issued on Mar. 12, 2026 in connection with Canadian Patent Application No. 3224065, 6 pages.
Examiner Report issued on Oct. 17, 2025 in connection with Canadian Patent Application No. 3158266, 4 pages.
Non-Final Office Action issued on Mar. 9, 2026 in connection with U.S. Appl. No. 18/788,214, 11 pages.
Notice of Allowability issued on Apr. 28, 2026 in connection with U.S. Appl. No. 18/386,924, 7 pages.
Notice of Allowance issued on Feb. 24, 2026 in connection with U.S. Appl. No. 18/386,924, 9 pages.
Restriction requirement issued on Dec. 30, 2025 in connection with U.S. Appl. No. 18/788,214, 6 pages.
Restriction Requirement issued on Jan. 15, 2026 in connection with U.S. Appl. No. 19/218,768, 9 pages.
Restriction Requirement issued on Mar. 26, 2026 in connection with U.S. Appl. No. 19/218,768, 8 pages.

* cited by examiner

THIS FIGURE IS ON SCALE

THIS FIGURE IS ON SCALE

SKATES AND OTHER FOOTWEAR COMPRISING ADDITIVELY-MANUFACTURED COMPONENTS

CROSS-REFERENCE TO RELATED APPLICATIONS

This application is a National Phase Entry of international PCT patent application No. PCT/CA2020/050684 filed on May 21, 2020 and claims the benefit of U.S. Provisional Patent Application No. 62/910,002 filed Oct. 3, 2019, the entire content of which is incorporated by reference herein.

FIELD

This disclosure relates generally to footwear, including skates (e.g., for playing hockey) and other footwear.

BACKGROUND

Skates are used by users in various sports such as ice hockey or roller hockey and other activities. A skate comprises a skate boot that typically comprises a number of parts assembled together to form the skate boot. This can include a body, sometimes referred to as a "shell", a toe cap, a tongue, a tendon guard, etc.

For example, an approach to manufacturing a shell of a skate boot of conventional skates may involve thermoforming different layers of synthetic material and then assembling these layers to form the shell. However, such conventional skates may sometimes be overly heavy, uncomfortable, poorly fitting, negatively affecting power transfer during skating strides, etc. Moreover, such conventional skates can be expensive to manufacture.

Also, a skating device, such as a blade holder holding a blade for ice skating or a wheel holder holding wheels for roller skating (e.g., inline skating), is normally fastened under a skate boot. This may add attachment, manufacturing, and/or other issues.

Similar considerations may arise for other types of footwear (e.g., ski boots, snowboarding boots, motorcycle boots, work boots, etc.).

For these and/or other reasons, there is a need for improvements directed to skates and other footwear.

SUMMARY

According to various aspects, this disclosure relates to a skate or other footwear comprising one or more additively-manufactured components designed to enhance performance and use of the skate or other footwear, such as fit and comfort, power transfer (e.g., to a skating surface during skating strides), and/or other aspects of the skate or other footwear.

For example, according to an aspect, this disclosure relates to a skate comprising: skate boot configured to receive a foot of a user; and a skating device below the skate boot and configured to engage a skating surface. The skate comprises an additively-manufactured component.

According to another aspect, this disclosure relates to a skate comprising: a skate boot configured to receive a foot of a user; and a skating device below the skate boot and configured to engage a skating surface. The skate comprises a first additively-manufactured zone and a second additively-manufactured zone that is located where more power is applied during a skating stride than the first additive-manufactured zone and structurally different from the first additively-manufactured zone.

According to another aspect, this disclosure relates to a skate comprising: a skate boot configured to receive a foot of a user; and a skating device below the skate boot and configured to engage a skating surface. The skate comprises an additively-manufactured component comprising a plurality of distinct zones structurally different from one another.

According to another aspect, this disclosure relates to a skate comprising: a skate boot configured to receive a foot of a user; and a skating device below the skate boot and configured to engage a skating surface. The skate comprises a plurality of additively-manufactured components with different functions additively-manufactured integrally with one another.

According to another aspect, this disclosure relates to an ice skate comprising: a skate boot configured to receive a foot of a user; a blade for engaging an ice surface; and a blade holder holding the blade, the blade holder comprising a body and a connection system that is configured to attach the blade to and detach the blade from the blade holder. At least part of the body of the blade holder and at least part of the connection system of the blade bolder are additively-manufactured.

According to another aspect, this disclosure relates to a skate comprising: a skate boot configured to receive a foot of a user; and a skating device below the skate boot and configured to engage a skating surface. The skate comprises an additively-manufactured component and a non-additively-manufactured component received by the additively-manufactured component.

According to another aspect, this disclosure relates to a skate comprising: a skate boot configured to receive a foot of a user; and a skating device below the skate boot and configured to engage a skating surface. The skate comprises an additively-manufactured component and a sensor associated with the additively-manufactured component.

According to another aspect, this disclosure relates to a skate boot for a skate, the skate comprising a skating device disposed below the skate boot and configured to engage a skating surface, the skate boot comprising: a cavity configured to receive a foot of a user; and an additively-manufactured component.

According to another aspect, this disclosure relates to a skate boot for a skate, the skate comprising a skating device disposed below the skate boot and configured to engage a skating surface, the skate boot comprising: a cavity configured to receive a foot of a user; and a first additively-manufactured zone and a second additively-manufactured zone that is located where more power is applied during a skating stride than the first additive-manufactured zone and structurally different from the first additively-manufactured zone.

According to another aspect, this disclosure relates to a skate boot for a skate, the skate comprising a skating device disposed below the skate boot and configured to engage a skating surface, the skate boot comprising: a cavity configured to receive a foot of a user; and an additively-manufactured component comprising a plurality of distinct zones structurally different from one another.

According to another aspect, this disclosure relates to a skate boot for a skate, the skate comprising a skating device disposed below the skate boot and configured to engage a skating surface, the skate boot comprising: a cavity configured to receive a foot of a user; and a plurality of additively-manufactured components with different functions additively-manufactured integrally with one another.

According to another aspect, this disclosure relates to a skate boot for a skate, the skate comprising a skating device disposed below the skate boot and configured to engage a skating surface, the skate boot comprising: a cavity configured to receive a foot of a user; an additively-manufactured component; and a non-additively-manufactured component received by the additively-manufactured component.

According to another aspect, this disclosure relates to a skate boot for a skate, the skate comprising a skating device below the skate boot and configured to engage a skating surface, the skate boot comprising: a cavity configured to receive a foot of a user; and 3D-printed fiber-reinforced composite material.

According to another aspect, this disclosure relates to a skate boot for a skate, the skate comprising a skating device disposed below the skate boot and configured to engage a skating surface, the skate boot comprising: a cavity configured to receive a foot of a user; an additively-manufactured component; and a sensor associated with the additively-manufactured component.

According to another aspect, this disclosure relates to a blade holder for holding a blade of an ice skate, the ice skate comprising a skate boot configured to receive a foot of a user, the blade holder being configured to be disposed below the skate boot and comprising an additively-manufactured component.

According to another aspect, this disclosure relates to a blade holder for holding a blade of an ice skate, the ice skate comprising a skate boot configured to receive a foot of a user, the blade holder being configured to be disposed below the skate boot and comprising a first additively-manufactured zone and a second additively-manufactured zone that is located where more power is applied during a skating stride than the first additive-manufactured zone and structurally different from the first additively-manufactured zone.

According to another aspect, this disclosure relates to a blade holder for holding a blade of an ice skate, the ice skate comprising a skate boot configured to receive a foot of a user, the blade holder being configured to be disposed below the skate boot and comprising an additively-manufactured component that comprises a plurality of distinct zones structurally different from one another.

According to another aspect, this disclosure relates to a blade holder for holding a blade of an ice skate, the ice skate comprising a skate boot configured to receive a foot of a user, the blade holder being configured to be disposed below the skate boot and comprising a plurality of additively-manufactured components with different functions additively-manufactured integrally with one another.

According to another aspect, this disclosure relates to a blade holder for holding a blade of an ice skate, the ice skate comprising a skate boot configured to receive a foot of a user, the blade holder being configured to be disposed below the skate boot and comprising an additively-manufactured component and a non-additively-manufactured component received by the additively-manufactured component.

According to another aspect, this disclosure relates to a blade holder for holding a blade of an ice skate, the ice skate comprising a skate boot configured to receive a foot of a user, the blade holder being configured to be disposed below the skate boot and comprising an additively-manufactured component and a sensor associated with the additively-manufactured component.

According to another aspect, this disclosure relates to a blade holder for holding a blade of an ice skate, the ice skate comprising a skate boot configured to receive a foot of a user, the blade holder being configured to be disposed below the skate boot and comprising a body and a connection system that is configured to attach the blade to and detach the blade from the blade holder, wherein at least part of the body of the blade holder and at least part of the connection system of the blade bolder are additively-manufactured.

According to another aspect, this disclosure relates to a blade holder for holding a blade of an ice skate, the ice skate comprising a skate boot configured to receive a foot of a user, the blade holder being configured to be disposed below the skate boot and comprising 3D-printed fiber-reinforced composite material.

According to another aspect, this disclosure relates to a blade for an ice skate, the ice skate comprising a skate boot configured to receive a foot of a user, the blade comprising an additively-manufactured component.

According to another aspect, this disclosure relates to a blade for an ice skate, the ice skate comprising a skate boot configured to receive a foot of a user, the blade comprising a first additively-manufactured zone and a second additively-manufactured zone that is located where more power is applied during a skating stride than the first additive-manufactured zone and structurally different from the first additively-manufactured zone.

According to another aspect, this disclosure relates to a blade for an ice skate, the ice skate comprising a skate boot configured to receive a foot of a user, the blade comprising an additively-manufactured component that comprises a plurality of distinct zones structurally different from one another.

According to another aspect, this disclosure relates to a blade for an ice skate, the ice skate comprising a skate boot configured to receive a foot of a user, the blade comprising a plurality of additively-manufactured components with different functions additively-manufactured integrally with one another.

According to another aspect, this disclosure relates to a blade for an ice skate, the ice skate comprising a skate boot configured to receive a foot of a user, the blade comprising an additively-manufactured component and a non-additively-manufactured component received by the additively-manufactured component.

According to another aspect, this disclosure relates to a blade for an ice skate, the ice skate comprising a skate boot configured to receive a foot of a user, the blade comprising an additively-manufactured component and a sensor associated with the additively-manufactured component.

According to another aspect, this disclosure relates to a blade for an ice skate, the ice skate comprising a skate boot configured to receive a foot of a user, the blade comprising 3D-printed fiber-reinforced composite material and metallic material that is configured to contact an ice surface.

According to another aspect, this disclosure relates to a method of making a skate, the skate comprising: a skate boot configured to receive a foot of a user; and a skating device below the skate boot and configured to engage a skating surface, the method comprising: providing feedstock; and additively manufacturing a component of the skate using the feedstock.

According to another aspect, this disclosure relates to a method of making a skate, the skate comprising: a skate boot configured to receive a foot of a user; and a skating device below the skate boot and configured to engage a skating surface, the method comprising: providing feedstock; and additively manufacturing a component of the skate using the feedstock. The additively-manufactured component comprises a plurality of distinct zones structurally different from one another.

According to another aspect, this disclosure relates to a method of making a skate, the skate comprising: a skate boot configured to receive a foot of a user; and a skating device below the skate boot and configured to engage a skating surface, the method comprising: providing feedstock; and additively manufacturing a plurality of components of the skate that have different functions integrally with one another, using the feedstock.

According to another aspect, this disclosure relates to a method of making a skate, the skate comprising: a skate boot configured to receive a foot of a user; and a skating device below the skate boot and configured to engage a skating surface, the method comprising: providing feedstock including fiber feedstock; and additively manufacturing a component of the skate, using the feedstock, such that the component of the skate comprises 3D-printed fiber-reinforced composite material.

According to another aspect, this disclosure relates to a method of making a skate boot of a skate, the skate boot being configured to receive a foot of a user, the skate comprising a skating device below the skate boot and configured to engage a skating surface, the method comprising: providing feedstock; and additively manufacturing a component of the skate boot using the feedstock.

According to another aspect, this disclosure relates to a method of making a skate boot of a skate, the skate boot being configured to receive a foot of a user, the skate comprising a skating device below the skate boot and configured to engage a skating surface, the method comprising: providing feedstock; and additively manufacturing a component of the skate boot using the feedstock. The additively-manufactured component comprises a plurality of distinct zones structurally different from one another.

According to another aspect, this disclosure relates to a method of making a skate boot of a skate, the skate boot being configured to receive a foot of a user, the skate comprising a skating device below the skate boot and configured to engage a skating surface, the method comprising: providing feedstock; and additively manufacturing a plurality of components of the skate boot that have different functions integrally with one another, using the feedstock.

According to another aspect, this disclosure relates to a method of making a skate boot of a skate, the skate boot being configured to receive a foot of a user, the skate comprising a skating device below the skate boot and configured to engage a skating surface, the method comprising: providing feedstock including fiber feedstock; and additively manufacturing a component of the skate boot, using the feedstock, such that the component of the skate comprises 3D-printed fiber-reinforced composite material.

According to another aspect, this disclosure relates to a method of making a blade holder of an ice skate, the blade holder being configured to hold a blade, the ice skate comprising a skate boot configured to receive a foot of a user, the method comprising: providing feedstock; and additively manufacturing a component of the blade holder using the feedstock.

According to another aspect, this disclosure relates to a method of making a blade holder of an ice skate, the blade holder being configured to hold a blade, the ice skate comprising a skate boot configured to receive a foot of a user, the method comprising: providing feedstock; and additively manufacturing a component of the blade holder using the feedstock. The additively-manufactured component comprises a plurality of distinct zones structurally different from one another.

According to another aspect, this disclosure relates to a method of making a blade holder of an ice skate, the blade holder being configured to hold a blade, the ice skate comprising a skate boot configured to receive a foot of a user, the method comprising: providing feedstock; and additively manufacturing a plurality of components of the blade holder that have different functions integrally with one another, using the feedstock.

According to another aspect, this disclosure relates to a method of making a blade holder of an ice skate, the blade holder being configured to hold a blade, the ice skate comprising a skate boot configured to receive a foot of a user, the method comprising: providing feedstock including fiber feedstock; and additively manufacturing a component of the blade holder, using the feedstock, such that the component of the blade holder comprises 3D-printed fiber-reinforced composite material.

According to another aspect, this disclosure relates to a method of making a blade of an ice skate, the ice skate comprising a skate boot configured to receive a foot of a user, the method comprising: providing feedstock; and additively manufacturing a component of the blade using the feedstock.

According to another aspect, this disclosure relates to a method of making a blade of an ice skate, the ice skate comprising a skate boot configured to receive a foot of a user, the method comprising: providing feedstock; and additively manufacturing a component of the blade using the feedstock. The additively-manufactured component comprises a plurality of distinct zones structurally different from one another.

According to another aspect, this disclosure relates to a method of making a blade of an ice skate, the ice skate comprising a skate boot configured to receive a foot of a user, the method comprising: providing feedstock; and additively manufacturing a plurality of components of the blade that have different functions integrally with one another, using the feedstock.

According to another aspect, this disclosure relates to a method of making a blade of an ice skate, the ice skate comprising a skate boot configured to receive a foot of a user, the method comprising: providing feedstock including metal; and additively manufacturing a component of the blade, using the feedstock, such that the component of the blade comprises 3D-printed metallic material.

According to another aspect, this disclosure relates to footwear comprising: a structure configured to receive a foot of a user. The footwear comprises an additively-manufactured component.

According to another aspect, this disclosure relates to footwear comprising: a structure configured to receive a foot of a user. The footwear comprises a first additively-manufactured zone and a second additively-manufactured zone that is located where more power is applied during a motion than the first additive-manufactured zone and structurally different from the first additively-manufactured zone.

According to another aspect, this disclosure relates to footwear comprising: a structure configured to receive a foot of a user. The footwear comprises an additively-manufactured component comprising a plurality of distinct zones structurally different from one another.

According to another aspect, this disclosure relates to footwear comprising: a structure configured to receive a foot of a user. The footwear comprises a plurality of additively-manufactured components with different functions additively-manufactured integrally with one another.

According to another aspect, this disclosure relates to footwear comprising: a structure configured to receive a foot of a user. The footwear comprises an additively-manufactured component and a non-additively-manufactured component received by the additively-manufactured component.

According to another aspect, this disclosure relates to footwear comprising: a structure configured to receive a foot of a user. The footwear comprises an additively-manufactured component and a sensor associated with the additively-manufactured component.

According to another aspect, this disclosure relates to a method of making footwear, the footwear comprising: a structure configured to receive a foot of a user; the method comprising: providing feedstock; and additively manufacturing a component of the footwear using the feedstock. The additively-manufactured component comprises a plurality of distinct zones structurally different from one another.

According to another aspect, this disclosure relates to a method of making footwear, the footwear comprising: a structure configured to receive a foot of a user; the method comprising: providing feedstock; and additively manufacturing a plurality of components of the footwear that have different functions integrally with one another, using the feedstock.

According to another aspect, this disclosure relates to a method of making footwear, the footwear comprising: a structure configured to receive a foot of a user; the method comprising: providing feedstock including fiber feedstock; and additively manufacturing a component of the footwear, using the feedstock, such that the component of the skate comprises 3D-printed fiber-reinforced composite material.

These and other aspects of the invention will now become apparent to those of ordinary skill in the art upon review of the following description of embodiments of the invention in conjunction with the accompanying drawings.

BRIEF DESCRIPTION OF DRAWINGS

A detailed description of embodiments is provided below, by way of example only, with reference to drawings accompanying this description, in which:

FIGS. 72 to 75 show another variant of the blade detachment mechanism;

FIG. 76 shows a variant of the blade wherein the blade comprises a silkscreen;

It is to be expressly understood that the description and drawings are only for purposes of illustrating certain embodiments and are an aid for understanding. They are not intended to be and should not be limiting.

DETAILED DESCRIPTION OF EMBODIMENTS

Figure 1:
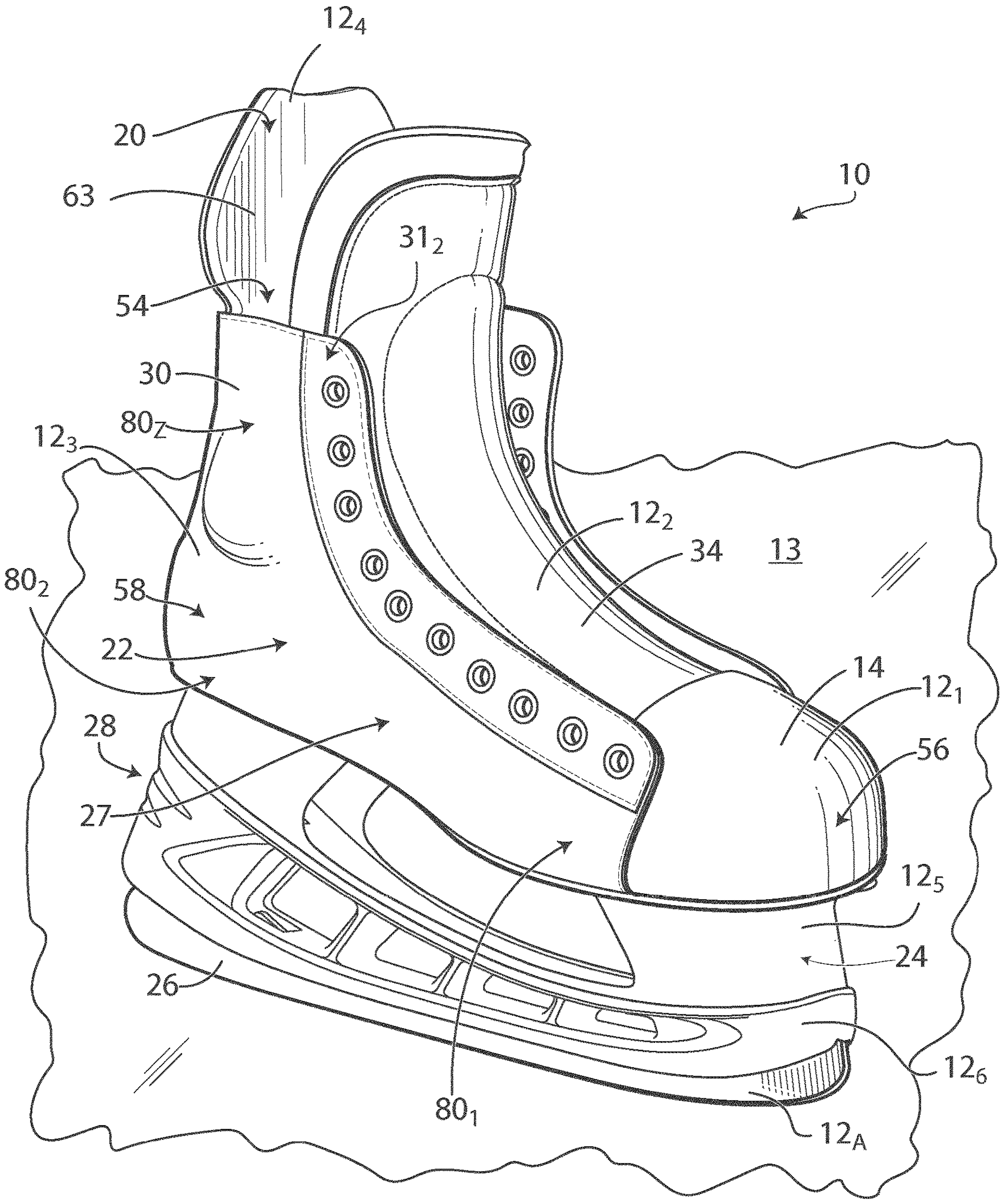
FIG. 1 shows an embodiment of footwear in which the footwear is a skate for a user comprising a skate boot and a blade holder and comprising additively-manufactured components.

FIG. 1 shows an example of an embodiment of footwear 10 for a user and comprising additively-manufactured components $\mathbf{12}_1$-$\mathbf{12}_4$. In this embodiment, the footwear 10 is a skate for the user to skate on a skating surface 13. More particularly, in this embodiment, the skate 10 is a hockey skate for the user who is a hockey player playing hockey. In this example, the skate 10 is an ice skate, a type of hockey played is ice hockey, and the skating surface 13 is ice.

The skate 10 comprises a skate boot 22 for receiving a foot 11 of the player and a skating device 28 disposed beneath the skate boot 22 to engage the skating surface 13. In this embodiment, the skating device 28 comprises a blade 26 for contacting the ice 13 and a blade holder 24 between the skate boot 22 and the blade 26. The skate 10 has a longitudinal direction, a widthwise direction, and a heightwise direction.

In this embodiment, the additively-manufactured components $\mathbf{12}_1$-$\mathbf{12}_4$ constitute one or more parts of the skate boot 22 and/or one or more parts of the skating device 28.

Each of the additively-manufactured components $12_1$-$12_A$ of the skate 10 is a part of the skate 10 that is additively manufactured, i.e., made by additive manufacturing, (e.g. 3D printing), in which material 50 thereof initially provided as feedstock (e.g., powder, liquid, filaments, fibers, and/or other suitable feedstock), which can be referred to as 3D-printed material, is added by a machine (i.e., a 3D printer) that is computer-controlled (e.g., using a digital 3D model such as a computer-aided design (CAD) file) to create it in its three-dimensional form (e.g., layer by layer, from a pool of liquid, applying continuous fibers, or in any other way, normally moldlessly, i.e., without any mold). This is in contrast to subtractive manufacturing (e.g., machining) where material is removed and molding where material is introduced into a mold's cavity.

Any 3D-printing technology may be used to make the additively-manufactured components $12_1$-$12_A$ of the skate 10. For instance, in some embodiments, fused deposition modeling (FDM), direct light processing (DLP), stereolithography (SLA), selective laser sintering (SLS), material jetting (MJ), binder jetting (BJ), continuous-fiber 3D printing, and/or any other suitable 3D-printing technology may be used. Examples of suitable 3D-printing technologies may include those available from Carbon (www.carbon3d.com), EOS (https://www.eos.info/en), HP, (https://www8.hp.com/ca/en/printers/3d-printers.html), Arevo (https://arevo.com), and Continuous Composites (https://www.continuouscomposites.com/).

As further discussed later, in this embodiment, the additively-manufactured components $12_1$-$12_A$ of the skate 10, which may be referred to as "AM" components, are designed to enhance performance and use of the skate 10, such as fit and comfort, power transfer to the skating surface 13 during skating strides, and/or other aspects of the skate 10.

Figure 90:
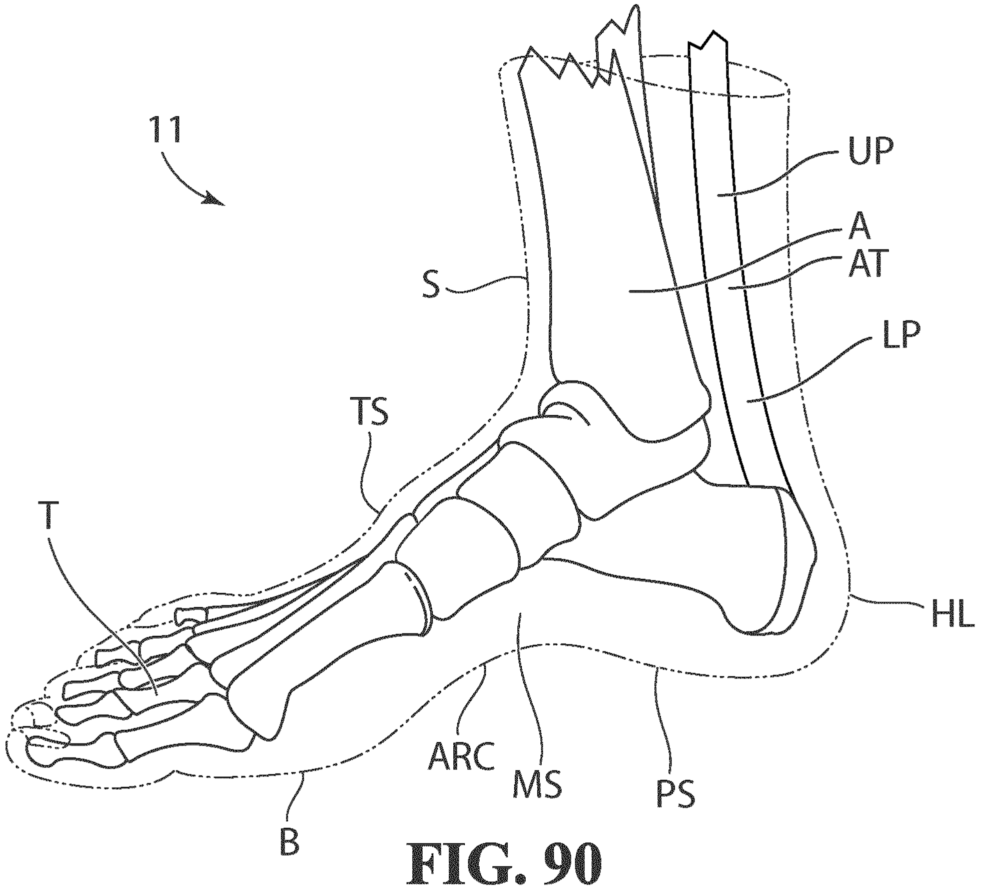
FIGS. 90 and 91 are side and front views of a right foot of the skater with an integument of the foot shown in dotted lines and bones shown in solid lines.
Figure 91:
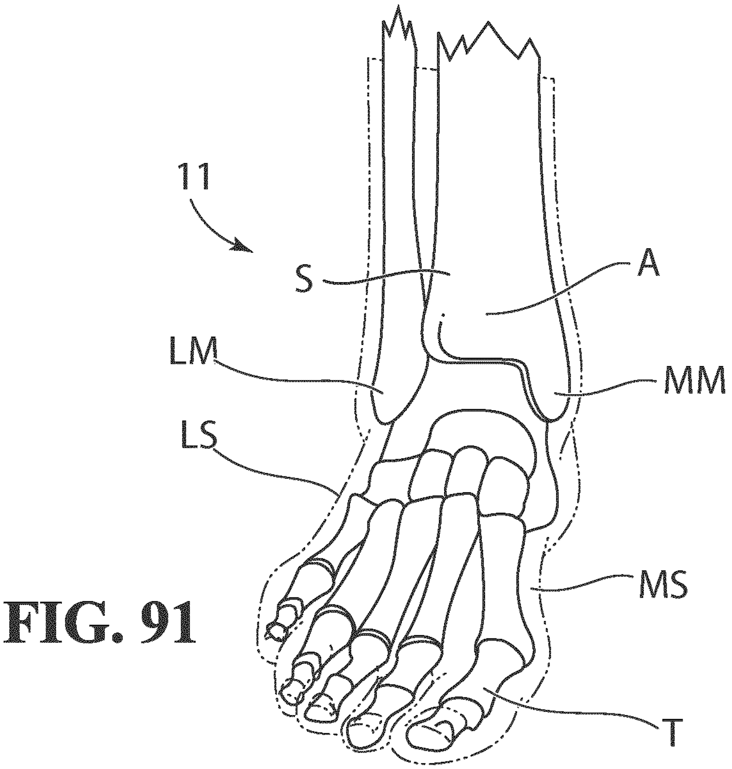

The skate boot 22 defines a cavity 54 for receiving the player's foot 11. With additional reference to FIGS. 90 and 91, the player's foot 11 comprises toes T, a ball B, an arch ARC, a plantar surface PS, a top surface TS including an instep IN, a medial side MS, a lateral side LS, and a heel HL. The top surface TS of the player's foot 11 is continuous with a lower portion of a shin S of the player. In addition, the player has an Achilles tendon AT and an ankle A having a medial malleolus MM and a lateral malleolus LM that is at a lower position than the medial malleolus MM. The Achilles tendon AT has an upper part UP and a lower part LP projecting outwardly with relation to the upper part UP and merging with the heel HL. A forefoot of the player includes the toes T and the ball B, a hindfoot of the player includes the heel HL, and a midfoot of the player is between the forefoot and the hindfoot.

More particularly, the skate boot 22 comprises a heel portion 21 configured to face the heel HL of the player's foot, an ankle portion 23 configured to face the ankle A of the player, a medial side portion 25 configured to face the medial side MS of the player's foot, a lateral side portion 27 configured to face the lateral side LS of the player's foot, an instep portion 41 configured to face the instep IN of the player's foot, a sole portion 29 configured to face the plantar surface PS of the player's foot, a toe portion 19 configured to receive the toes T of the user's foot, and a tendon guard portion 20 configured to face the upper part UP of the Achilles tendon AT of the player. The skate boot 22 has a longitudinal direction, a widthwise direction, and a heightwise direction.

Figure 2:
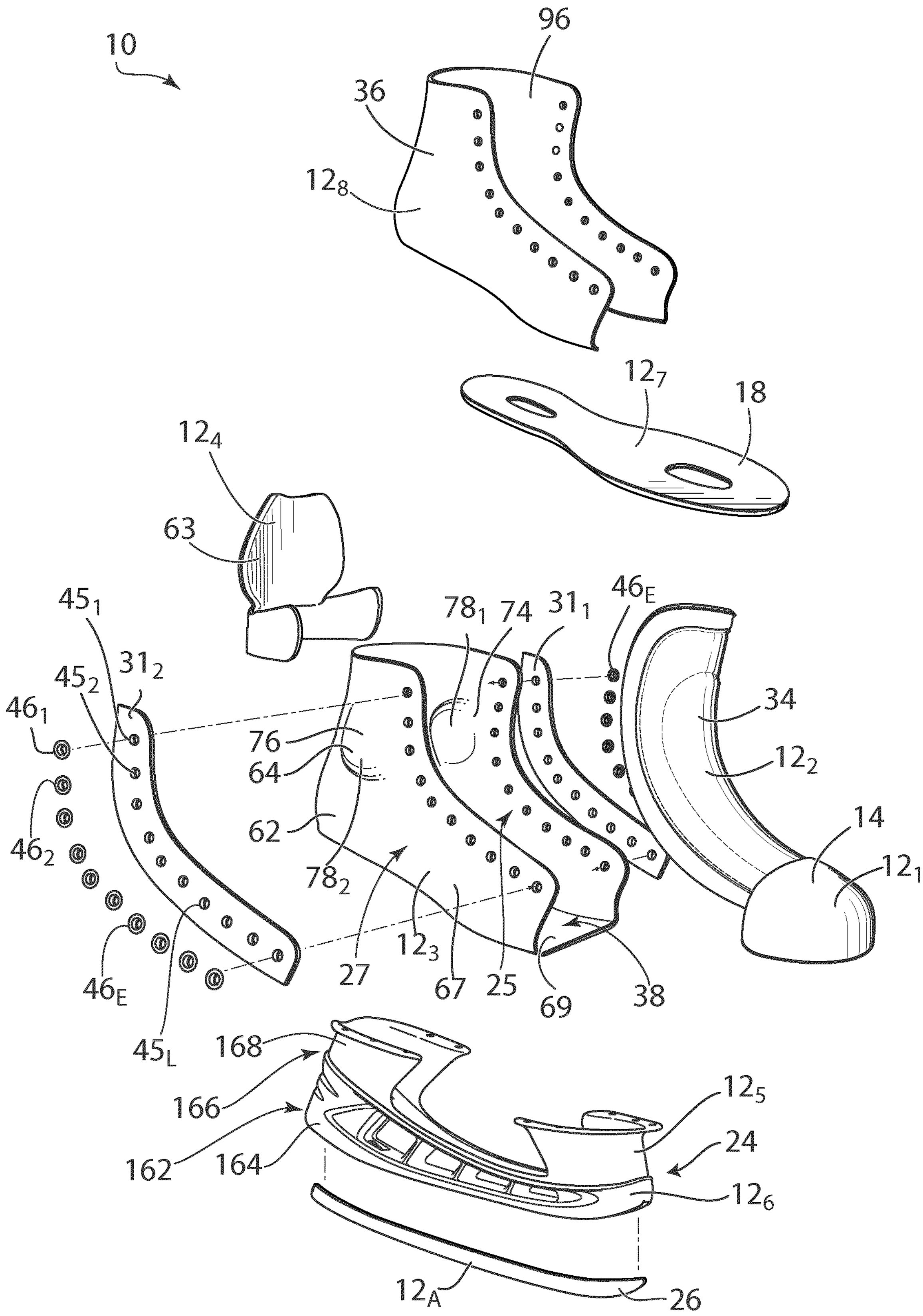
FIG. 2 shows an exploded view of the skate.

In this embodiment, with additional reference to FIGS. 1 and 2, the skate boot 22 comprises a body 30 and a plurality of parts connected to the body 30, which, in this example, includes facings $31_1$, $31_2$, a toe cap 14, a tongue 34, a liner 36, an insole 18, a footbed 38, a tendon guard 63 and an outsole 39. Lacing holes $45_1$-$45_L$ extend through each of the facings $31_1$, $31_2$, the body 30, and the liner 36 to receive a lace 47 for securing the skate 10 to the player's foot. In this example, the eyelets $46_1$-$46_E$ are provided in respective ones of the lacing holes $45_1$-$45_L$ to engage the lace 47.

The body 30 of the skate boot 22, which may sometimes be referred to as a "shell", imparts strength and structural integrity to the skate 10 to support the player's foot. In this embodiment, the body 30 comprises medial and lateral side portions 66, 68 respectively configured to face the medial and lateral sides MS, LS of the player's foot, an ankle portion 64 configured to face the ankle A of the player, and a heel portion 62 configured to face the heel HL of the player. The medial and lateral side portions 66, 68, the ankle portion 64, and the heel portion 62 of the body 30 respectively constitute at least part (i.e., part or an entirety) of the medial and lateral side portions 25, 27, the ankle portion 23, and the heel portion 21 of the skate boot 22. The heel portion 62 may be formed such that it is substantially cup-shaped for following a contour of the heel HL of the player. The ankle portion 64 comprises medial and lateral ankle sides 74, 76. The medial ankle side 74 has a medial depression 781 for receiving the medial malleolus MM of the player and the lateral ankle side 76 has a lateral depression 80 for receiving the lateral malleolus LM of the player. The lateral depression 782 is located slightly lower than the medial depression 78 for conforming to the morphology of the player's foot. In this example, the body 30 also comprises a sole portion 69 configured to face the plantar surface PS of the player's foot. The sole portion 69 of the body 30 respectively constitute at least part of the sole portion 29.

In this embodiment, the body 30 of the skate boot 22 is manufactured to form its medial and lateral side portions 66, 68, its ankle portion 64, its heel portion 62, and its sole portion 69. For example, in this embodiment, at least part of the body 30 may be manufactured such that two or more of its medial and lateral side portions 66, 68, its ankle portion 64, its heel portion 62, and its sole portion 69 are integral with one another (i.e., are manufactured together as a single piece). For instance, in some embodiments, the body 30 may be a monolithic body, i.e., a one-piece body, made by AM. As another example, in some embodiments, the body 30 may be additively manufacture (e.g., 3D printed) to form its medial and lateral side portions 66, 68, its ankle portion 64, its heel portion 62, and its sole portion 69, which are distinct from (i.e. not integral with) one another.

The body 30 of the skate boot 22 may include one or more materials making it up. For example, in some embodiments, the body 30 may include one or more polymeric materials. More specifically, in this embodiment, the shell 30 comprises a plurality of materials $M_1$-$M_N$ which may be different from one another, such as by having different chemistries and/or exhibiting substantially different values of one or more material properties (e.g., density, modulus of elasticity, hardness, etc.) and which are arranged such that the shell 30 comprises a plurality of layers $85_1$-$85_L$ which are made of respective ones of the materials $M_1$-$M_N$. In that sense, in this case, the shell 30 may be referred to as a "multilayer" shell and the layers $85_1$-$85_L$ of the shell 30 may be referred to as "subshells". This may allow the skate 10 to have useful performance characteristics (e.g., reduced weight, proper fit and comfort, etc.) while being more cost-effectively manufactured.

The materials $M_1$-$M_N$ may be implemented in any suitable way. In this embodiment, each of the materials $M_1$-$M_N$ may be a polymeric material, such as polyethylene, polypropylene, polyurethane (PU), ethylene-vinyl acetate (EVA), nylon, polyester, vinyl, polyvinyl chloride, polycarbonate, an ionomer resin (e.g., Surlyn®), styrene-butadiene copolymer (e.g., K-Resin®) etc.), and/or any other thermoplastic or thermosetting polymer. Alternatively or additionally, in some embodiments, the materials $M_1$-$M_N$ may include one or more composite materials, such as a fiber-matrix composite material comprising fibers disposed in a matrix. For instance, in some embodiments, the materials $M_1$-$M_N$ may include a fiber-reinforced plastic (FRP—a.k.a., fiber-reinforced polymer), comprising a polymeric matrix may include any suitable polymeric resin, such as a thermoplastic or thermosetting resin, like epoxy, polyethylene, polypropylene, acrylic, thermoplastic polyurethane (TPU), polyether ether ketone (PEEK) or other polyaryletherketone (PAEK), polyethylene terephthalate (PET), polyvinyl chloride (PVC), poly(methyl methacrylate) (PMMA), polycarbonate, acrylonitrile butadiene styrene (ABS), nylon, polyimide, polysulfone, polyimide-imide, self-reinforcing polyphenylene, polyester, vinyl ester, vinyl ether, polyurethane, cyanate ester, phenolic resin, etc., a hybrid thermosetting-thermoplastic resin, or any other suitable resin, and fibers such as carbon fibers, glass fibers, polymeric fibers such as aramid fibers (e.g., Kevlar fibers), boron fibers, silicon carbide fibers, metallic fibers, ceramic fibers, etc., which may be provided as layers of continuous fibers (e.g. pre-preg (i.e., pre-impregnated) layers of fibers held together by an amount of matrix). Another example of a composite material may be a self-reinforced polymeric (e.g., polypropylene) composite (e.g., a Curv® composite).

In this embodiment, the materials $M_1$-$M_N$ of the subshells 85$_1$-85$_L$ of the shell 30 constitute at least part of the heel portion 62, the ankle portion 64, the medial and lateral side portions 66, 68, and the sole portion 69 of the shell 30. More particularly, in this embodiment, the materials $M_1$-$M_N$ constitute at least a majority (i.e., a majority or an entirety) of the heel portion 62, the ankle portion 64, the medial and lateral side portions 66, 68, and the sole portion 69 of the shell 30. In this example, the materials $M_1$-$M_N$ constitute the entirety of the heel portion 62, the ankle portion 64, the medial and lateral side portions 66, 68, and the sole portion 69 of the shell 30.

The subshells 85$_1$-85$_L$ constituted by the polymeric materials $M_1$-$M_N$ may have different properties for different purposes.

For instance, in some cases, a polymeric material $M_x$ may be stiffer than a polymeric material $M_y$ such that a subshell comprising the polymeric material $M_x$ is stiffer than a subshell comprising the polymeric material $M_y$. For example, a ratio of a stiffness of the subshell comprising the polymeric material $M_x$ over a stiffness of the subshell comprising the polymeric material $M_y$ may be at least 1.5, in some cases at least 2, in some cases at least 2.5, in some cases 3, in some cases 4 and in some cases even more.

In some cases, a given one of the subshells 85$_1$-85$_L$ may be configured to be harder than another one of the subshells 85$_1$-85$_L$. For instance, to provide a given subshell with more hardness than another subshell, the hardness of the polymeric materials $M_1$-$M_N$ may vary. For example, a hardness of the polymeric material $M_x$ may be greater than a hardness of the polymeric material $M_y$. For example, in some cases, a ratio of the hardness of the polymeric material $M_x$ over the hardness of the polymeric material $M_y$ may be at least 1.5, in some cases at least 2, in some cases at least 2.5, in some cases at least 3, in some cases at least 4, in some cases at least 5 and in some cases even more.

Figure 89:
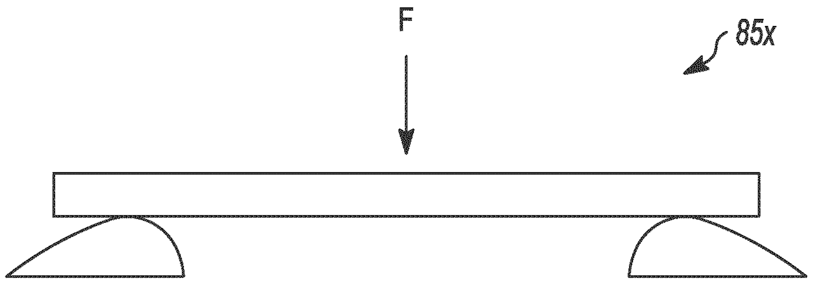
FIG. 89 shows an example of a test for determining the stiffness of a part of a subshell.

To observe the stiffness of a subshell 85$_x$, as shown in FIG. 89, a part of the subshell 85$_x$ can be isolated from the remainder of the subshell 85$_x$ (e.g., by cutting, or otherwise removing the part from the subshell 85$_x$, or by producing the part without the remainder of the subshell 85$_x$) and a three-point bending test can be performed on the part to subject it to loading tending to bend the part in specified ways (along a defined direction of the part if the part is anisotropic) to observe the rigidity and/or flexibility of the part and measure parameters indicative of the rigidity and/or flexibility of the part. For instance, in some embodiments, the three-point bending test may be based on conditions defined in a standard test (e.g., ISO 178(2010)).

For example, to observe the rigidity of the subshell 85$_x$, the three-point bending test may be performed to subject the subshell 85$_x$ to loading tending to bend the subshell 85$_x$ until a predetermined deflection of the subshell 85$_x$ is reached and measure a bending load at that predetermined deflection of the subshell 85$_x$. The predetermined deflection of the subshell 85$_x$ may be selected such as to correspond to a predetermined strain of the subshell 85$_x$ at a specified point of the subshell 85$_x$ (e.g., a point of an inner surface of the subshell 85$_x$). For instance, in some embodiments, the predetermined strain of the subshell 85$_x$ may be between 3% and 5%. The bending load at the predetermined deflection of the subshell 85$_x$ may be used to calculate a bending stress at the specified point of the subshell 85$_x$. The bending stress at the specified point of the subshell 85$_x$ may be calculated as $\sigma = My/I$, where M is the moment about a neutral axis of the subshell 85$_x$ caused by the bending load, y is the perpendicular distance from the specified point of the subshell 85$_x$ to the neutral axis of the subshell 85$_x$, and I is the second moment of area about the neutral axis of the subshell 85$_x$. The rigidity of the subshell 85$_x$ can be taken as the bending stress at the predetermined strain (i.e., at the predetermined deflection) of the subshell 85$_x$. Alternatively, the rigidity of the subshell 85$_x$ may be taken as the bending load at the predetermined deflection of the subshell 85$_x$. The three-point bending test may be similarly used to determine the flexibility of the subshell 85$_x$.

A stiffness of the subshells 85$_1$-85$_L$ may be related to a modulus of elasticity (i.e., Young's modulus) of the polymeric materials $M_1$-$M_N$ associated therewith. For example, to provide a given subshell with more stiffness than another subshell, the modulus of elasticity of the polymeric materials $M_1$-$M_N$ may vary. For instance, in some embodiments, the modulus of elasticity of the polymeric material $M_x$ may be greater than the modulus of elasticity of the polymeric material $M_y$. For example, in some cases, a ratio of the modulus of elasticity of the polymeric material $M_x$ over the modulus of elasticity of the polymeric material $M_y$ may be at least 1.5, in some cases at least 2, in some cases at least 2.5, in some cases at least 3, in some cases at least 4, in some cases at least 5 and in some cases even more. This ratio may have any other suitable value in other embodiments.

In some cases, a given one of the subshells 85$_1$-85$_L$ may be configured to be denser than another one of the subshells 85$_1$-85$_L$. For instance, to provide a given subshell with more density than another subshell, the density of the polymeric materials $M_1$-$M_N$ may vary. For instance, in some embodiments, the polymeric material $M_x$ may have a density that is greater than a density of the polymeric material $M_y$. For example, in some cases, a ratio of the density of the material $M_x$ over the density of the material $M_y$ may be at least 1.1, in some cases at least 1.5, in some cases at least 2, in some cases at least 2.5, in some cases at least 3 and in some cases even more.

In this embodiment, the subshells $85_1$-$85_L$ comprise an internal subshell $85_1$, an intermediate subshell $85_2$ and an external subshell $85_3$. The internal subshell $85_1$ is "internal" in that it is an innermost one of the subshells $85_1$-$85_L$. That is, the internal subshell $85_1$ is closest to the player's foot 11 when the player dons the skate 10. In a similar manner, the external subshell $85_3$ is "external" in that is an outermost one of the subshells $85_1$-$85_L$. That is, the external subshell $85_3$ is furthest from the player's foot 11 when the player dons the skate 10. The intermediate subshell $85_2$ is disposed between the internal and external subshells $85_1$, $85_3$.

The internal, intermediate and external subshells $85_1$, $85_2$, $85_3$ comprise respective polymeric materials $M_1$, $M_2$, $M_3$. In this embodiment, the polymeric materials $M_1$, $M_2$, $M_3$ have different material properties that impart different characteristics to the internal, intermediate and external subshells $85_1$, $85_2$, $85_3$. As a result, in certain cases, a given one of the subshells $85_1$, $85_2$, $85_3$ may be more resistant to impact than another one of the subshells $85_1$, $85_2$, $85_3$, a given one of the subshells $85_1$, $85_2$, $85_3$ may be more resistant to wear than another one of the subshells $85_1$, $85_2$, $85_3$, and/or a given one of the subshells $85_1$, $85_2$, $85_3$ may be denser than another one of the subshells $85_1$, $85_2$, $85_3$.

For instance, a density of each of the internal, intermediate and external subshells $85_1$, $85_2$, $85_3$ may vary. For example, in this embodiment, the densities of the internal, intermediate and external subshells $85_1$, $85_2$, $85_3$ increase inwardly such that the density of the internal subshell $85_1$ is greater than the density of the intermediate subshell $85_2$ which in turn is greater than the density of the external subshell $85_3$. For example, the density of the internal subshell $85_1$ may be approximately 30 $kg/m^3$, while the density of the intermediate subshell $85_2$ may be approximately 20 $kg/m^3$, and the density of the external subshell $85_3$ may be approximately 10 $kg/m^3$. The densities of the internal, intermediate and external subshells $85_1$, $85_2$, $85_3$ may have any other suitable values in other embodiments. In other embodiments, the densities of the internal, intermediate and external subshells $85_1$, $85_2$, $85_3$ may increase outwardly such that the external subshell $85_3$ is the densest of the subshells $85_1$-$85_L$. In yet other embodiments, the densities of the internal, intermediate and external subshells $85_1$, $85_2$, $85_3$ may not be arranged in order of ascending or descending density.

Moreover, in this embodiment, a stiffness of the internal, intermediate and external subshells $85_1$, $85_2$, $85_3$ may vary. For example, in this embodiment, the stiffness of the internal subshell $85_1$ is greater than the respective stiffness of each of the intermediate subshell $85_2$ and the external subshell $85_3$.

In addition, in this embodiment, a thickness of the internal, intermediate and external subshells $85_1$, $85_2$, $85_3$ may vary. For example, in this embodiment, the intermediate subshell $85_2$ has a thickness that is greater than a respective thickness of each of the internal and external subshells $85_1$, $85_3$. For example, in some cases, the thickness of each of the internal, intermediate and external subshells $85_1$, $85_2$, $85_3$ may be between 0.1 mm to 25 mm, and in some cases between 0.5 mm to 10 mm. For instance, the thickness of each of the internal, intermediate and external subshells $85_1$, $85_2$, $85_3$ may be no more than 30 mm, in some cases no more than 25 mm, in some cases no more than 15 mm, in some cases no more than 10 mm, in some cases no more than 5 mm, in some cases no more than 1 mm, in some cases no more than 0.5 mm, in some cases no more than 0.1 mm and in some cases even less.

In order to provide the internal, intermediate and external subshells $85_1$, $85_2$, $85_3$ with their different characteristics, the polymeric materials $M_1$, $M_2$, $M_3$ of the internal, intermediate and external subshells $85_1$, $85_2$, $85_3$ may comprise different types of polymeric materials. For instance, in this example, the polymeric material $M_1$ comprises a generally soft and dense foam, the polymeric material $M_2$ comprises a structural foam that is more rigid than the foam of the polymeric material $M_1$ and less dense than the polymeric material $M_1$, and the polymeric material $M_3$ is a material other than foam. For example, the polymeric material $M_3$ of the external subshell $85_3$ may consist of a clear polymeric coating.

Figure 4:
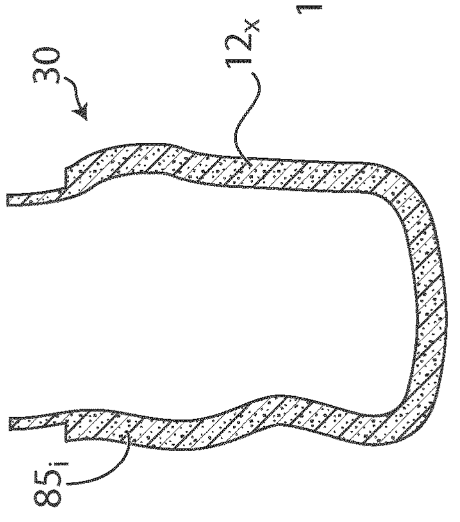
FIGS. 4 to 12 show cross-sectional views of a shell of the skate boot in accordance with various embodiments.
Figure 5:
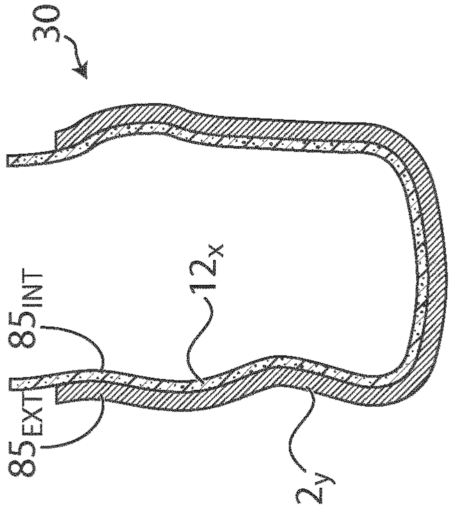

The subshells $85_1$-$85_L$ may be configured in various other ways in other embodiments. For instance, in other embodiments, the shell 30 may comprise a different number of subshells or no subshells. For example, in some embodiments, as shown in FIG. 4, the shell 30 may be a single shell and therefore does not comprise any subshells. In other embodiments, as shown in FIG. 5, the shell 30 may comprise two subshells $85_1$-$85_L$.

Figure 6:
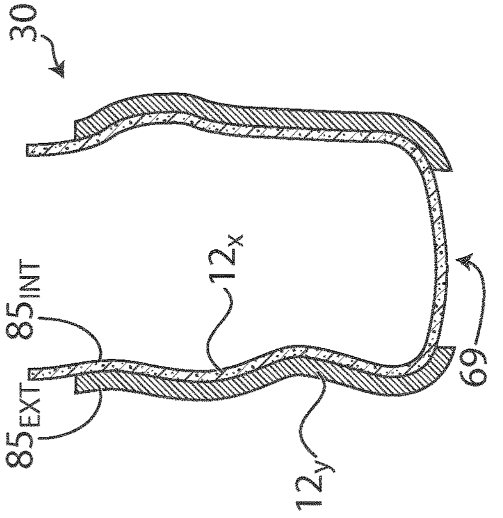
Figure 7:
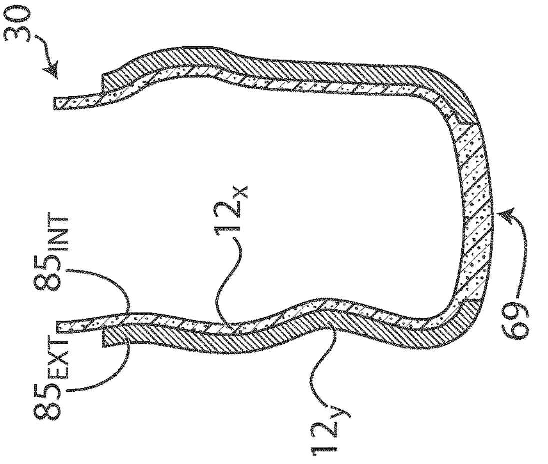
Figure 8:
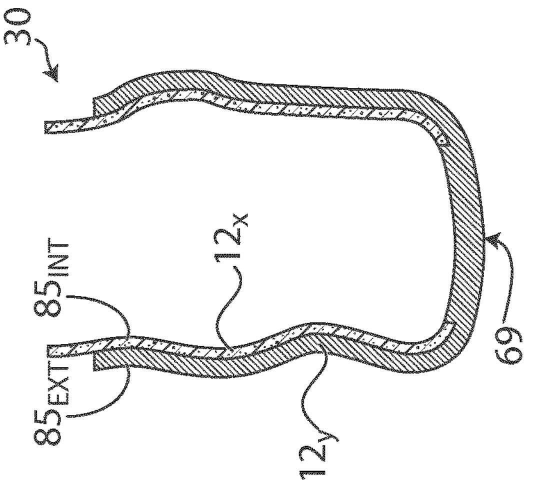
Figure 9:
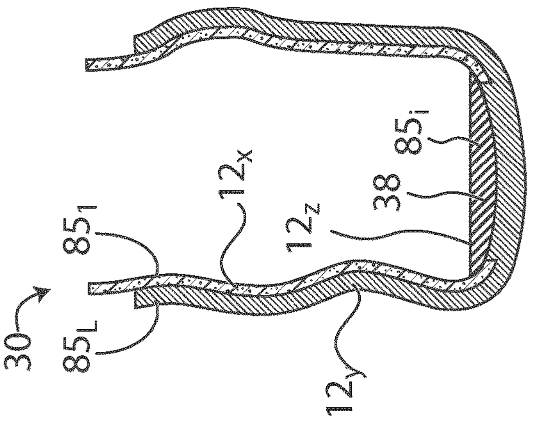

Moreover, as shown in FIGS. 6 to 8, when the shell 30 comprises two subshells, notably interior and exterior subshells $85_{INT}$, $85_{EXT}$, if the exterior subshell $85_{EXT}$ has a density that is greater than a density of the interior subshell $85_{INT}$, a given one of the subshells $85_{INT}$, $85_{EXT}$ may have an opening, which can be referred to as a gap, along at least part of the sole portion 69 of the shell 30 (e.g., along a majority of the sole portion 69 of the shell 30). For example, as shown in FIG. 6, in some embodiments, the exterior subshell $85_{EXT}$ may comprise a gap G at the sole portion 69 of the shell 30 such that the interior and exterior subshells $85_{INT}$, $85_{EXT}$ do not overlie one another at the sole portion 69 of the shell 30 (i.e., the interior subshell $85_{INT}$ may be the only subshell present at the sole portion 69 of the shell 30). As shown in FIG. 7, in an embodiment in which the exterior subshell $85_{EXT}$ has a gap at the sole portion 69 of the shell 30, the interior subshell $85_{INT}$ may project outwardly toward the exterior subshell $85_{EXT}$ at the sole portion 69 of the shell and fill in the gap of the exterior subshell $85_{EXT}$ such that a thickness of the interior subshell $85_{INT}$ is greater at the sole portion 69 of the shell 30. As another example, as shown in FIG. 8, in an embodiment in which the interior subshell $85_{INT}$ has a gap at the sole portion 69 of the shell 30, the exterior subshell $85_{EXT}$ may project inwardly toward the interior subshell $85_{INT}$ at the sole portion 69 of the shell 30 and fill in the gap of the interior subshell $85_{INT}$ such that a thickness of the exterior subshell $85_{EXT}$ is greater at the sole portion 69 of the shell 30. As shown in FIG. 9, the footbed 38 may be formed integrally with the shell 30 such as to cover at least partially an inner surface of the innermost subshell (in this case, the interior subshell $85_{INT}$) and overlie the sole portion 69 of the shell 30. In other cases, the footbed 38 may be inserted separately after the manufacture of the shell 30 has been completed.

Figure 12:
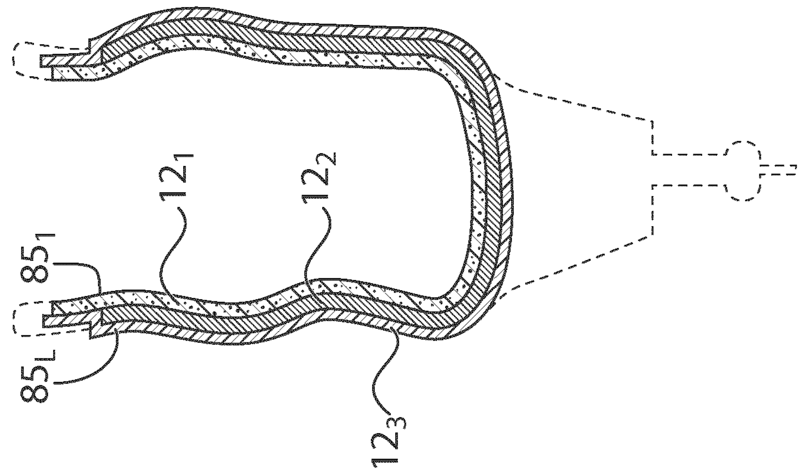
Figure 11:
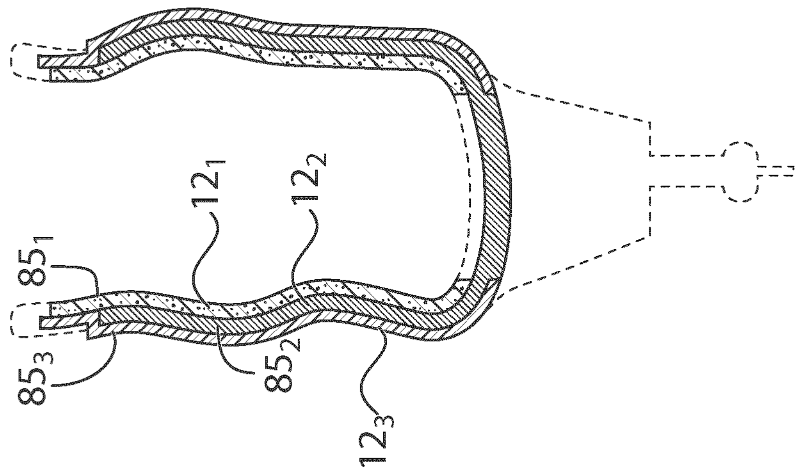
Figure 10:
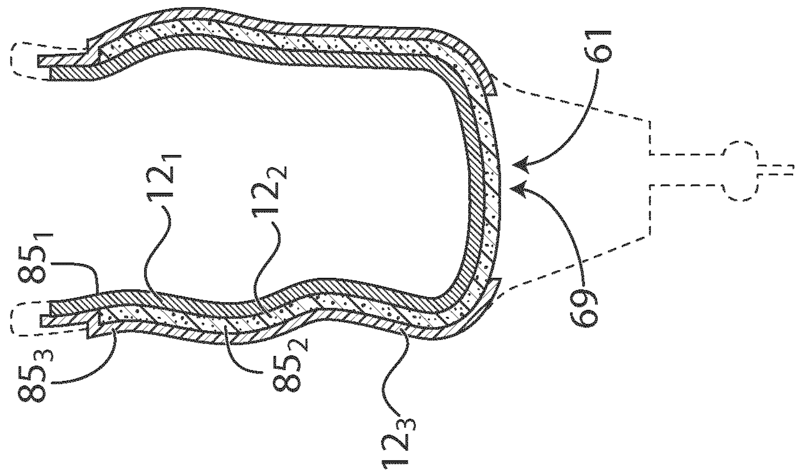

In some embodiments, as shown in FIGS. 10 to 12, when the shell 30 comprises three subshells, notably the internal, intermediate and external subshells $85_1$, $85_2$, $85_3$, and the external subshell $85_3$ has a density that is greater than a density of the intermediate subshell $85_2$, the external subshell $85_3$ may comprise a gap 61 at the sole portion 69 of the shell 30 and the intermediate subshell $85_2$ may project into the external subshell $85_3$ at the sole portion 69 of the shell 30 such as to fill in the gap 61 of the external subshell $85_3$.

In such embodiments, the intermediate subshell $85_2$ may have a greater thickness at the sole portion 69 of the shell 30.

The toe cap 14 is configured to receive the toes T of the player's foot. It comprises a medial part 61 configured to receive a big toe of the player's toes T, a lateral part 63 configured to receive a little toe of the player's toes T, and an intermediate part 65 that is between its medial part 61 and its lateral part 63 and configured to receive index, middle and ring toes of the player's toes T. The toe cap 14 comprises a distal part 52 adjacent to distal ends of the toes T of the player's foot and a proximal part 44 adjacent to proximal ends of the toes T of the player's foot.

The toe cap 14 includes rigid material. For example, in some embodiments, the toe cap 14 may be made of nylon, polycarbonate, polyurethane, polyethylene (e.g., high density polyethylene), or any other suitable thermoplastic or thermosetting polymer. Alternatively or additionally, in some embodiments, the toe cap 14 may include composite material, such as a fiber-matrix composite material comprising fibers disposed in a matrix. For instance, in some embodiments, the toe cap 14 may include a fiber-reinforced plastic (FRP— a.k.a., fiber-reinforced polymer), comprising a polymeric matrix may include any suitable polymeric resin, such as a thermoplastic or thermosetting resin, like epoxy, polyethylene, polypropylene, acrylic, thermoplastic polyurethane (TPU), polyether ether ketone (PEEK) or other polyaryletherketone (PAEK), polyethylene terephthalate (PET), polyvinyl chloride (PVC), poly(methyl methacrylate) (PMMA), polycarbonate, acrylonitrile butadiene styrene (ABS), nylon, polyimide, polysulfone, polyamide-imide, self-reinforcing polyphenylene, polyester, vinyl ester, vinyl ether, polyurethane, cyanate ester, phenolic resin, etc., a hybrid thermosetting-thermoplastic resin, or any other suitable resin, and fibers such as carbon fibers, glass fibers, polymeric fibers such as aramid fibers (e.g., Kevlar fibers), boron fibers, silicon carbide fibers, metallic fibers, ceramic fibers, etc., which may be provided as layers of continuous fibers (e.g. pre-preg (i.e., pre-impregnated) layers of fibers held together by an amount of matrix).

In this embodiment, the toe cap 14 is manufactured to impart a shape to the toe cap 14.

The facings $31_1$, $31_2$ are provided on the medial and lateral side portions 66, 68 of the body of the skate boot 22, including on an external surface 67 of the body 30. In this embodiment, the facings $31_1$, $31_2$ extend respectively along medial and lateral edges $32_1$, $32_2$ of the body 30 from the ankle portion 64 to the medial and lateral side portions 66, 68 towards the toe cap 14.

Each of the facings $31_1$, $31_2$ may comprise lacing openings 481-48L that are part of respective ones of the lacing holes $45_1$-$45_L$ to receive the lace 47. In that sense, the facings $31_1$, $31_2$ may be viewed as lacing members. In this example, each of the facings $31_1$, $31_2$ includes a void 49 to receive a given one of the medial and lateral edges $32_1$, $32_2$ of the body 30 that it straddles and that includes lacing openings $50_1$-$50_L$ which are part of respective ones of the lacing holes $45_1$-$45_L$ to receive the lace 47.

In this embodiment, each of the facings $31_1$, $31_2$ is manufactured to impart a shape to the facing. For example, each of the facings $31_1$, $31_2$ may be made from nylon or any other suitable polymeric material, such as thermoplastic polyurethane (TPU), polyvinyl chloride (PVC), or any other thermoplastic or thermosetting polymer.

In other embodiments, the facings $31_1$, $31_2$ may include any other suitable material (e.g., leather, any synthetic material that resembles leather, and/or any other suitable material).

The facings $31_1$, $31_2$ may be connected to the body 30 of the skate boot 22 in any suitable way. For instance, in some embodiments, each of the facings $31_1$, $31_2$ may be fastened to the body 30 (e.g., via stitching, staples, etc.), glued or otherwise adhesively bonded to the body 30 via an adhesive, or ultrasonically bonded to the body 30.

In this embodiment, each of the facings $31_1$, $31_2$ overlaps and is secured to the toe cap 14 (e.g., by one or more fasteners such as a mechanical fastener, like a rivet, a tack, a screw, a nail, stitching, or any other mechanical fastening device, or an adhesive). This may enhance solidity, integrity and durability of the skate boot 22 proximate to the toe cap 14 and/or may facilitate manufacturing of the skate boot 22. More particularly, in this embodiment, the facing $31_1$ overlaps and is secured to the medial side portion 61 of the toe cap 14 while the facing $31_2$ overlaps and is secured to the lateral side portion 63 of the toe cap 14.

The liner 36 of the skate boot 22 is affixed to an inner surface 37 of the body 30 and comprises an inner surface 96 for facing the heel HL and medial and lateral sides MS, LS of the player's foot 11 and ankle A. The liner 36 may be affixed to the body 30 by stitching or stapling the liner 36 to the body 30, gluing with an adhesive and/or any other suitable technique. The liner 36 may be made of a soft material (e.g., a fabric made of NYLON® fibers, polyester fibers or any other suitable fabric). The skate boot 22 may also comprise pads disposed between the shell 30 and the liner 36, including and ankle pad for facing the ankle A. The footbed 38 may include a foam layer, which may be made of a polymeric material. For example, the footbed 38, in some embodiments, may include a foam-backed fabric. The footbed 38 is mounted inside the body 30 and comprises an upper surface 106 for receiving the plantar surface PS of the player's foot 11. In this embodiment, the footbed 38 affixed to the sole portion 69 of the body 30 by an adhesive and/or any other suitable technique. In other embodiments, the footbed 38 may be removable. In some embodiments, the footbed 38 may also comprise a wall projecting upwardly from the upper surface 106 to partially cup the heel HL and extend up to a medial line of the player's foot 11.

Figure 13:
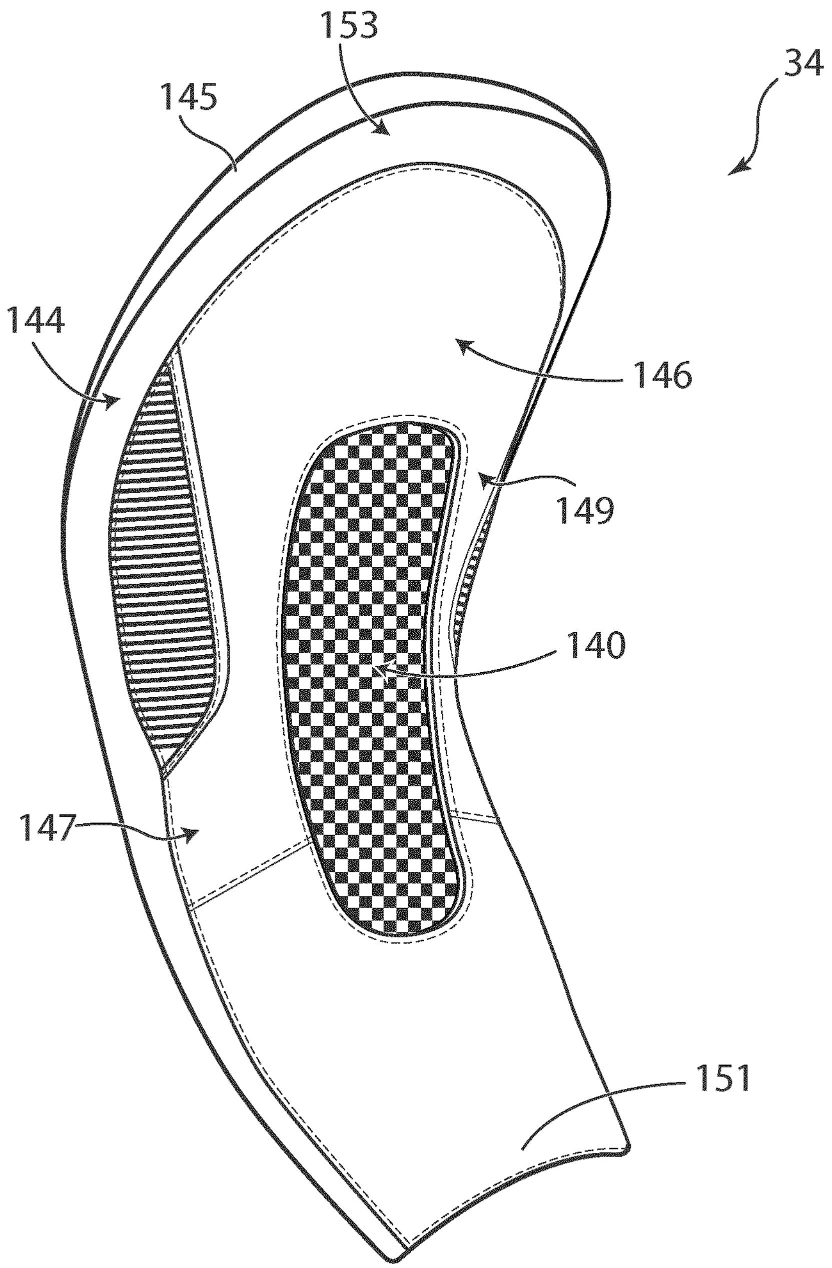
FIG. 13 shows a tendon guard of the skate boot.
Figure 14:
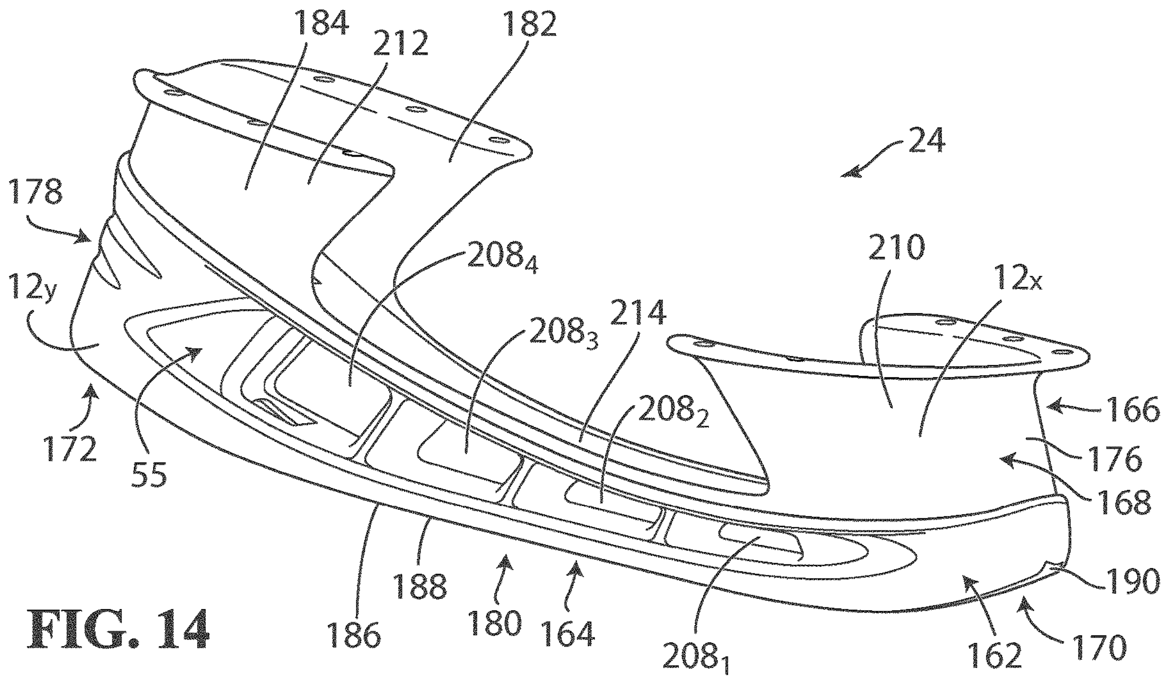
FIGS. 14 to 20 show perspective views, a lateral side view, a top view, a bottom view, a front view and a rear view of the blade holder.
Figure 15:
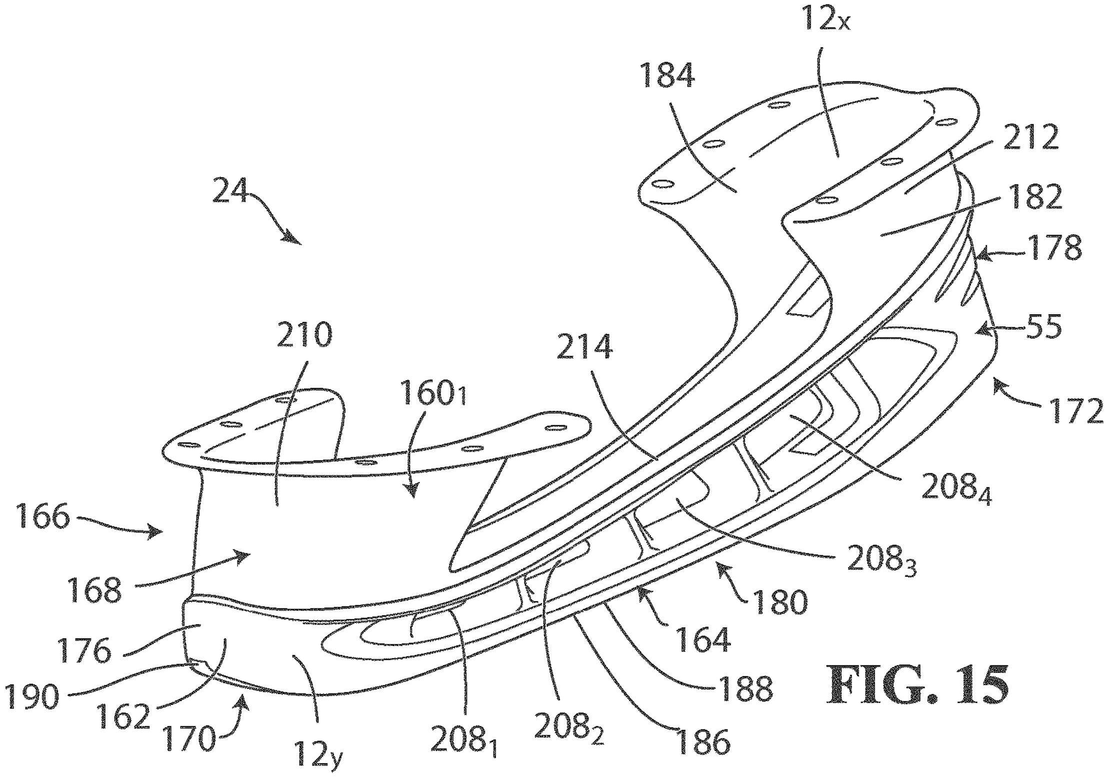
Figure 16:
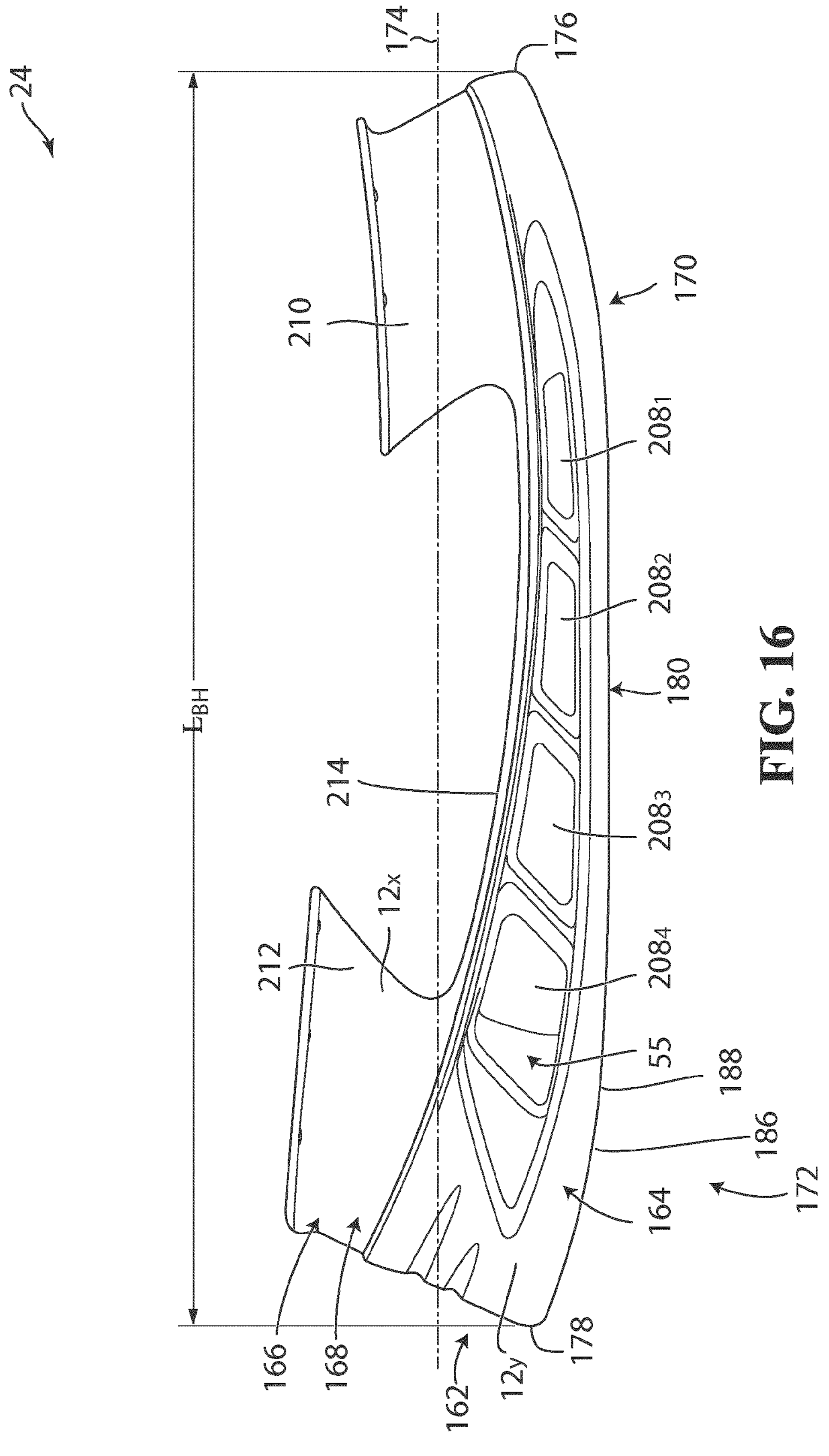
Figure 17:
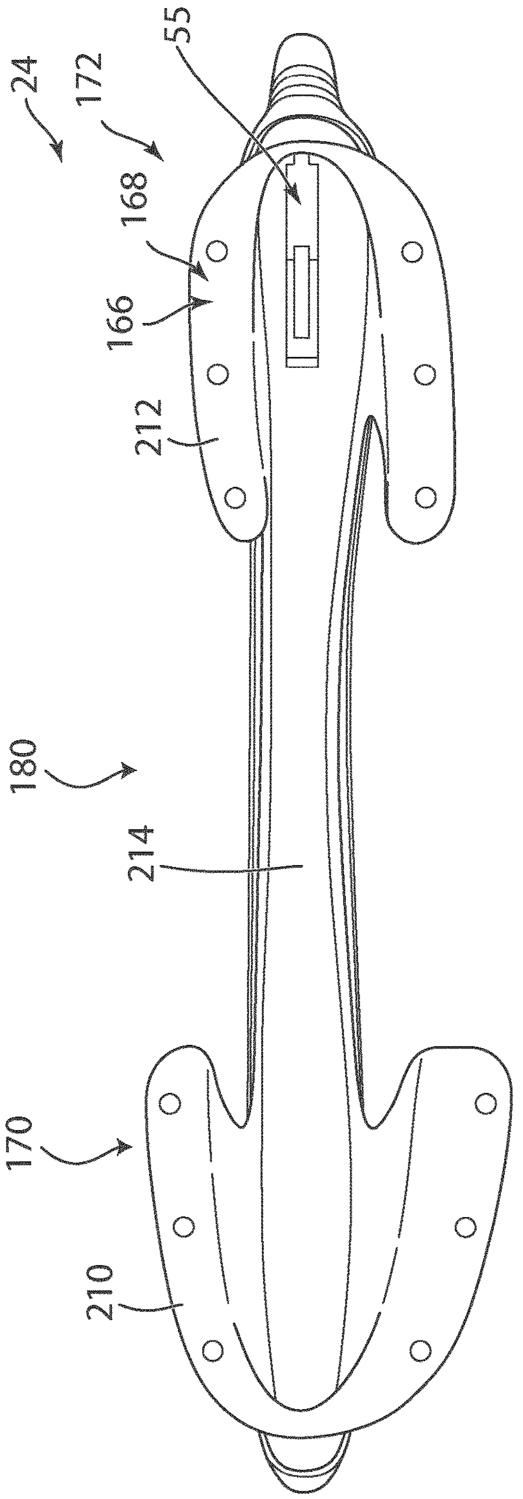
Figure 18:
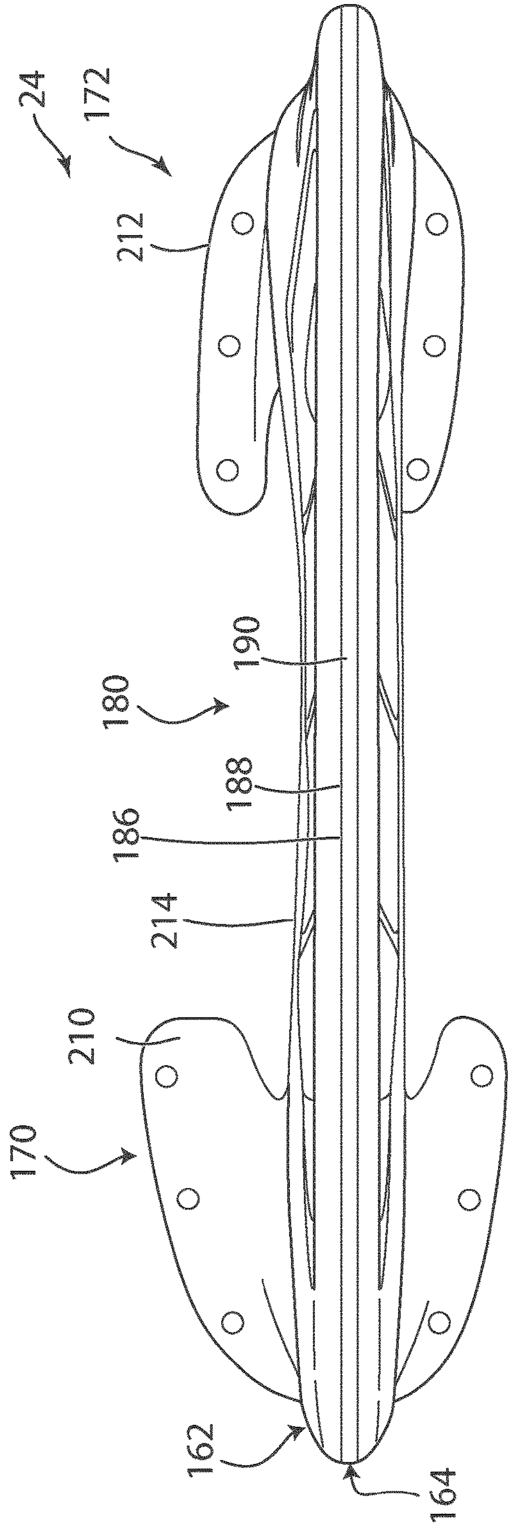
Figure 19:
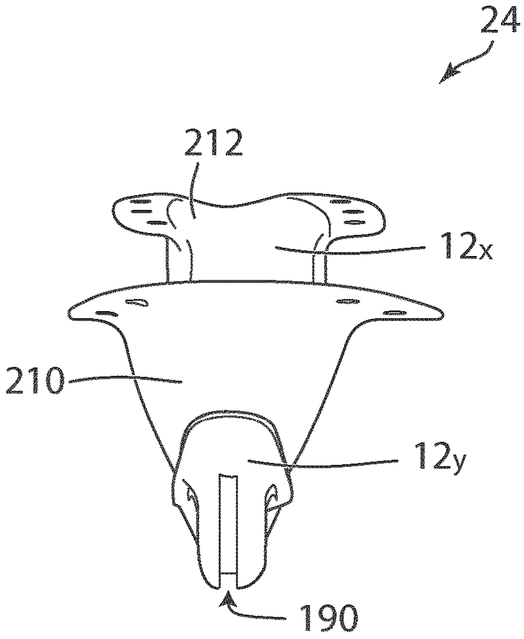
Figure 20:
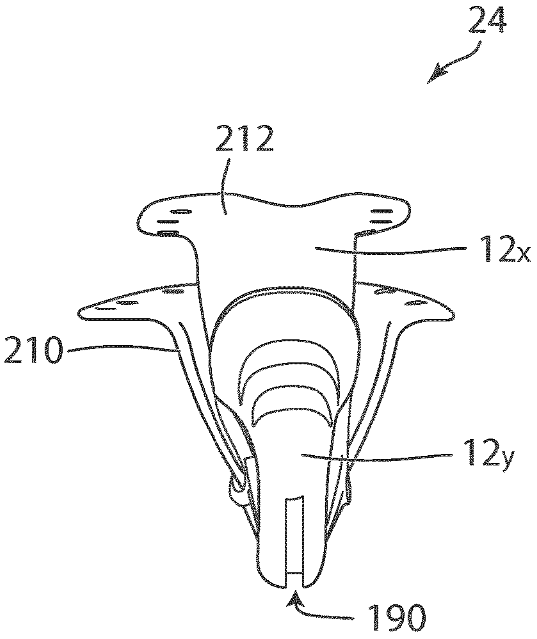

The tongue 34 extends upwardly and rearwardly from the toe portion 19 of the skate boot 22 for overlapping the top surface TS of the player's foot 11. In this embodiment, the tongue 34 is affixed to the body 30. In particular, in this embodiment, the tongue 34 is fastened to the toe cap 14. With additional reference to FIG. 13, in some embodiments, the tongue 34 comprises a core 140 defining a section of the tongue 34 with increased rigidity, a padding member (not shown) for absorbing impacts to the tongue 34, a peripheral member 94 for at least partially defining a periphery 95 of the tongue 34, and a cover member 143 configured to at least partially define a front surface of the tongue 34. The tongue 34 defines a lateral portion 147 overlying a lateral portion of the player's foot 11 and a medial portion 149 overlying a medial portion of the player's foot 11. The tongue 34 also defines a distal end portion 151 for affixing to the toe cap 14 (e.g., via stitching, riveting, welding (e.g. high-frequency welding), bonding or detachable affixing means) and a proximal end portion 153 that is nearest to the player's shin S.

Figure 21A:
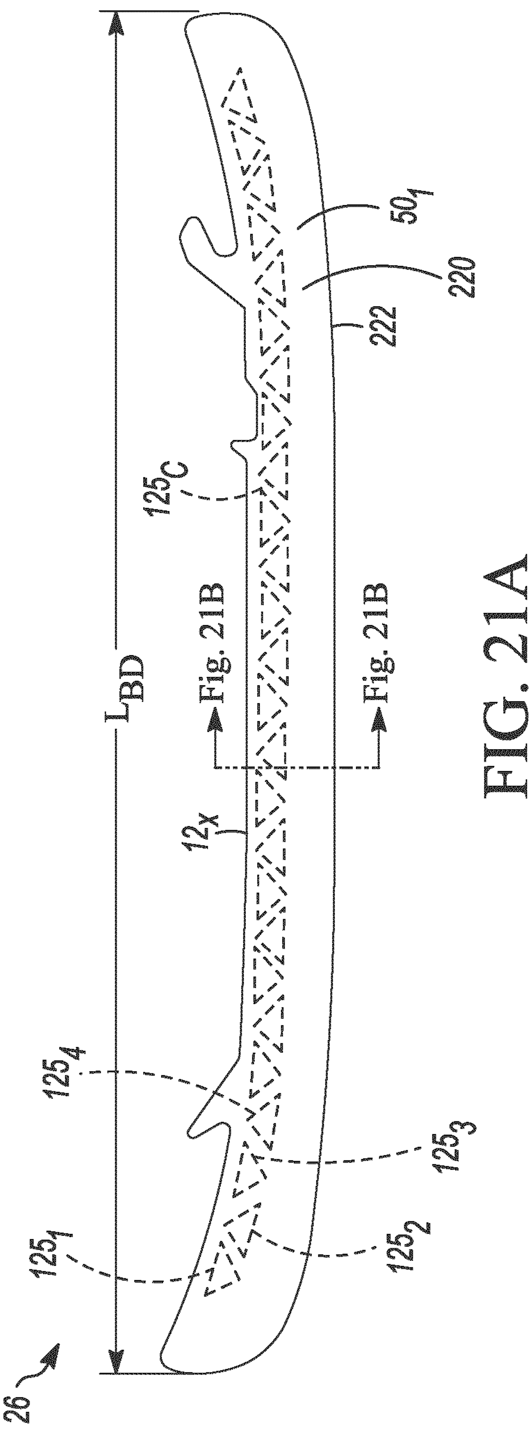
FIGS. 21A and 21B show a lateral side view and a cross-sectional view of a blade in accordance with an embodiment.
Figure 21B:
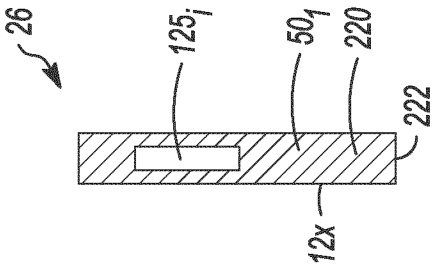

With additional reference to FIGS. 21A and 21B, the blade 26 comprises an ice-contacting material 220 including an ice-contacting surface 222 for sliding on the skating surface 13 while the player skates. In this embodiment, the ice-contacting material 220 is a metallic material (e.g., stainless steel). The ice-contacting material 220 may be any other suitable material in other embodiments.

The blade holder 24 may comprise a lower portion 162 comprising a blade-retaining base 164 that retains the blade 26 and an upper portion 166 comprising a support 168 that extends upwardly from the blade-retaining base 164 towards the skate boot 22 to interconnect the blade holder 24 and the skate boot 22, as shown in FIGS. 14 to 20. A front portion 170 of the blade holder 24 and a rear portion 172 of the blade holder 24 define a longitudinal axis 174 of the blade holder 24. The front portion 170 of the blade holder 24 includes a frontmost point 176 of the blade holder 24 and extends beneath and along the player's forefoot in use, while the rear portion 172 of the blade holder 24 includes a rearmost point 178 of the blade holder 24 and extends beneath and along the player's hindfoot in use. An intermediate portion 180 of the blade holder 24 is between the front and rear portions 170, 172 of the blade holder 24 and extends beneath and along the player's midfoot in use. The blade holder 24 comprises a medial side 182 and a lateral side 184 that are opposite one another.

The blade-retaining base 164 is elongated in the longitudinal direction of the blade holder 24 and is configured to retain the blade 26 such that the blade 26 extends along a bottom portion 186 of the blade-retaining base 164 to contact the skating surface 13. To that end, the blade-retaining base 164 comprises a blade-retention portion 188 to face and retain the blade 26. In this embodiment, the blade-retention portion 188 comprises a recess 190 in which an upper portion of the blade 26 is disposed.

Figure 23:
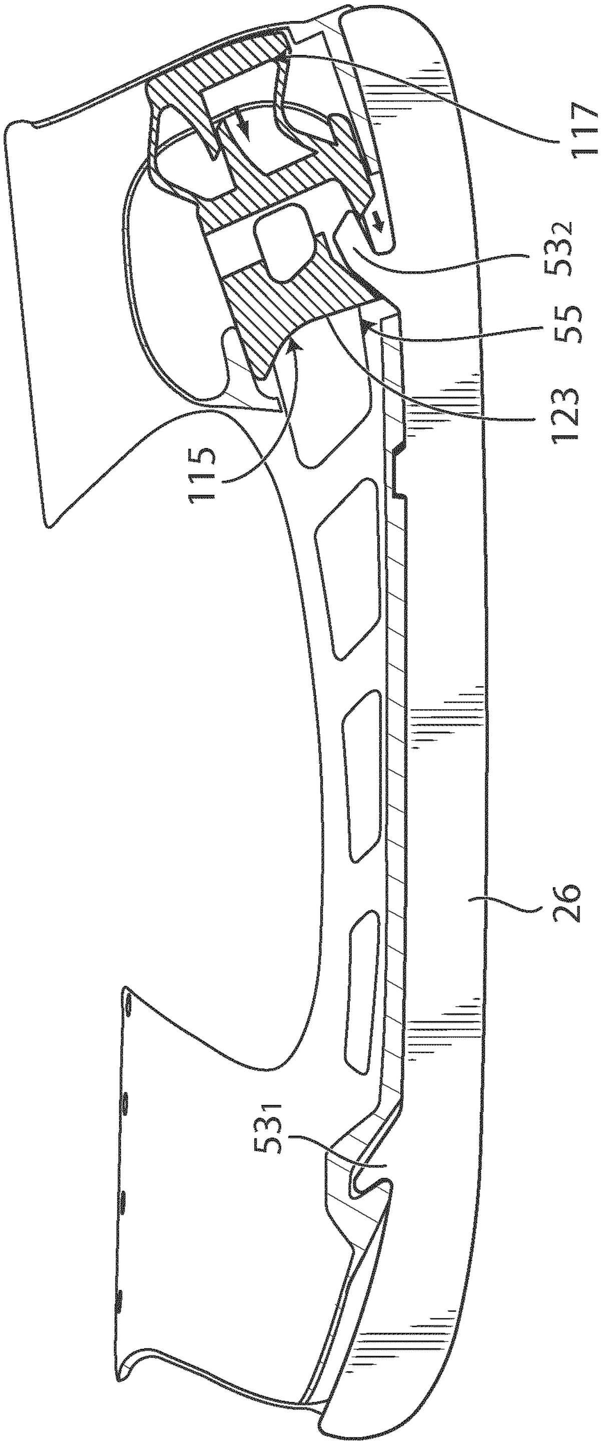
FIGS. 23 to 25 show an assembly of the blade and the blade holder comprising a blade detachment mechanism.
Figure 24:
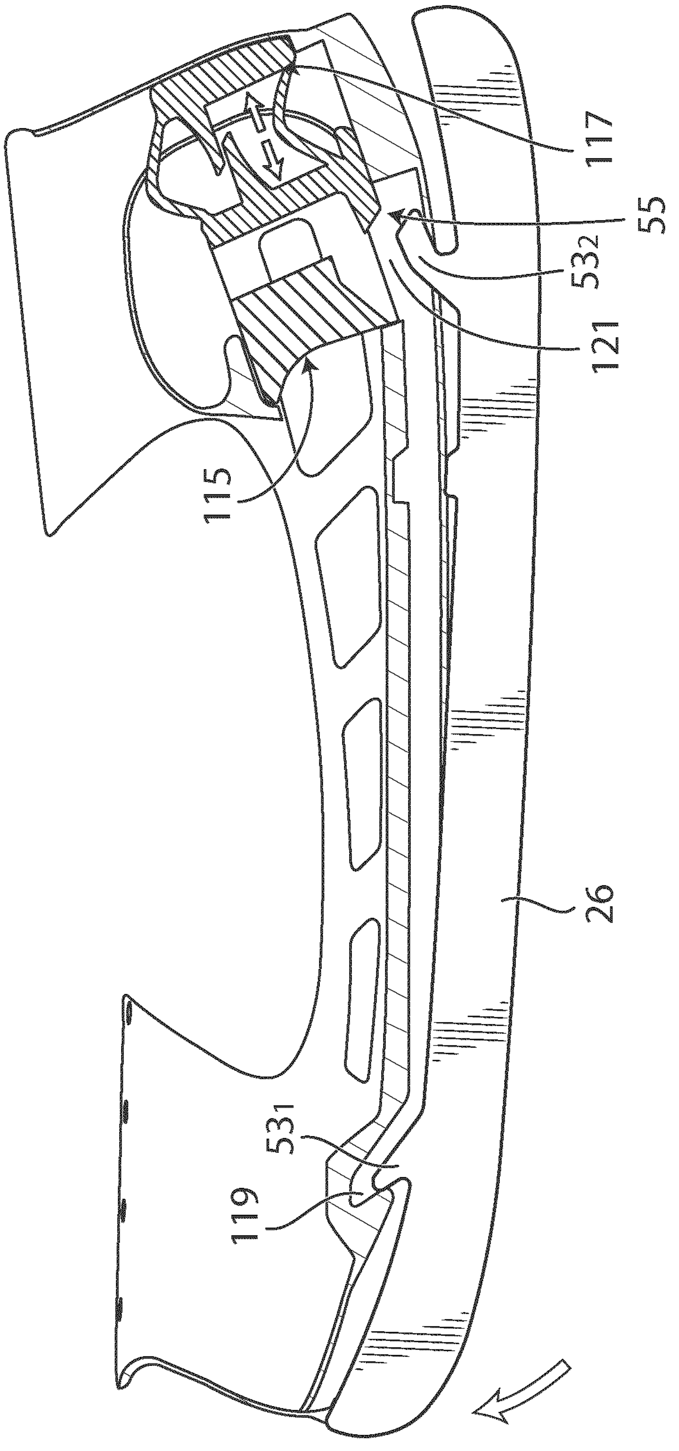
Figure 25:
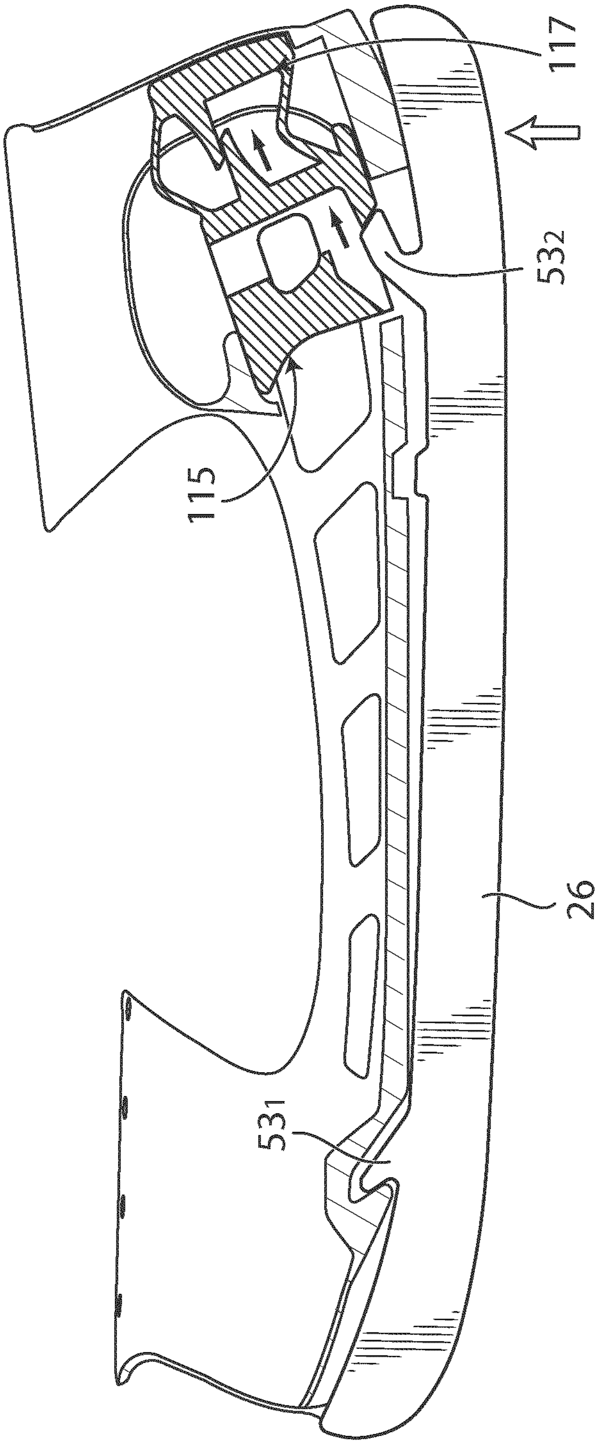

The blade holder 24 can retain the blade 26 in any suitable way. In this embodiment, with additional reference to FIGS. 23 to 25, the blade holder 24 comprises a blade-detachment mechanism 55 such that the blade 26 is selectively detachable and removable from, and attachable to, the blade holder 24 (e.g., when the blade 26 is worn out or otherwise needs to be replaced or removed from the blade holder 24) as implemented in U.S. Pat. Nos. 8,454,030, 8,534,680 and U.S. patent application Ser. No. 15/388,679, which are hereby incorporated by reference herein.

Figure 26:
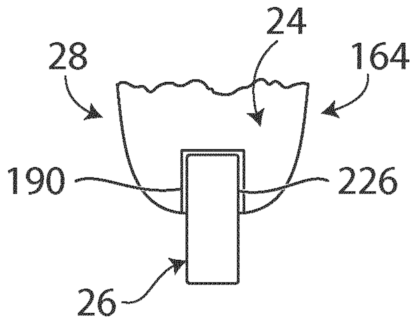
FIGS. 26 to 29 show variants of the assembly of the blade and the blade holder and of the blade detachment mechanism.
Figure 27:
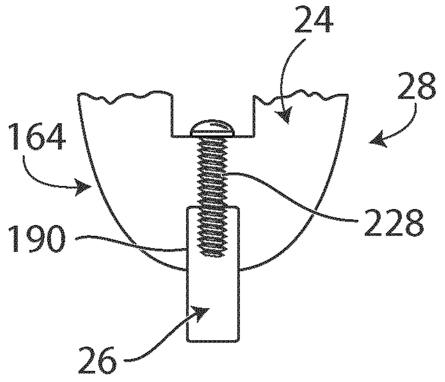
Figure 28:
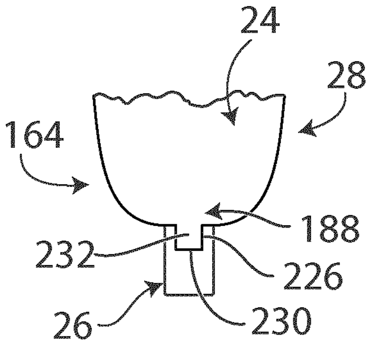
Figure 29:
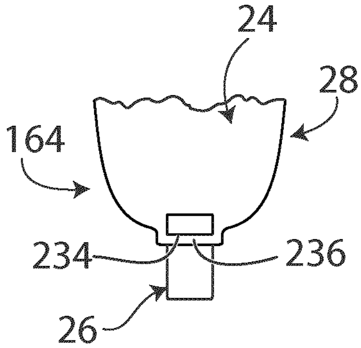
Figure 30:
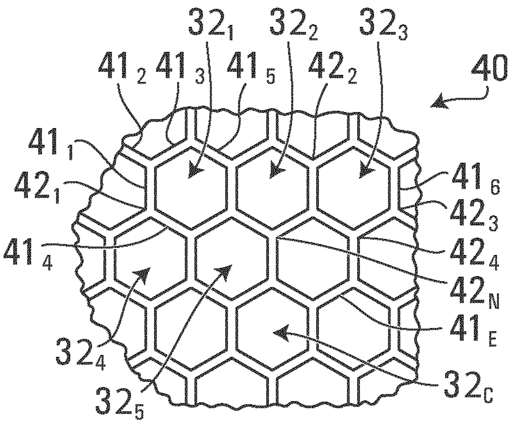
FIGS. 30 to 34 show examples of framework of the additively-manufactured components comprising a lattice.
Figure 31:
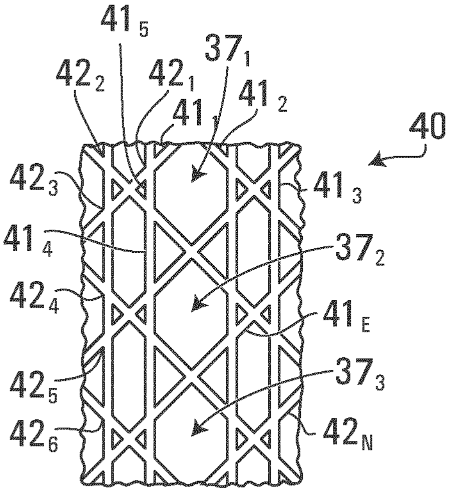
Figure 32:
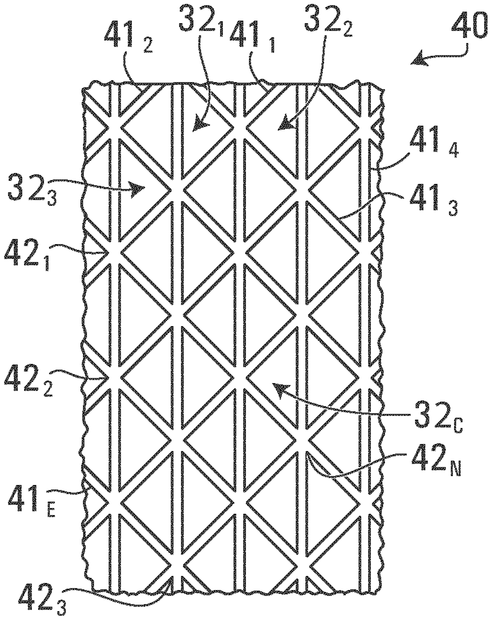
Figure 33:
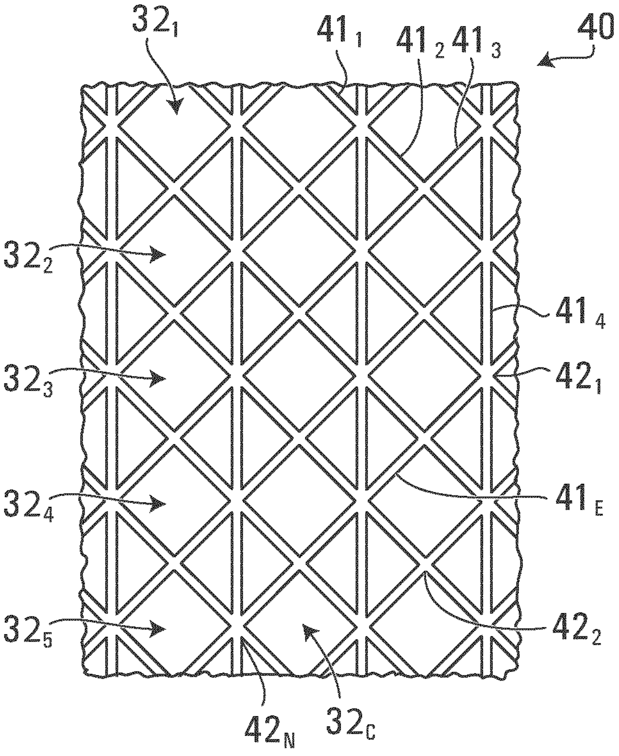
Figure 34:
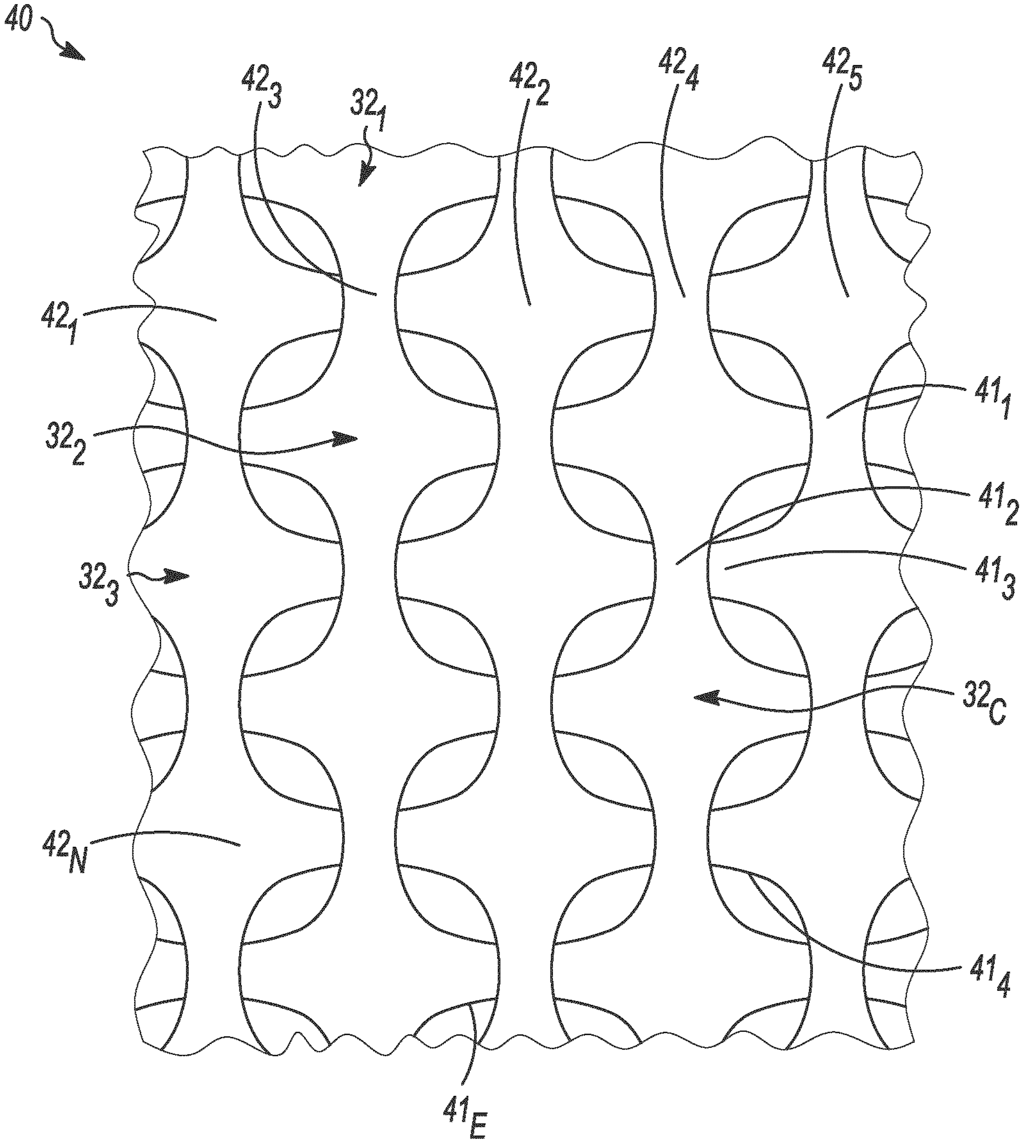

In other embodiments, the blade 26 may be permanently affixed to the blade holder 24 (i.e., not intended to be detached and removed from the blade holder 24). For example, as shown in FIG. 29, the blade 26 and the blade-retaining base 164 of the blade holder 24 may be mechanically interlocked via an interlocking portion 234 of one of the blade-retaining base 164 and the blade 26 that extends into an interlocking void 236 of the other one of the blade-retaining base 164 and the blade 26. In some embodiments, as shown in FIGS. 26 to 29, the blade holder 24 may retain the blade 26 using an adhesive 226 and/or one or more fasteners 228. For instance, in some embodiments, as shown in FIG. 26, the recess 190 of the blade holder 24 may receive the upper portion of the blade 26 that is retained by the adhesive 226. The adhesive 226 may be an epoxy-based adhesive, a polyurethane-based adhesive, or any suitable adhesive. In some embodiments, instead of or in addition to using an adhesive, as shown in FIG. 27, the recess 190 of the blade holder 24 may receive the upper part of the blade 26 that is retained by the one or more fasteners 228. Each fastener 228 may be a rivet, a screw, a bolt, or any other suitable mechanical fastener. Alternatively or additionally, in some embodiments, as shown in FIG. 28, the blade-retention portion 188 of the blade holder 24 may extend into a recess 230 of the upper part of the blade 26 to retain the blade 26 using the adhesive 226 and/or the one or more fasteners 228. For instance, in some cases, the blade-retention portion 188 of the blade-retaining base 164 of the blade holder 24 may comprise a projection 232 extending into the recess 230 of the blade 26.

In this embodiment, the blade-retaining base 164 comprises a plurality of apertures $208_1$-$208_4$ distributed in the longitudinal direction of the blade holder 24 and extending from a medial side 182 to a lateral side 184 of the blade holder 24. In this example, respective ones of the apertures $208_1$-$208_4$ differ in size. The apertures $208_1$-$208_4$ may have any other suitable configuration, or may be omitted, in other embodiments.

The blade-retaining base 164 may be configured in any other suitable way in other embodiments.

The support 168 is configured for supporting the skate boot 22 above the blade-retaining base 164 and transmit forces to and from the blade-retaining base 164 during skating. In this embodiment, the support 168 comprises a front pillar 210 and a rear pillar 212 which extend upwardly from the blade-retaining base 164 towards the skate boot 22. The front pillar 210 extends towards a front portion 56 of the skate boot 22 and the rear pillar 212 extends towards a rear portion 58 of the skate boot 22. The blade-retaining base 164 extends from the front pillar 210 to the rear pillar 212. More particularly, in this embodiment, the blade-retaining base 164 comprises a bridge 214 interconnecting the front and rear pillars 210, 212.

In this embodiment, the additively-manufactured components $12_1$-$12_A$ of the skate 10 constitute one or more parts of the skate boot 22 and/or one or more parts of the skating device 28. More specifically, the additively-manufactured components $12_1$-$12_A$ of the skate 10 constitute one or more parts of each one of the subshells $85_1$-$85_L$ of the shell 30, the toe cap 14, the facings $31_1$, $31_2$, the liner 36, the tongue 34, the blade 26, the lower portion 162 of the blade holder 24 and the support 168 of the blade holder 24. Inversely, each one of the skate boot 22 and the skating device 28 may comprise at least part of (i.e. part of or an entirety of) each one of the additively-manufactured components $12_1$-$12_A$ of the skate 10. More specifically, in this embodiment, each one of the subshells $85_1$-$85_L$ of the shell 30, the tendon guard 20, the toe cap 14, the facings $31_1$, $31_2$, the liner 36, the tongue 34, the insole 18, the footbed 38, the blade 26, the lower portion 162 of the blade holder 24 and the support 168 of the blade holder 24 is made of a distinct one of the additively-manufactured components $12_1$-$12_A$.

Each AM component $12_x$ of the skate 10 may be configured to enhance performance and use of the skate 10, such as fit and comfort, power transfer to the skating surface 13, durability, customability, foot protection, cost efficiency and/or other aspects of the skate 10.

The AM component $12_x$ of the skate 10 may be implemented in any suitable way in various embodiments.

For example, in this embodiment, the AM component $12_x$ may include a lattice 40 which is additively-manufactured such that AM component $12_x$ has an open structure. The lattice can be designed and 3D-printed to impart properties and functions of the AM component $12_x$, such as those discussed above, while helping to minimize its weight.

The lattice 40 comprises a framework of structural members $41_1$-$41_E$ that intersect one another. In some embodiments, the structural members $41_1$-$41_E$ may be arranged in a regular arrangement repeating over the lattice 40. In some cases, the lattice 40 may be viewed as made up of unit cells $32_1$-$32_C$ each including a subset of the structural members $41_1$-$41_E$ that forms the regular arrangement repeating over the lattice 40. Each of these unit cells $32_1$-$32_C$ can be viewed as having a voxel, which refers to a notional three-dimensional space that it occupies. In other embodiments, the structural members $41_1$-$41_E$ may be arranged in different arrangements over the lattice 40 (e.g., which do not necessarily repeat over the lattice 40, do not necessarily define unit cells, etc.).

Examples of framework for the lattice 40 are shown in FIGS. 30 to 34. In some embodiments, the framework of the lattice 40 may define a hollow lattice having a lattice pattern that is observable in exploded view, as shown in the examples of FIGS. 9 to 13. In other embodiments, the framework of the lattice 40 may not be hollow or observable in exploded view, as shown in other exemplary lattices at FIGS. 52 to 54. It is further noted that some lattices are not hollow or observable in exploded view while they have a lattice pattern that is similar to a lattice pattern of hollow lattices—in other words, in some embodiments, the lattice pattern of hollow lattices may be used to form a non-hollow lattice.

The lattice 40, including its structural members $41_1$-$41_E$, may be configured in any suitable manner.

Figure 35:
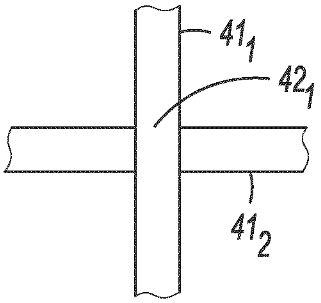
FIGS. 35 and 36 show elongate members of the lattice forming a node in accordance with an embodiment.
Figure 36:
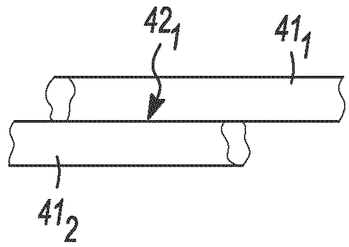
Figure 37:
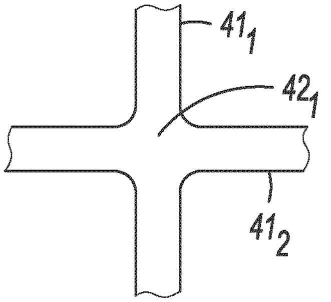
FIGS. 37 and 38 show the elongate members of the lattice forming the node in accordance with another embodiment.
Figure 38:
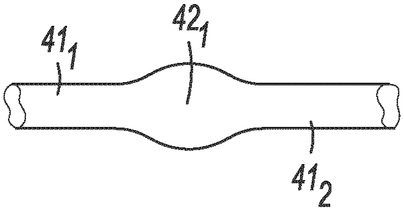
Figure 39:
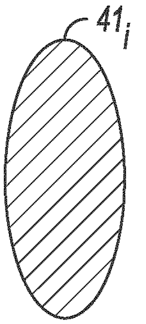
FIGS. 39 to 44 show cross-sectional shapes of the elongate members of the lattice in accordance with various embodiments.
Figure 40:
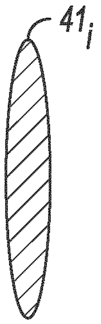
Figure 41:
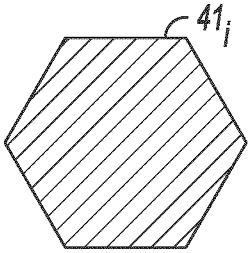
Figure 42:
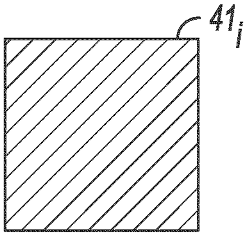
Figure 43:
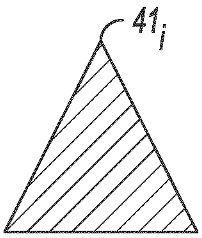
Figure 44:
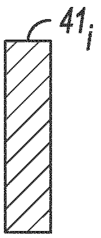

In this embodiment, the structural members $41_1$-$41_E$ are elongate members that intersect one another at nodes $42_1$-$42_N$. The elongate members $41_1$-$41_E$ may sometimes be referred to as "beams" or "struts". Each of the elongate members $41_1$-$41_E$ may be straight, curved, or partly straight and partly curved. While in some embodiments at least some of the nodes $42_1$-$42_N$ (i.e. some of the nodes $42_1$-$42_N$ or every one of the nodes $42_1$-$42_N$) may be formed by having the structural members $41_1$-$41_E$ forming the nodes affixed to one another (e.g., chemically fastened, via an adhesive, etc.), as shown in FIGS. 35 and 36, in some embodiments at least some of the nodes $42_1$-$42_N$ (i.e. some of the nodes $42_1$-$42_N$ or every one of the nodes $42_1$-$42_N$) may be formed by having the structural members $41_1$-$41_E$ being unitary (e.g., integrally made with one another, fused to one another, etc.), as shown in FIGS. 37 and 38. Also, in this embodiment, the nodes $42_1$-$42_N$ may be thicker than respective ones of the elongate members $41_1$-$41_E$ that intersect one another thereat, as shown in FIGS. 36 and 38, while in other embodiments the nodes $42_1$-$42_N$ may have a same thickness as respective ones of the elongate members $41_1$-$41_E$ that intersect one another thereat.

In this embodiment, the structural members $41_1$-$41_E$ may have any suitable shape, as shown in FIGS. 39 to 44. That is, a cross-section of a structural member $41_i$ across a longitudinal axis of the structural member $41_i$ may have any suitable shape, for instance: a circular shape, an oblong shape, an elliptical shape, a square shape, a rectangular shape, a polygonal shape (e.g. triangle, hexagon, and so on), etc.

Figure 45:
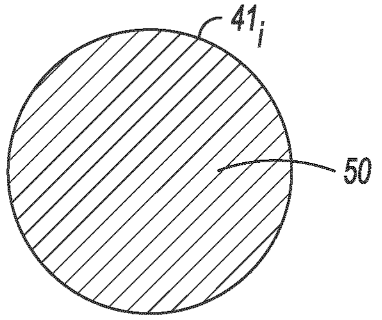
FIGS. 45 to 50 show cross-sectional structures of the elongate members of the lattice in accordance with various embodiments.
Figure 46:
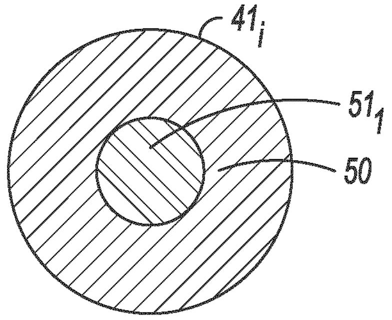
Figure 47:
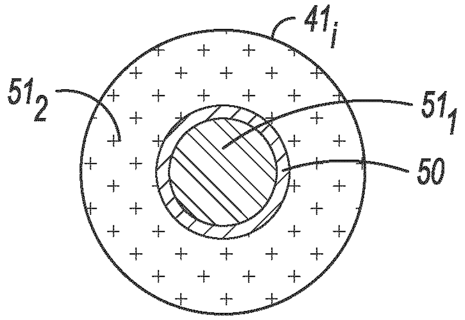
Figure 48:
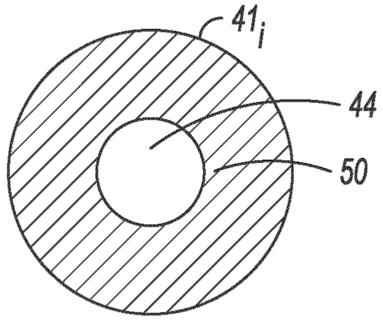
Figure 49:
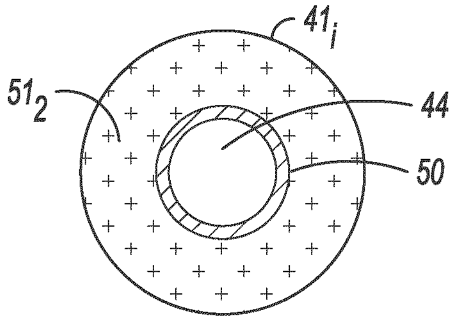
Figure 50:
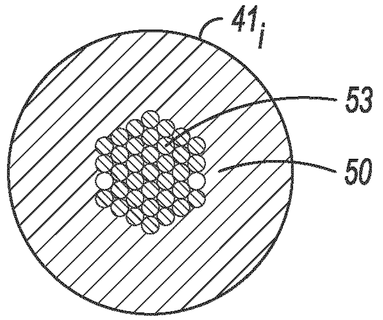

Moreover, in this embodiment, the structural member $41_i$ may comprise any suitable structure and any suitable composition, as shown in FIGS. 45 to 50. As an example, the structural member $41_i$ may be solid (i.e. without any void) and composed of a material 50, as shown in FIG. 45. In another embodiment, the structural member $41_i$ may comprise the material 50 and another material $51_1$ inner to the material 50, as shown in FIG. 46. In another embodiment, the structural member $41_i$ may comprise the material 50, the other material $51_1$ inner to the material 50 and another material 512 outer to the material 50, as shown in FIG. 47. In another embodiment, the structural member 41 may be composed of the material 50 and may comprise a void 44 that is not filled by any specific solid material, as shown in FIG. 48. In another embodiment, the structural member $41_i$ may comprise the material 50, another material outer to the material 50 and the void 44 that is not filled by any specific solid material, as shown in FIG. 49. In another embodiment, the structural member $41_i$ may comprise the material 50 and a plurality of reinforcements 53 (e.g. continuous or chopped fibers), as shown in FIG. 50.

Figure 55:
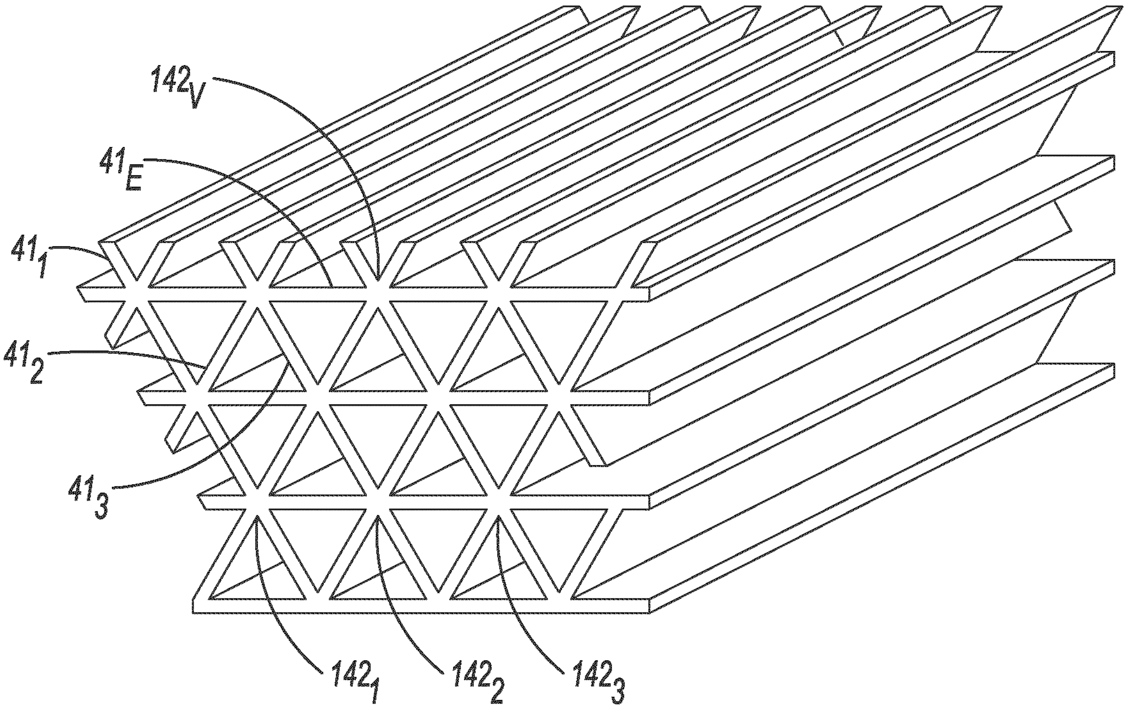
FIG. 55 shows a variant of the lattice.

In other embodiments, the structural members $41_1$-$41_E$ of the lattice 40 may be implemented in various other ways. For example, in some embodiments, as shown in FIG. 55, the structural members $41_1$-$41_E$ may be planar members that intersect one another at vertices $142_1$-$142_V$. The planar members $41_1$-$41_E$ may sometimes be referred to as "faces". Each of the planar members $41_1$-$41_E$ may be straight, curved, or partly straight and partly curved. Although in the example shown in FIG. 55 the planar structural members $41_1$-$41_E$ are all parallel to a common axis, in some embodiments, the planar structural members $41_1$-$41_E$ may not be parallel to a common axis.

The 3D-printed material 50 constitutes the lattice 40. Specifically, the elongate members $41_1$-$41_E$ and the nodes $42_1$-$42_N$ of the lattice 40 include respective parts of the 3D-printed material 50 that are created by the 3D-printer.

Figure 3:
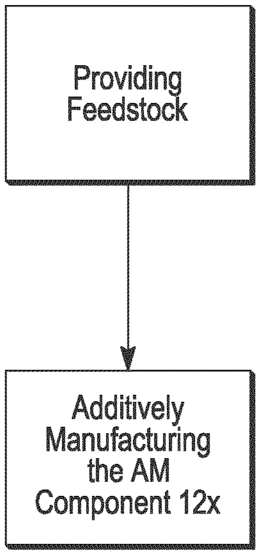
FIG. 3 shows a method of manufacturing the additively-manufactured components.

Practically, a method for making the AM component $12_x$ may include the steps of providing feedstock (corresponding to the material 50) and additively manufacturing the AM component 12, as shown in FIG. 3.

In some example of implementations, the 3D-printed material 50 includes polymeric material. For instance, in this embodiment, the 3D-printed material 50 may include polyethylene, polypropylene, polyurethane (PU), ethylene-vinyl acetate (EVA), nylon, polyester, vinyl, polyvinyl chloride, polycarbonate, an ionomer resin (e.g., Surlyn®), styrene-butadiene copolymer (e.g., K-Resin®) etc.), and/or any other thermoplastic or thermosetting polymer.

In some cases, the 3D-printed material 50 may be a composite material. More particularly, in some embodiments, the 3D-printed material 50 is fiber-reinforced composite material comprising fibers disposed in a matrix. For instance, in some embodiments, the 3D-printed material 50 may be fiber-reinforced plastic (FRP— a.k.a., fiber-reinforced polymer), comprising a polymeric matrix may include any suitable polymeric resin, such as a thermoplastic or thermosetting resin, like epoxy, polyethylene, polypropylene, acrylic, thermoplastic polyurethane (TPU), polyether ether ketone (PEEK) or other polyaryletherketone (PAEK), polyethylene terephthalate (PET), polyvinyl chloride (PVC), poly(methyl methacrylate) (PMMA), polycarbonate, acrylonitrile butadiene styrene (ABS), nylon, polyimide, polysulfone, polyimide-imide, self-reinforcing polyphenylene, polyester, vinyl ester, vinyl ether, polyurethane, cyanate ester, phenolic resin, etc., a hybrid thermosetting-thermoplastic resin, or any other suitable resin, and fibers such as carbon fibers, glass fibers, polymeric fibers such as aramid fibers (e.g., Kevlar fibers), boron fibers, silicon carbide fibers, metallic fibers, ceramic fibers, etc. In some embodiments, the fibers of the fiber-reinforced composite material 50 may be provided as layers of continuous fibers deposited along with rapidly-curing resin forming the polymeric matrix. In other embodiments, the fibers of the fiber-reinforced composite material 50 may be provided as fragmented (e.g., chopped) fibers dispersed in the polymeric matrix.

In such cases, as it includes the fiber-reinforced composite material 50, the lattice 40 may be 3D-printed using continuous-fiber 3D printing technology. For instance, in some embodiments, this may allow each of one or more of the fibers of the fiber-reinforced composite material 50 to extend along at least a significant part, such as at least a majority (i.e., a majority or an entirety), of a length of the lattice 40

(e.g., monofilament winding). This may enhance the strength, the impact resistance, and/or other properties of the AM component 12$_x$.

In other examples of implementation, the 3D-printed material 50 may include metallic material (e.g., steel such as stainless steel, aluminum, titanium).

In yet other examples of implementation, the 3D-printed material 50 may include ceramic material.

In some embodiments, the material 50 of the lattice 40 may be identical throughout the lattice 40. In other embodiments, the material 50 of the lattice 40 may be different in different parts of the lattice 40. For example, in some embodiments, the material 50 of the lattice 40 at the heel portion 62 of the shell 30 may be different from the material 50 of the portion 80$_3$ of the lattice 40 at the medial side portion 66 of the shell 30. In this embodiments, the different materials 50 of the different portions of the lattice 40 are both polymeric materials. In other embodiments, the different materials 50 of the different portions of the lattice 40 may comprise a polymeric material and a metallic material, or a ceramic material and a metallic material, or a polymeric material, a ceramic material and a metallic material.

The AM component 12$_x$ of the skate 10 may be designed to have properties of interest in various embodiments, depending on the function of the AM component 12$_x$.

For example, in some embodiments, a stiffness of the AM component 12$_x$ may be no more than 800 N/mm, in some cases no more than 600 N/mm, in some cases no more than 400 N/mm, in some cases no more than 200 N/mm, in some cases even less (e.g., no more than 150 N/mm) and/or at least 150 N/mm, in some cases at least 350 N/mm, in some cases at least 550 N/mm, in some cases at least 750 N/mm, and in some cases even more (e.g., at least 800 N/mm), when the AM component 12$_x$ is either the blade 26, a given one of the subshells 85$_1$-85$_L$ of the shell 30, or the toe cap 14. The stiffness of the AM component 12$_x$ may be measured by a method which depends on the nature of the AM component 12$_x$. For example, when the AM component 12$_x$ is the blade 26, the stiffness may be determined by a three-point bending test where a bending load is applied to the AM component 12$_x$, a deflection of the AM component 12$_x$ is measured where the bending load is applied, and the bending load is divided by the deflection. In another example, when the AM component 12$_x$ is a given one of the subshells 85$_1$-85$_L$ of the shell 30, the stiffness may be determined by a Sharmin test. In another example, when the AM component 12$_x$ is the toe cap 14, the stiffness may be determined by a toe compression test. The stiffness of the AM component 12$_x$ may be no more than 150 KPa/mm, in some cases no more than 70 KPa/mm, in some cases no more than 7 KPa/mm, in some cases even less (e.g., no more than 4 KPa/mm) and/or at least 4 KPa/mm, in some cases at least 35 KPa/mm, in some cases at least 70 KPa/mm, and in some cases even more (e.g., at least 150 KPa/mm) when the AM component 12$_x$ is either the liner 36, the tongue 34, the insole 18 or the footbed 38. In this example, the stiffness of the AM component 12$_x$ may be measured by compression test.

As another example, in some embodiments, a resilience of the AM component 12$_x$ at least 100 J, in some cases at least 140 J, in some cases at least 150 J, in some cases at least 175 J, in some cases at least 200 J, and in some cases even more (e.g., at least 225), when the AM component 12$_x$ is either the blade 26, a given one of the subshells 85$_1$-85$_L$ of the shell 30, or the toe cap 14, in order to resist to impacts with the hockey rink and/or the hockey puck.

As another example, in some embodiments, the AM component 12$_x$ may have anisotropic properties even if the material of the AM component 12$_x$ is isotropic. That is, mechanical properties of the AM component 12$_x$ may vary depending on the direction of the stress. For example, in some embodiments, a stiffness of the AM component 12$_x$ may be greater in a longitudinal direction of the skate 10 than in a thicknesswise direction of the skate 10, and in some embodiments, a flexibility of the AM component 12$_x$ may be lower in the longitudinal direction of the skate 10 than in the thicknesswise direction of the skate 10.

This may be achieved by having a greater number of elongated members 41$_1$-41$_E$ extending in the longitudinal direction of the skate 10 than elongated members 41$_1$-41$_E$ extending in the thicknesswise direction of the skate 10. For example, in some embodiments, a ratio of the number of elongated members 41$_1$-41$_E$ of the AM component 12$_x$ extending within 30° of the longitudinal direction of the skate 10 over the number of elongated members 41$_1$-41$_E$ AM component 12$_x$ extending within 30° of the thicknesswise direction of the skate 10 may be at least 1.1, in some embodiments 1.5, in some embodiments 2, in some embodiments 4, in some embodiments even more.

In particular, in this embodiment, the AM component 12$_x$ may have a maximal stiffness in a first pre-determined direction of the AM component 12$_x$ and a minimal stiffness in a second pre-determined direction of the AM component 12$_x$. The first and second pre-determined directions of the AM component 12$_x$ may have any suitable relative position. For instance, in some embodiments, the first and second pre-determined directions of the AM component 12$_x$ may form an angle between 15° and 30°, in some embodiments between 30° and 45°, in some embodiments between 45° and 60°, in some embodiments in some embodiments between 60° and 75°, in some embodiments between 75° and 90°, in some embodiments about 90°. In some embodiments, a ratio of the maximal stiffness in the first pre-determined direction of the AM component 12$_x$ over the minimal stiffness in the second pre-determined direction of the AM component 12$_x$ may be at least 2, in some embodiments at least 4, in some embodiments at least 6, in some embodiments at least 10, and in some embodiments even more.

In this embodiment, the AM component 12$_x$ may have a maximal flexibility in a third pre-determined direction of the AM component 12$_x$ and a minimal flexibility in a fourth pre-determined direction of the AM component 12$_x$. The third and fourth pre-determined directions of the AM component 12$_x$ may have any suitable relative position. For instance, in some embodiments, the third and fourth pre-determined directions of the AM component 12$_x$ may form an angle between 15° and 30°, in some embodiments between 30° and 45°, in some embodiments between 45° and 60°, in some embodiments in some embodiments between 60° and 75°, in some embodiments between 75° and 90°, in some embodiments about 90°. More particularly, in this embodiment, the third pre-determined direction of the AM component 12$_x$ may correspond to the second pre-determined direction of the AM component 12$_x$ and the fourth pre-determined direction of the AM component 12$_x$ may correspond to the first pre-determined direction of the AM component 12$_x$. In some embodiments, a ratio of the maximal flexibility in the third pre-determined direction of the AM component 12$_x$ over the minimal flexibility in the fourth pre-determined direction of the AM component 12$_x$ may be at least 2, in some embodiments at least 4, in some embodiments at least 6, in some embodiments at least 10, and in some embodiments even more.

In some embodiments, the lattice 40 may include distinct zones $\mathbf{80}_1$-$\mathbf{80}_z$ that are structurally different from one another. For instance, this may be useful to modulate properties, such as the strength, flex, stiffness, etc., of the zones $\mathbf{80}_1$-$\mathbf{80}_z$ of the lattice 40.

In this embodiment. the distinct zones $\mathbf{80}_1$-$\mathbf{80}_z$ of the lattice 40 of the additively-manufactured component $\mathbf{12}_x$ include at least three distinct zones $\mathbf{80}_1$, $\mathbf{80}_2$, $\mathbf{80}_3$. For example, the zones $\mathbf{80}_1$-$\mathbf{80}_z$ of the lattice 40 of the subshell $\mathbf{85}_x$ may include a zone $\mathbf{80}_1$ at the heel portion 62 of the shell 30, a zone $\mathbf{80}_2$ at the ankle portion 64 of the shell 30, and zones $\mathbf{80}_3$,$\mathbf{80}_4$ at the medial and lateral side portions 66, 68 of the shell 30.

In this embodiment, delimitations of the zones $\mathbf{80}_1$-$\mathbf{80}_z$ of the lattice 40 are configured to match different parts of the skate 10 which may be subject to different stresses and may require different mechanical properties. Accordingly, the zones $\mathbf{80}_1$-$\mathbf{80}_z$ of the lattice 40 may have different mechanical properties to facilitate skating, to increase power transmission and/or energy transmission from the wearer's foot 11 to the skating surface 13 to the puck during skating, to lighten the skate 10, to increase impact resistance and/or impact protection of the skate 10, to reduce manufacturing costs, and so on.

Mechanical properties of the zones $\mathbf{80}_1$-$\mathbf{80}_z$ of the lattice 40 may be achieved by any suitable means.

For example, in some embodiments, a shape of the unit cells $\mathbf{32}_1$-$\mathbf{32}_c$ of each zone $\mathbf{80}_i$ may be pre-determined to increase or diminished the aforementioned mechanical properties.

As another example, in some embodiments, the voxel (or size) of the unit cells $\mathbf{32}_1$-$\mathbf{32}_c$ of each zone $\mathbf{80}_i$ may be pre-determined to increase or diminished the aforementioned mechanical properties.

As another example, in some embodiments, a thickness of elongate members $\mathbf{41}_1$-$\mathbf{41}_E$ of each zone $\mathbf{80}_i$ may be pre-determined to increase or diminished the aforementioned mechanical properties.

As another example, in some embodiments, the material 50 of each zone $\mathbf{80}_i$ may be pre-determined to increase or diminished the aforementioned mechanical properties.

As such, in some embodiments, the shape of the unit cells $\mathbf{32}_1$-$\mathbf{32}_c$ (and thus the shape of the elongate members $\mathbf{41}_1$-$\mathbf{41}_E$ and/or nodes $\mathbf{42}_1$-$\mathbf{42}_N$), the voxel (or size) of the unit cells $\mathbf{32}_1$-$\mathbf{32}_c$, a thickness of elongate members $\mathbf{41}_1$-$\mathbf{41}_E$ of each zone $\mathbf{80}_i$, a density of the lattice 40 and/or the material 50 of each zone $\mathbf{80}_i$ may vary between the zones 801-80*z*.

Figure 51:
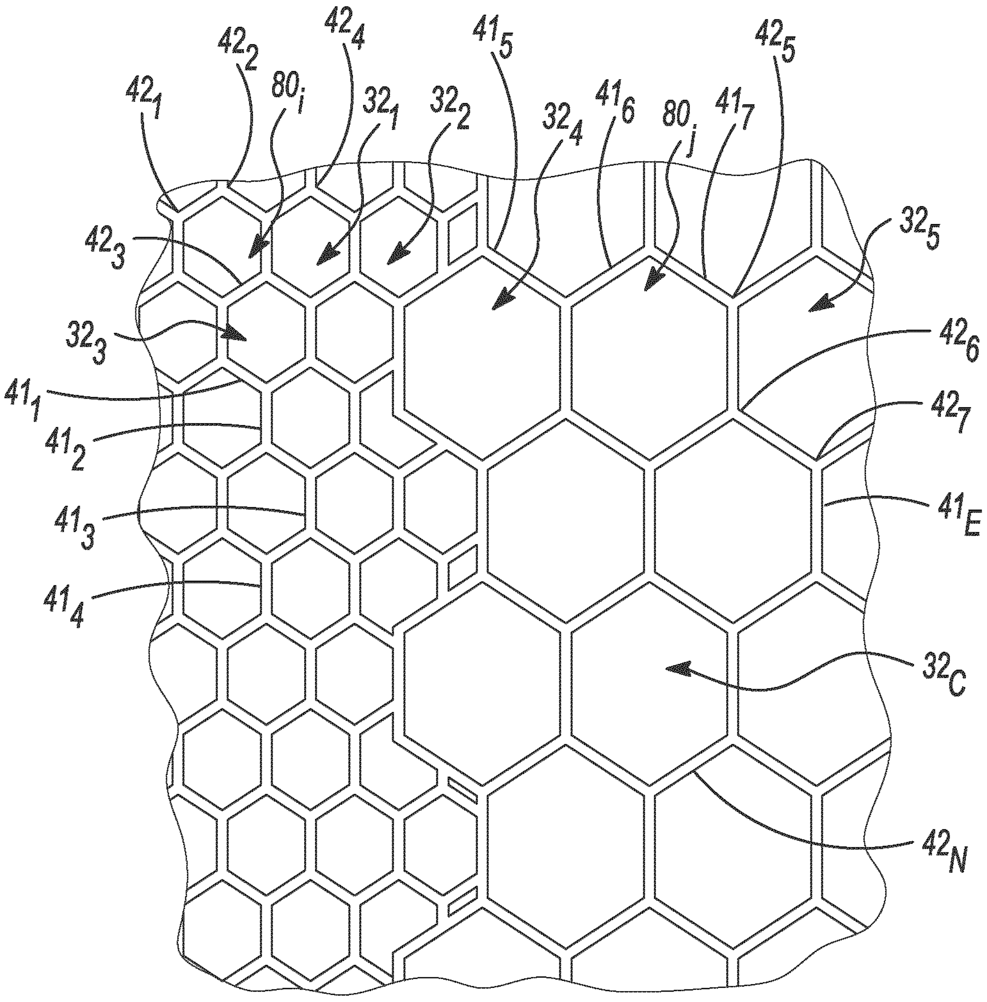
FIG. 51 shows an intersection between two zones of the lattice having different voxel sizes.
Figure 52:
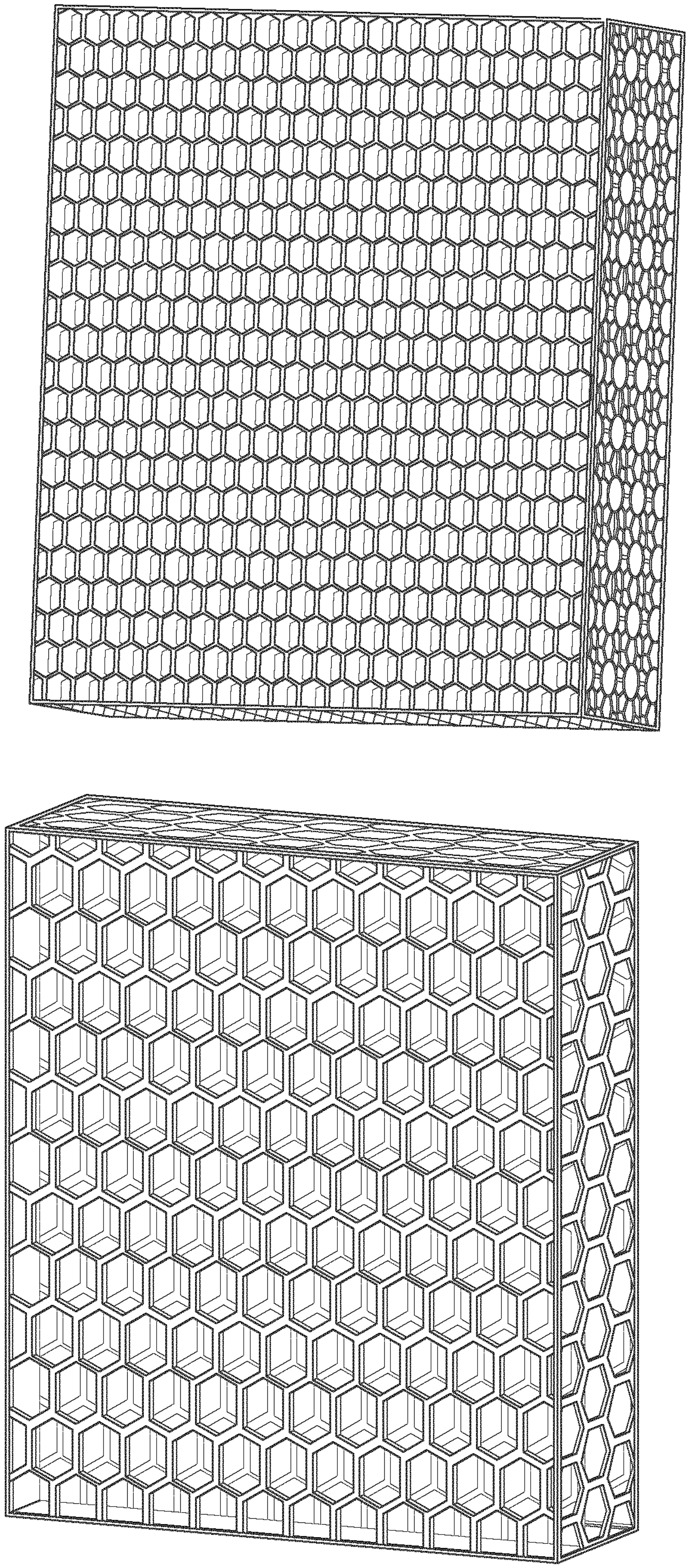
FIG. 52 shows two distinct non-hollow lattices having different voxel sizes.
Figure 53:
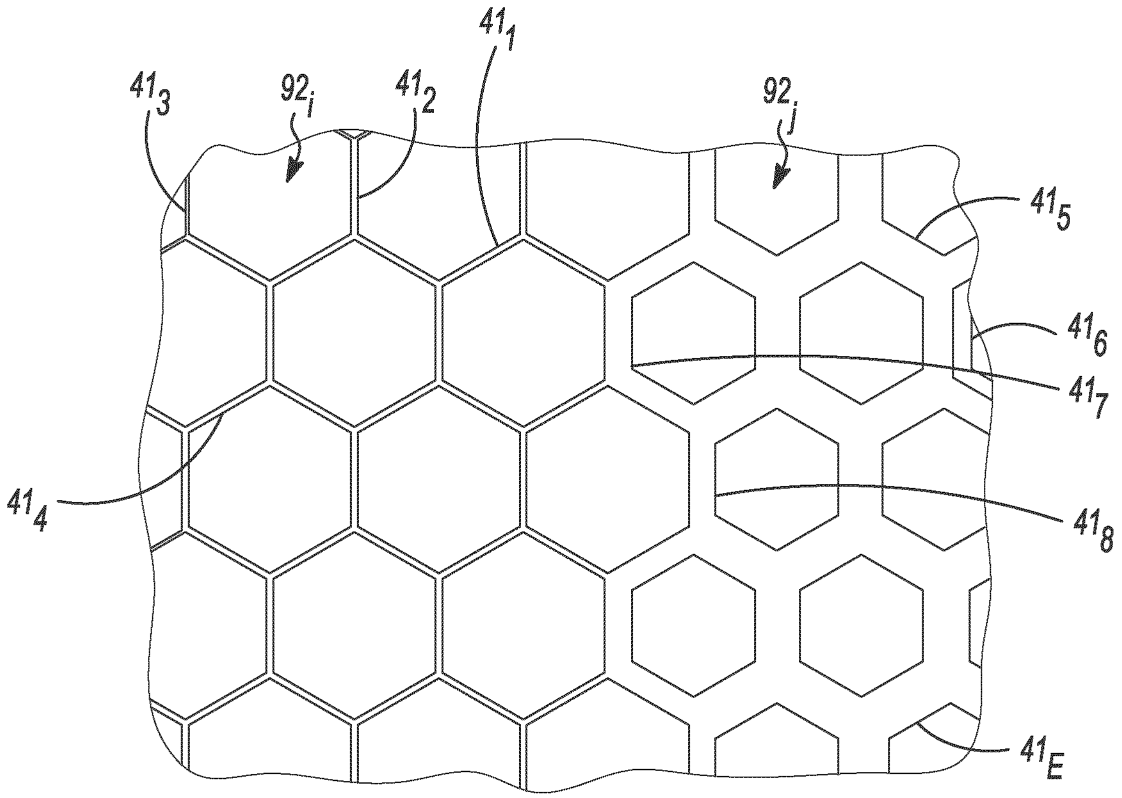
FIG. 53 shows an intersection between two zones of the lattice having elongate members and/or nodes of different thicknesses (or different "struts size")
Figure 54:
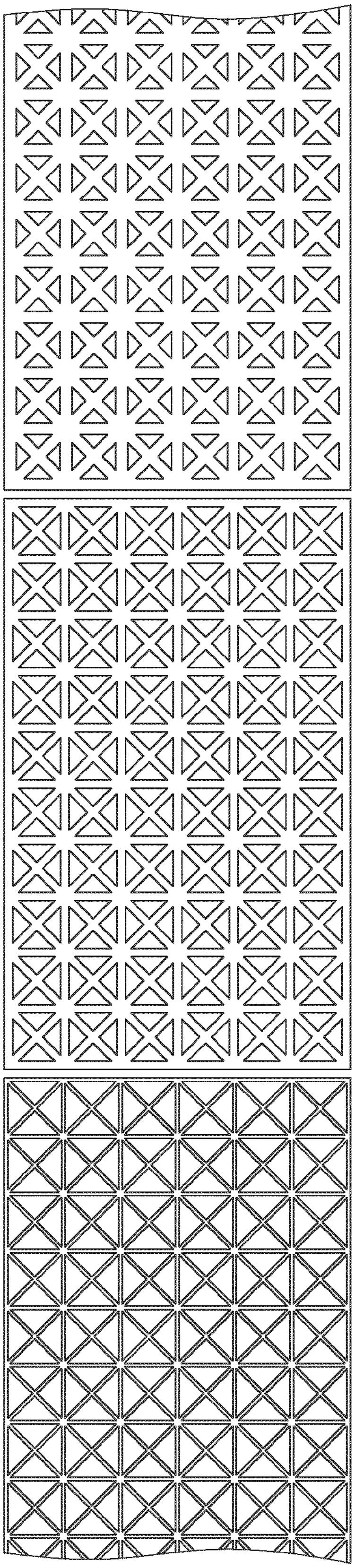
FIG. 54 shows three distinct non-hollow lattices having elongate members and/or nodes of different thicknesses (or different "struts size")

For instance, in some embodiments, adjacent ones of the nodes $\mathbf{42}_1$-$\mathbf{42}_N$ in one zone $\mathbf{80}_i$ of the lattice 40 may be closer to one another than adjacent ones of the nodes $\mathbf{42}_1$-$\mathbf{42}_N$ in another zone of the lattice 40, as shown in FIGS. 51 and 52, and/or the thickness of the elongate members $\mathbf{41}_1$-$\mathbf{41}_E$ and nodes $\mathbf{42}_1$-$\mathbf{42}_N$ in one zone $\mathbf{80}_i$ of the lattice 40 may be greater than the thickness of the elongate members $\mathbf{41}_1$-$\mathbf{41}_E$ and nodes $\mathbf{42}_1$-$\mathbf{42}_N$ in another zone $\mathbf{80}_j$ of the lattice 40, as shown in FIGS. 53 and 54. In other words, in some embodiments, the density of the lattice 40 in a first one of the distinct zones $\mathbf{80}_1$-$\mathbf{80}_z$ is greater than the density of the lattice 40 in a second one of the distinct zones $\mathbf{80}_1$-$\mathbf{80}_z$. This may be achieved by having a spacing of elongate members $\mathbf{41}_1$-$\mathbf{41}_E$ of the lattice 40 in the first one of the distinct zones $\mathbf{80}_1$-$\mathbf{80}_z$ that is less than the spacing of elongate members $\mathbf{41}_1$-$\mathbf{41}_E$ of the lattice 40 in the second one of the distinct zones $\mathbf{80}_1$-$\mathbf{80}_z$ of the lattice 40 and/or by having cross-sectionally larger elongate members $\mathbf{41}_1$-$\mathbf{41}_E$ in the first one of the distinct zones $\mathbf{80}_1$-$\mathbf{80}_z$ than in the second one of the distinct zones $\mathbf{80}_1$-$\mathbf{80}_z$. For example, in some embodiments, a ratio of the density of a given one of the zones $\mathbf{80}_1$-$\mathbf{80}_z$ of the lattice 40 over the density of another one of the zones $\mathbf{80}_1$-$\mathbf{80}_z$ of the lattice may be at least 5%, in some embodiments at least 15%, in some embodiments even more.

In some embodiments, also, an orientation of elongate members $\mathbf{41}_1$-$\mathbf{41}_E$ of the lattice 40 in the first one of the distinct zones $\mathbf{80}_1$-$\mathbf{80}_z$ may be different from the orientation of elongate members $\mathbf{41}_1$-$\mathbf{41}_E$ of the lattice 40 in the second one of the distinct zones $\mathbf{80}_1$-$\mathbf{80}_z$.

In this embodiment, the distinct zones $\mathbf{80}_1$-$\mathbf{80}_z$ of the lattice 40 differ in stiffness. For example, in some embodiments, a ratio of the stiffness of a given one of the zones $\mathbf{80}_1$-$\mathbf{80}_z$ of the lattice 40 over the stiffness of another one of the zones $\mathbf{80}_1$-$\mathbf{80}_z$ of the lattice may be at least 5%, in some embodiments at least 15%, in some embodiments even more.

The first stiffer one of the distinct zones $\mathbf{80}_1$-$\mathbf{80}_z$ of the lattice 40 may be configured to be located where more force is applied during a skating stride and/or where more power transfer is desired, and the second less stiff one of the distinct zones $\mathbf{80}_1$-$\mathbf{80}_z$ of the lattice 40 may be configured to be located where less force is applied during the skating stride and/or where more comfort is desired.

In this embodiment, the distinct zones $\mathbf{80}_1$-$\mathbf{80}_z$ of the lattice 40 differ in resilience. For example, in some embodiments, a ratio of the resilience of a given one of the zones $\mathbf{80}_1$-$\mathbf{80}_z$ of the lattice 40 over the resilience of another one of the zones $\mathbf{80}_1$-$\mathbf{80}_z$ of the lattice may be at least 5%, in some embodiments at least 15%, in some embodiments even more.

In this embodiment, a material composition of the lattice 40 in the first one of the distinct zones $\mathbf{80}_1$-$\mathbf{80}_z$ is different from the material composition of the lattice 40 in the second one of the distinct zones $\mathbf{80}_1$-$\mathbf{80}_z$.

Examples of the additively-manufactured components $\mathbf{12}_1$-$\mathbf{12}_A$ constituting one or more parts of the skate boot 22 and/or one or more parts of the skating device 28 in various embodiments are discussed below.

In this embodiment, the shell 30 of the skate boot 22 comprises at least part of a given one of the AM components $\mathbf{12}_1$-$\mathbf{12}_A$. The AM components $\mathbf{12}_1$-$\mathbf{12}_A$ may allow the shell 30 to be customizable and to have desired comfort and stiffness properties over different zones of the wearer's foot 11.

In this embodiment, the liner 36 of the skate boot 22 comprises at least part of the additively-manufactured components $\mathbf{12}_1$-$\mathbf{12}_A$. The pads, including the ankle pad, of the skate boot 22, disposed between the shell 30 and the liner 36, may also comprise at least part of the AM components $\mathbf{12}_1$-$\mathbf{12}_A$. The AM components $\mathbf{12}_1$-$\mathbf{12}_A$ may allow the liner 36 and the pads to fit to the wearer's foot 11 and to provide desired comfort and stiffness over different zones of the wearer's foot 11.

In this embodiment, the tongue 34 of the skate boot 22 comprises at least part of the additively-manufactured components $\mathbf{12}_1$-$\mathbf{12}_A$. The AM components $\mathbf{12}_1$-$\mathbf{12}_A$ may allow the tongue 34 to be relatively lightweight, yet to provide high protection against flying puck. For example, the tongue 34 may have an increased protection by having an increased thickness while having a diminished weight relative to a traditional tongue (i.e. without AM components). For example, in some embodiments, a ratio of the thickness of the tongue 34 over a thickness of a traditional tongue may be at least 1.05, in some embodiments at least 1.1, in some embodiments at least 1.2, in some embodiments at least 1.5, in some embodiments at least 2, in some embodiments even more.

In this embodiment, the facings $31_1$, $31_2$ of the skate boot 22 comprises at least part of the additively-manufactured components $12_1$-$12_A$. The AM components $12_1$-$12_A$ may allow the facings $31_1$, $31_2$ to be lightweight, durable, at relatively stiff. Additionally, the AM components $12_1$-$12_A$ may allow the facings $31_1$, $31_2$ to be customizable and to have desired comfort and stiffness properties over different portions of the wearer's foot 11. The positioning, number and shape of the eyelets $46_1$-$46_E$, and shape of the facings $31_1$, $31_2$, may also be customizable for the wearer specific needs.

In this embodiment, the tendon guard 63 of the skate boot 22 comprises at least part of the additively-manufactured components $12_1$-$12_A$. The AM components $12_1$-$12_A$ may allow the tendon guard 63 to be lightweight, to have an enhanced comfort while effectively protecting the Achilles' tendon of the wearer's foot. For example, the tendon guard 63 may have an inner surface for facing the wearer's Achilles' tendon that is less stiff and less hard than an outer surface of the tendon guard 63 facing away from the inner surface. As another example, the tendon guard 63 of the skate boot 22 may be integrally made with the shell 30 and the tendon guard 63 may thus be free of an attachment portion with the shell 30, resulting in enhanced comfort. As another example, the tendon guard 63 may have any desired stiffness and may provide suitable protection to the wearer's foot 11 while being substantially less stiff than the shell 30. For example, in some embodiments, a ratio of the stiffness of the tendon guard 63 over the stiffness of the shell may be no more than 0.95, in some embodiments no more than 0.9, in some embodiments no more than 0.8, in some embodiments no more than 0.7, in some embodiments no more than 0.6, in some embodiments no more than 0.5, and in some embodiments even less.

In this embodiment, the toe cap 14 of the skate boot 22 comprises at least part of the additively-manufactured components $12_1$-$12_A$. The AM components $12_1$-$12_A$ may allow the toe cap 14 to be lightweight while still offering a suitable protection. For example, the toe cap 14 may comprise a lattice 40 having elongated members $41_1$-$41_E$ arranged to increase stiffness and hardness of the toe cap 14 in a direction normal to its surface while diminishing the weight of the toe cap 14. This may be achieved by having a greater number of elongated members $41_1$-$41_E$ extending in the direction normal to the outer surface of the toe cap 14 than elongated members $41_1$-$41_E$ extending in other directions. For example, a ratio of the weight of the toe cap 14 over a weight of a traditional toe cap (i.e. without AM components) may be no more than 0.95, in some embodiments no more than 0.9, in some embodiments no more than 0.8, in some embodiments no more than 0.7, in some embodiments no more than 0.6, in some embodiments no more than 0.5, and in some embodiments even less. Additionally, the AM components $12_1$-$12_A$ may allow the toe cap 14 to be customizable and to have desired comfort and stiffness properties over different zones of the wearer's foot 11. For example, inner dimensions of the toe cap 11 may be customizable to improve fit, performance and comfort of the toe cap 11.

In this embodiment, each one of the insole 18 and the footbed 38 of the skate 10 comprises at least part of the additively-manufactured components $12_1$-$12_A$. The AM components $12_1$-$12_A$ may allow the insole 18 and the footbed 38 to fit to the wearer's foot 11 and to provide desired comfort and stiffness over different zones of the wearer's foot 11.

In some embodiments, the skate 10 comprises an outsole 39 disposed between the shell and the blade holder 24 to enhance stiffness, power transmission between the wearer's foot 11 and the blade holder 24, and to increase durability. The outsole 39 may comprise at least part of the additively-manufactured components $12_1$-$12_A$. The AM components $12_1$-$12_A$ may allow the outsole 39 to be lighter and stiffer, or lighter and softer, to further enhance power transmission between the wearer's foot 11 and the blade holder 24 and/or to enhance comfort and customability.

In this embodiment, the blade holder 24 comprises at least part of the additively-manufactured components $12_1$-$12_A$. More specifically, the base 164 and the support 168 of the blade holder 24 each comprises at least part of distinct ones of the additively-manufactured components $12_1$-$12_A$. The AM components $12_1$-$12_A$ may allow the base 164 and the support 168 of the blade holder 24 to have an increased stiffness and a diminished weight. Notably, the blade holder 24 may enhance power transmission between the wearer's foot 11 and the blade 26. Additionally, the AM components $12_1$-$12_A$ may allow designs (e.g. shapes, dimensions) of the base 164 and the support 168 which either: require complex manufacturing tools and/or manufacturing operations to manufacture traditionally; or are impossible to manufacture traditionally. For example, the AM components $12_1$-$12_A$ may comprise internal voids, undercuts restrictions, etc., which would be complex or impossible to manufacture traditionally. In this embodiment, also, the AM components $12_1$-$12_A$ may allow the base 164 and the support 168 to integrate mechanisms (e.g. the blade-detachment mechanism 55) without making separate components.

Figure 22A:
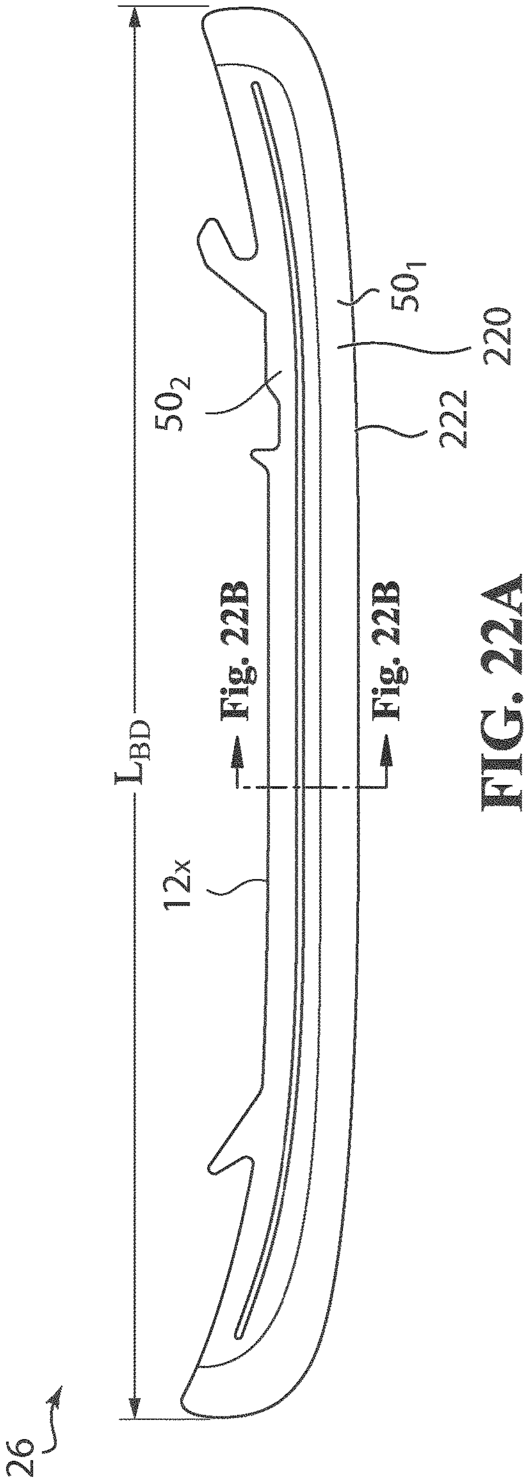
FIGS. 22A and 22B show a variant of the blade.
Figure 22B:
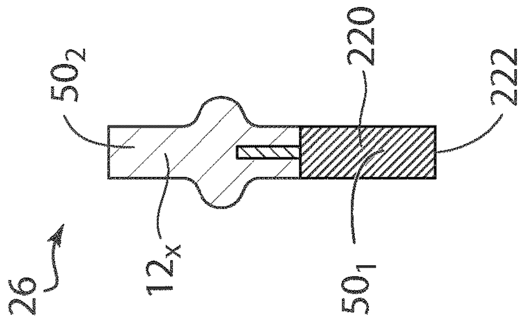

In this embodiment, the blade 26 comprises at least part of the additively-manufactured components $12_1$-$12_A$. In this example, the blade 26 is removable (i.e. detachable) from the blade holder 24 and, as such, the additively-manufactured components $12_1$-$12_A$ of the skate 10 may be movable relative to one another. More specifically, AM components $12_1$-$12_A$ may comprise 3D-printed metallic material $50_i$ constituting at least an ice-contacting surface of the blade 26. The 3D-printed metallic material $50_1$ may constitute at least a majority of the blade 26. In this embodiment, the -printed metallic material $50_1$ constitutes an entirety of the blade, as shown in FIGS. 21A and 21B. In other embodiments, the AM components $12_1$-$12_A$ may further comprise a 3D-printed polymeric material 502 (e.g. comprising 3D-printed fiber-reinforced composite material) constituting at least part of the blade 26 and connected to the 3D-printed metallic material $50_1$, as shown in FIGS. 22A and 22B. With additional reference to FIGS. 21A and 21B, the AM components $12_1$-$12_A$ may allow the blade 26 to be lightweight while preserving its hardness, stiffness and durability. For instance, the blade 26 may comprise internal cells $125_1$-$125_c$ that do not comprise any 3D-printed material and that may be filled with air in areas where local stresses are typically lower in order to diminish weight of the blade 26. In this example, the internal cells $125_1$-$125_c$ may be viewed as internal "voids" which would be complex or impossible to manufacture traditionally.

The skate 10 may be implemented in any other suitable manner in other embodiments.

For example, in some embodiments, each one of the heel portion 62, the ankle portion 64, the medial and lateral side portions 66, 68, and the sole portion 69 of the shell 30 may comprise a distinct one of the additively-manufactured components $12_1$-$12_A$ such that the heel portion 62, the ankle portion 64, the medial and lateral side portions 66, 68, and the sole portion 69 are connected to one another to form the shell 30. In this embodiment, the subshells $\mathbf{85}_1$-$\mathbf{85}_s$ are the heel portion 62, the ankle portion 64, the medial and lateral side portions 66, 68, and the sole portion 69 of the shell 30 rather than layers forming the shell 30. Each one of the subshells $\mathbf{85}_1$-$\mathbf{85}_s$ may comprise distinct zones $\mathbf{80}_1$-$\mathbf{80}_z$ that are structurally different from one another to modulate properties, such as the strength, flex, stiffness, etc., of the zones $\mathbf{80}_1$-$\mathbf{80}_z$ of the lattice 40. For example, in this embodiment, the distinct zones $\mathbf{80}_1$-$\mathbf{80}_z$ of the additively-manufactured components $\mathbf{12}_1$-$\mathbf{12}_A$ are layers of the additively-manufactured component that layered on one another. In this embodiment, a distal (i.e. outer) zone $\mathbf{85}_d$ of the additively-manufactured component $\mathbf{12}_x$ may be stiffer than a proximal (i.e. inner) zone $\mathbf{85}_p$ of the additively-manufactured component $\mathbf{12}_x$.

As another example, in some embodiments, the AM component $\mathbf{12}_x$ may be at least part (i.e. may be part but not constitute an entirety or may constitute an entirety) of two or more of: the subshells $\mathbf{85}_1$-$\mathbf{85}_L$ of the shell 30, the tendon guard 63, the toe cap 14, the facings $\mathbf{31}_1$, $\mathbf{31}_2$, the liner 36, the tongue 34, the insole 18, the footbed 38, the blade 26, the lower portion 162 of the blade holder 24 and the support 168 of the blade holder 24.

Figure 56:
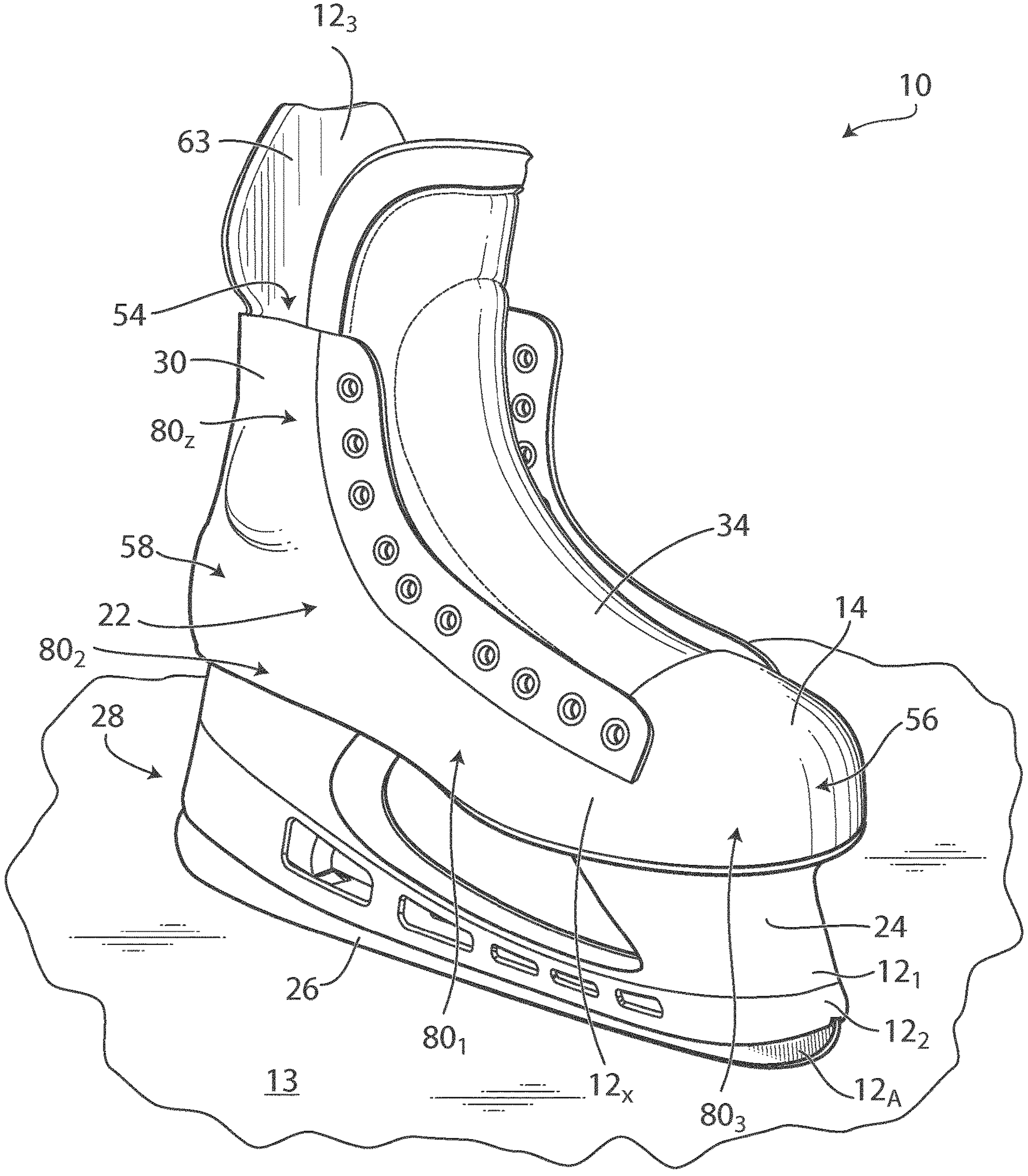
FIGS. 56 to 60 show variants of the skate.
Figure 57:
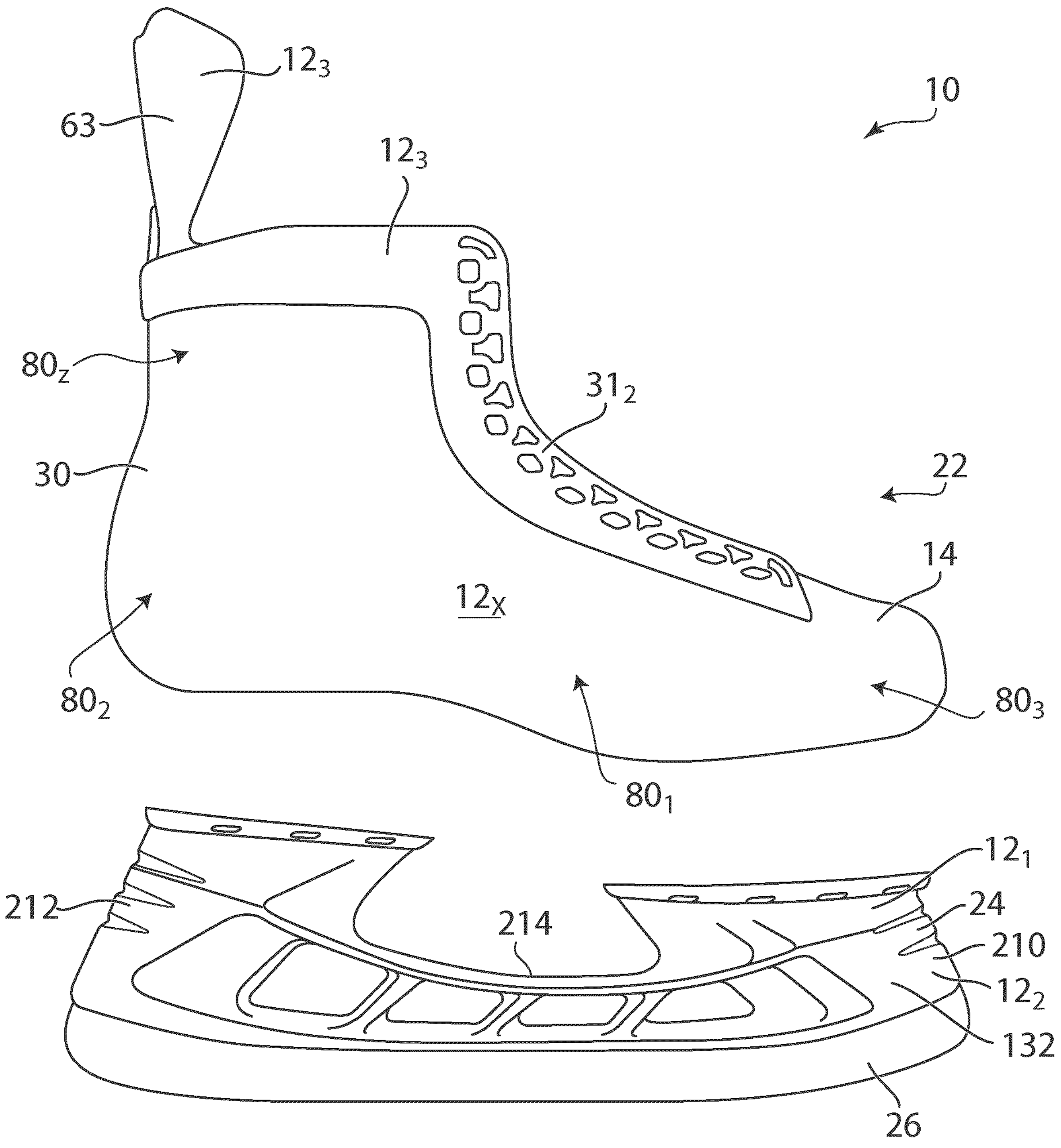

For instance, in some cases, as shown in FIGS. 56 and 57, the subshells $\mathbf{85}_1$-$\mathbf{85}_L$ of the shell 30 and the toe cap 14 may be formed of the same AM component $\mathbf{12}_x$. That is, the shell 30 and the toe cap may be a one-piece AM component $\mathbf{12}_x$. In this example, the shell 30 still comprises the distinct zones $\mathbf{80}_1$-$\mathbf{80}_z$ that are structurally different from one another to modulate properties.

In some cases, the lower portion 162 of the blade holder 24 and the support 168 of the blade holder 24 may be formed of the same AM component $\mathbf{12}_x$. That is, the blade holder 24 may be a one-piece AM component $\mathbf{12}_x$ connected to the skate boot comprising or being connected to a blade attachment mechanism of the blade holder 24. In this example, the blade holder 24 still comprises the distinct zones $\mathbf{80}_1$-$\mathbf{80}_z$ that are structurally different from one another to modulate properties.

Figure 58:
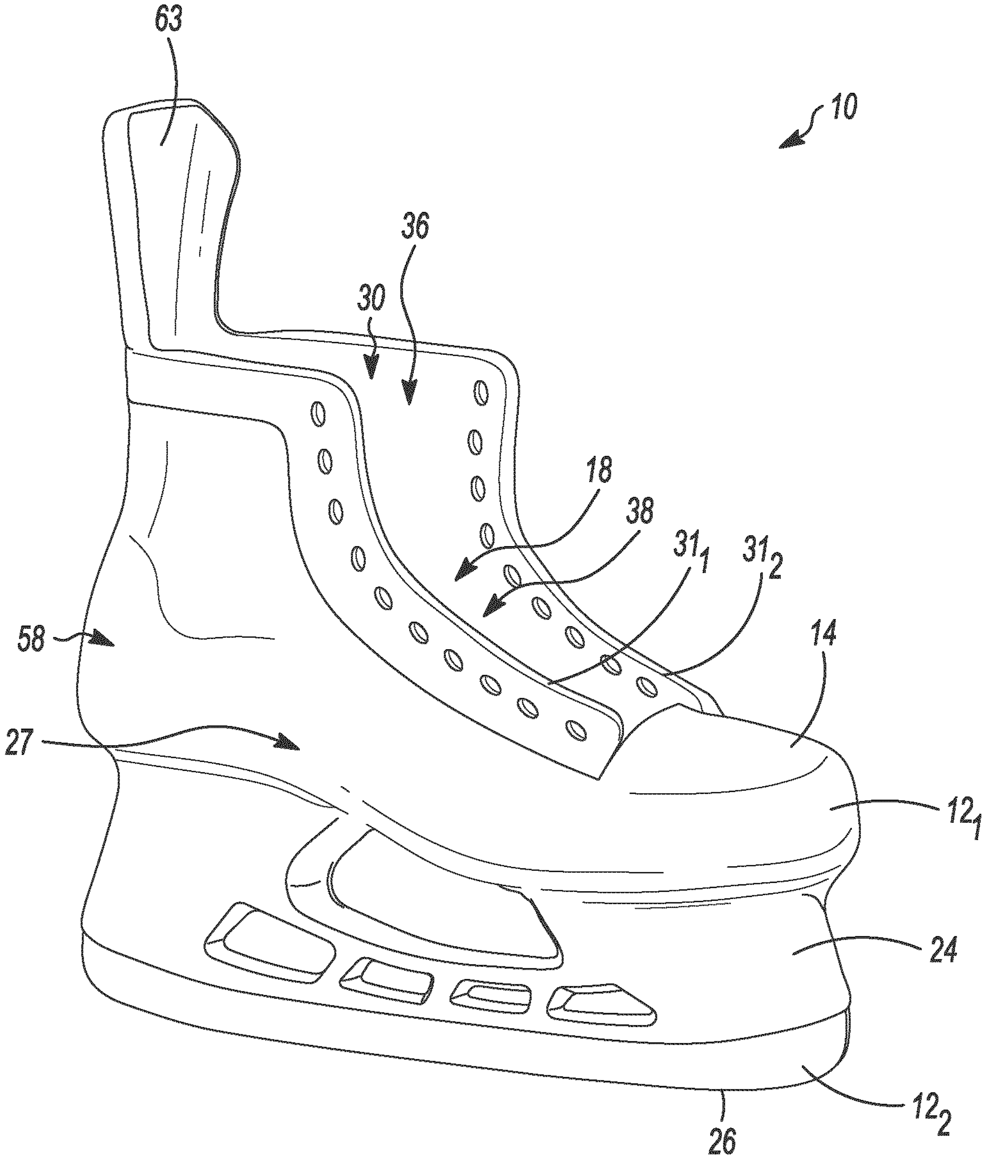
Figure 59:
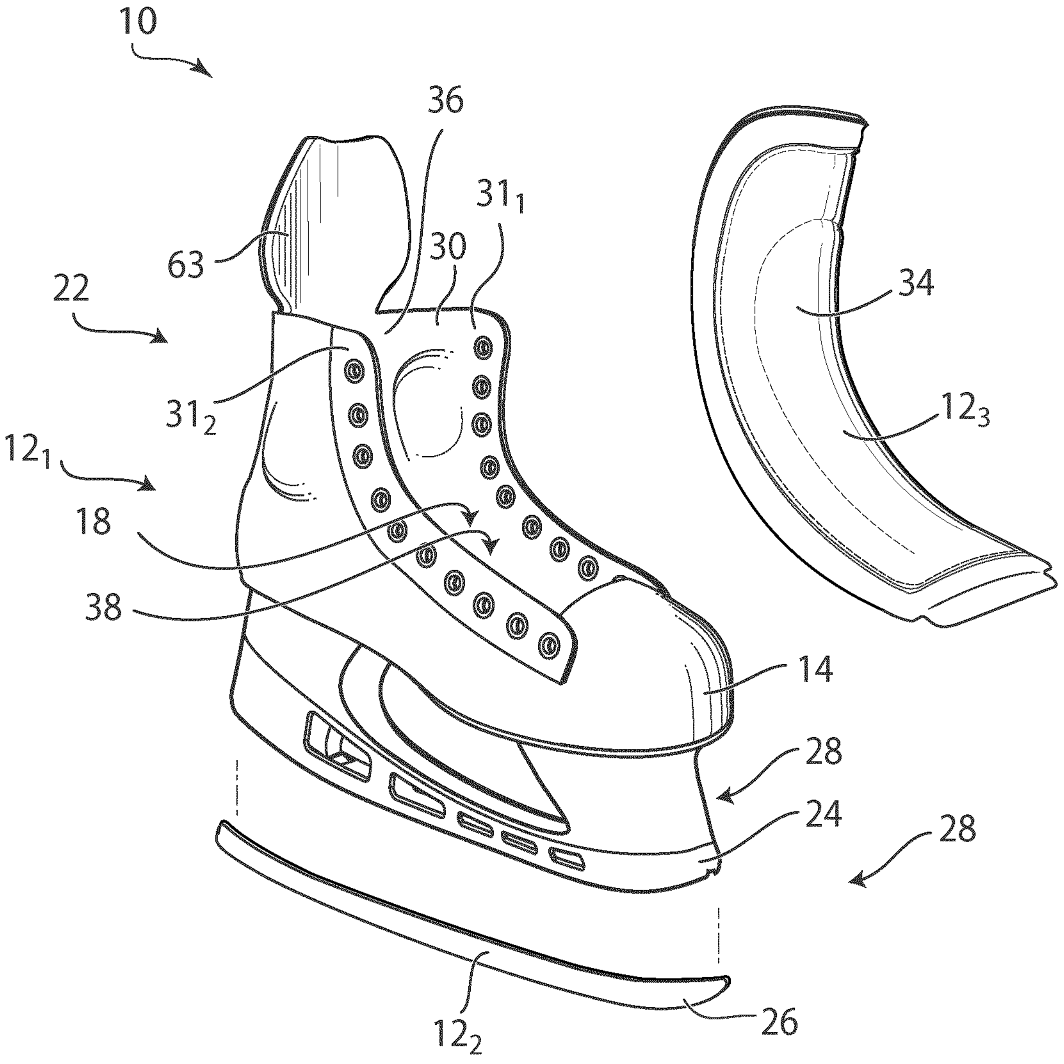
Figure 60:
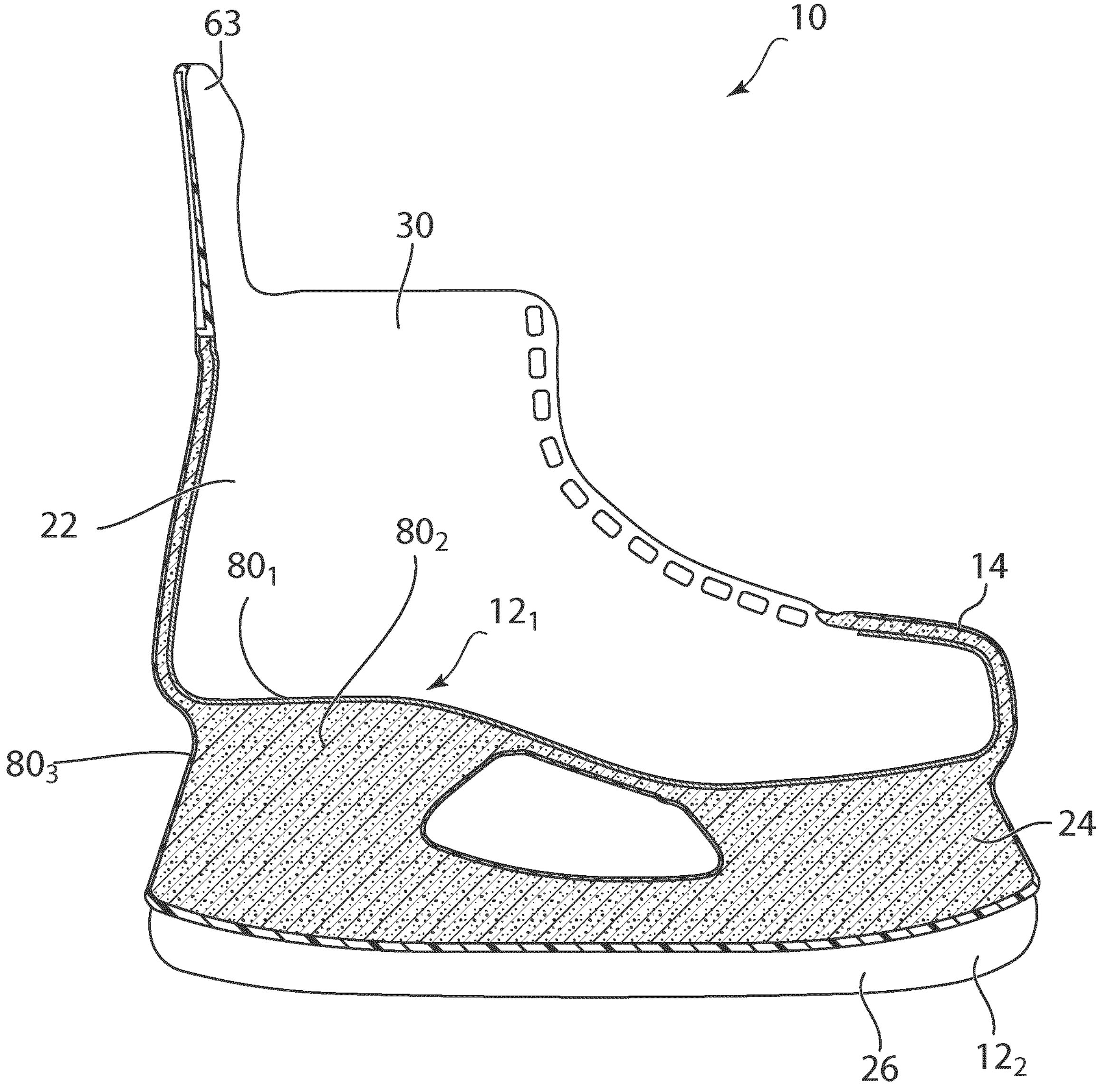
Figure 61:
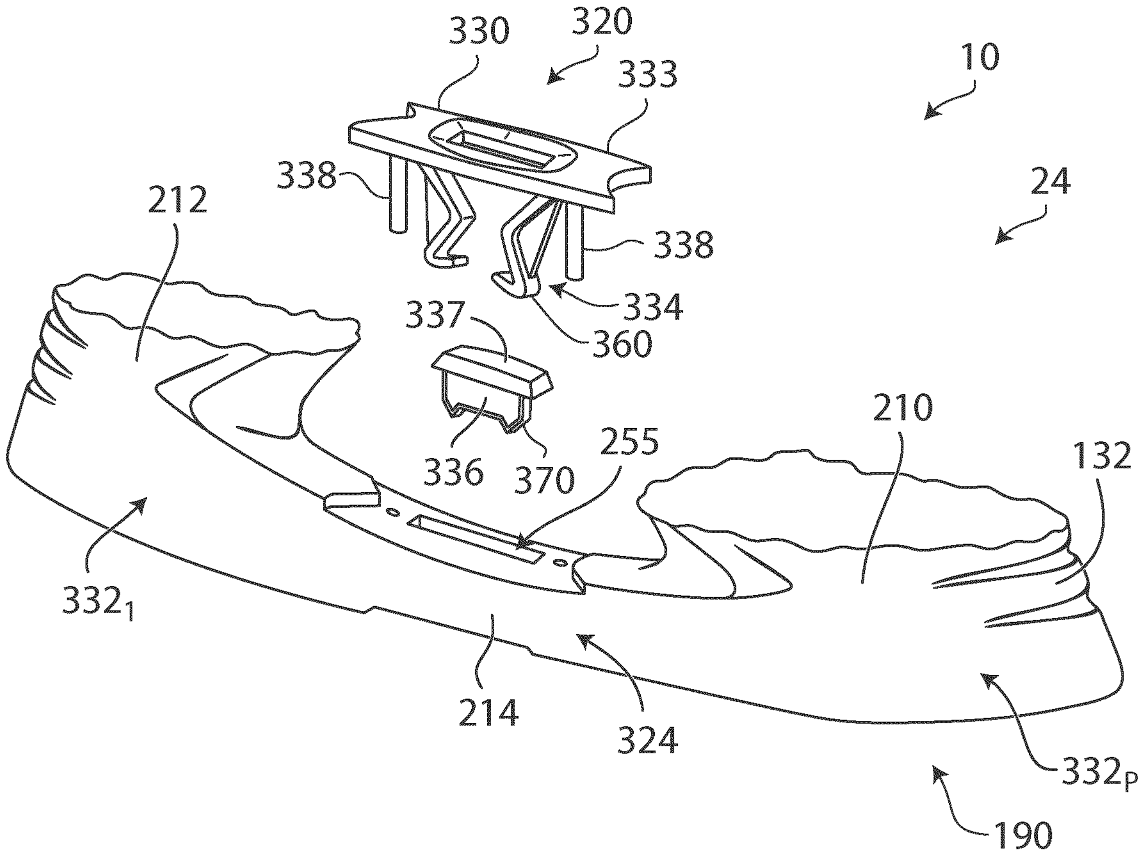
FIGS. 61 to 76 show a variant of the blade detachment mechanism.

In some cases, as shown in FIGS. 58 to 60, the subshells $\mathbf{85}_1$-$\mathbf{85}_L$ of the shell 30, the tendon guard 63, the toe cap 14, the facings $\mathbf{31}_1$, $\mathbf{31}_2$, the liner 36, the insole 18, the footbed 38, the lower portion 162 of the blade holder 24 and the support 168 of the blade holder 24 are made of a single AM component $\mathbf{12}_x$. That is, the shell 30, the tendon guard 63, the toe cap 14, the facings $\mathbf{31}_1$, $\mathbf{31}_2$, the liner 36, the insole 18, the footbed 38, the lower portion 162 of the blade holder 24 and the support 168 of the blade holder 24 may be a one-piece AM component $\mathbf{12}_x$. In this example, the one-piece AM component $\mathbf{12}_x$ still comprises the distinct zones $\mathbf{80}_1$-$\mathbf{80}_z$ that are structurally different from one another to modulate properties.

As another example, in some embodiments, with additional reference to FIGS. 60 to 71, the blade holder 24 comprises a connection system 320 configured to attach the blade 26 to and detach the blade 26 from the blade holder 24. The connection system 320 facilitates installation and removal of the blade 26, such as for replacement of the blade 26, assemblage of the skate 10, and/or other purposes.

More particularly, in this embodiment, the connection system 320 of the blade holder 24 is a quick-connect system configured to attach the blade 26 to and detach the blade 26 from the blade holder 24 quickly and easily.

Notably, in this embodiment, the quick-connect system 320 of the blade holder 24 is configured to attach the blade 26 to and detach the blade 26 from the blade holder 24 without using a screwdriver when the blade 26 is positioned in the blade holder 24. In this example, the quick-connect system 320 is configured to attach the blade 26 to and detach the blade 26 from the blade holder 24 screwlessly (i.e., without using any screws) when the blade 26 is positioned in the blade holder 24. It is noted that although the quick-connect system 320 is configured to attach the blade 26 to and detach the blade 26 from the blade holder 24 screwlessly, the quick-connect system 320 may comprise screws that are not used (i.e. manipulated) for attachment or detachment of the blade 26. Thus, in this embodiment, the quick-connect system 320 is configured to attach the blade 26 to and detach the blade 26 from the blade holder 24 without using a screwdriver and screwlessly when the blade 26 is positioned in the longitudinal recess 190 of the blade holder 24.

In this example, the quick-connect system 320 of the blade holder 24 is configured to attach the blade 26 to and detach the blade 26 from the blade holder 24 toollessly (i.e., manually without using any tool) when the blade 26 is positioned in the blade holder 24. That is, the blade 24 is attachable to and detachable from the blade holder 24 manually without using any tool (i.e., a screwdriver or any other tool). Thus, in this example, the quick-connect system 320 is configured to attach the blade 26 to and detach the blade 26 from the blade holder 24 toollessly when the blade 26 is positioned in the longitudinal recess 190 of the blade holder 24.

In this embodiment, the quick-connect system 320 of the blade holder 24 comprises a plurality of connectors 330, $\mathbf{332}_1$-$\mathbf{332}_P$ to attach the blade 26 to and detach the blade 26 from the blade holder 24. The blade 26 comprises a plurality of connectors 350, $\mathbf{352}_1$-$\mathbf{352}_P$ configured to engage respective ones of the connectors 330, $\mathbf{332}_1$-$\mathbf{332}_P$ of the quick-connect system 320 of the blade holder 24 to be attached to and detached from the blade holder 24. The connectors 330, $\mathbf{332}_1$-$\mathbf{332}_P$ of the quick-connect system 320 of the blade holder 24 are spaced apart in the longitudinal direction of the skate 10, and so are the connectors 350, $\mathbf{352}_1$-$\mathbf{352}_P$ of the blade 26.

In this embodiment, the connectors 330, 350 of the quick-connect system 320 of the blade holder 24 and the blade 26 are configured to preclude the blade 26 from moving in a distal direction, i.e., away from the blade holder 24, when the blade 26 is attached to the blade holder 24, and the connector 330 of the quick-connect system 320 of the blade holder 24 is disposed between the pillars 210, 212 of the blade holder 24. In order to be connectable with the connector 330 of the quick-connect system 320 of the blade holder 24, in some embodiments, the connector 350 of the blade 26 may be disposed within 30% of a length $L_{BL}$ of the blade 26 from a longitudinal center $C_{BL}$ of the blade 26, in some embodiments within 20% of the length $L_{BL}$ of the longitudinal center $C_{BL}$, in some embodiments within 10% of the length $L_{BL}$ of the longitudinal center $C_{BL}$, in some embodiments within 5% of the length $L_{BL}$ of the longitudinal center $C_{BL}$, in some embodiments at the longitudinal center $C_{BL}$.

In this example, the connector 330 of the quick-connect system 320 of the blade holder 24 is movable relative to the body 132 of the blade holder 24 to attach the blade 26 to and detach the blade 26 from the blade holder 24. That is, at least part of the connector 330 is configured to move relative to the body 132 of the blade holder 24 (e.g., be displaced in relation to or disconnected from the body 132 of the blade holder 24) while attaching the blade 26 to and detaching the blade 26 from the blade holder 24 to allow attachment and detachment of the blade 26.

In particular, in this embodiment, the connector 330 of the quick-connect system 320 remains connected to the body 132 of the blade holder 24 while at least partly moving relative to the body 132 of the blade holder 24 to attach the blade 26 to and detach the blade 26 from the blade holder 24. In this embodiment, the connector 330 of the quick-connect system 320 is threadless (i.e., without any thread required to attach the blade to the blade holder).

The connector 330 of the quick-connect system 320 may comprise a base 333 for affixing the connector 330 to the body 132 of the blade holder 24 and for connecting parts of the connector 330.

The connector 330 of the quick-connect system 320 may comprise a resilient portion 334 configured to resiliently deform (i.e., resiliently change in configuration from a first configuration to a second configuration in response to a load and to revert to the first configuration in response to the load ceasing to be applied) to allow the connector 330 to move relative to the body 132 of the blade holder 24 to attach the blade 26 to and detach the blade 26 from the blade holder 24. More specifically, in this example, the resilient portion 334 of the connector 330 of the quick-connect system 320 is configured to bias the connector 330 in a position to attach the blade 26 to the blade holder 24. The resilient portion 334 of the connector 330 of the quick-connect system 320 is also configured to exert a spring force during attachment of the blade 26 to and detachment of the blade 26 from the blade holder 24 and to resiliently deform when the blade 26 is placed in the blade holder 24 to attach the blade 26 to the blade holder 24 and when the blade 26 is removed from the blade holder 24 to detach the blade 26 from the blade holder 24. As such, at least part of the resilient portion 334 may be considered to form a clip configured to attach the blade 26 to the blade holder 24 by gripping, clasping, hooking or otherwise clipping a portion of the blade 26.

In this embodiment, the connector 330 of the quick-connect system 320 comprises a hand-engaging actuator 336 configured to be manually operated to move part of the connector 330 of the quick-connect system 320 relative to the body 132 of the blade holder 24. The hand-engaging actuator 336 of the connector 330 may be configured to be manually operated by manually pushing thereon. More specifically, the hand-engaging actuator 336 of the connector 330 may comprise a button 370. The base 333 may thus be viewed as a "button cage" as it receives and keeps the button 370 captive.

In this embodiment, the button 370 may have a width WB and a length $L_B$ allowing the quick-connect system 320 to be ensure that an impact between the blade holder 24 and a flying hockey puck would not eject any component (e.g., the button 370) from the blade holder 24. For instance, in some embodiments, the width WB of the button 370 may be between 0.25 inch and 1 inch, in some embodiments about 0.5 inch, while in some embodiments the length $L_B$ of the button 370 may be between 0.25 inch and 2 inches, in some embodiments between 0.75 inch and 1.5 inch, and in some embodiments about 1 inch. Thus, the hand-engaging actuator 336 may have a hand-engaging actuating surface 337 that is greater, therefore allowing the user to actuate the hand-engaging actuator 336 using a smaller pressure, thereby facilitating the use of the hand-engaging actuator. For example, in this embodiment, the hand-engaging surface 33 occupies at least a majority of a width of a cross-section of the blade holder 24 normal to the longitudinal direction of the blade holder 24 where the hand-engaging surface 337 is located. For instance, the hand-engaging surface 337 may occupy at least 60%, in some cases at least 70%, and in some cases at least 80% of the width of the cross-section of the blade holder 24 normal to the longitudinal direction of the blade holder 24 where the hand-engaging surface 337 is located. For example, in some embodiments, the hand-engaging actuating surface 337 may be of at least 0.0625 $in^2$, in some embodiments of at least 0.125 $in^2$, in some embodiments of at least 0.5 $in^2$, in some embodiments of at least 1 $in^2$, in some embodiments of at least 2 $in^2$, in some embodiments even more.

In this embodiment, the quick-connect system 320 comprises a frame 324 affixed to or integrally made with the body 132 of the blade holder 24 and supporting the connector 330 of the quick-connect system 320. For instance, in some cases, at least part of the frame 324 is fastened to the body 132 of the blade holder 24 by at least one fastener, such as a screw, a bolt, or any other threaded fastener, an adhesive, or any other fastener. In some cases, at least part of the body 132 of the blade holder 24 is manufactured over the frame 324. In some base, the frame 324 and the body 132 of the blade holder 24 are additively manufactured and form a one-piece additively manufactured component. The frame 324 may be concealed by material of the body 132 of the blade holder 24. In some cases, the frame 324 may comprise two apertures 385 and the base 333 may comprise two posts 338 extending through the apertures 385 of the frame 324 and secured to the frame 324 by any suitable means, for instance using screws or bolts, thereby affixing the base 333 to the frame 324.

In this embodiment, the connector 350 of the blade 26 comprises a connecting projection 390 projecting from an upper surface 356 of the blade 26. The connecting projection 390 of the blade 26 comprises two hooks 392. Each hook 392 is configured to engage the connector 330 of the blade holder 24 to hold the blade 26 and comprises an upper end 394 configured to enlarge the resilient portion 330 of the connector 330 while the blade 26 is being attached to the blade holder 24. For instance, in this embodiment, the upper end 394 of the projection 390 defines a width of the projection 390 progressively diminishing as the projection 390 projects from the upper surface 356 of the blade 26.

In this embodiment, the connectors $\mathbf{332_1}$-$\mathbf{332_P}$ of the blade holder 24 are voids of pre-determined shapes and the connectors $\mathbf{352_1}$-$\mathbf{352_P}$ of the blade 26 are projections projecting from the upper surface 356 of the blade 26 to engage the voids $332_1$-$332_P$ and stabilize the blade 26 in longitudinal and widthwise directions of the skate 10.

Figure 62:
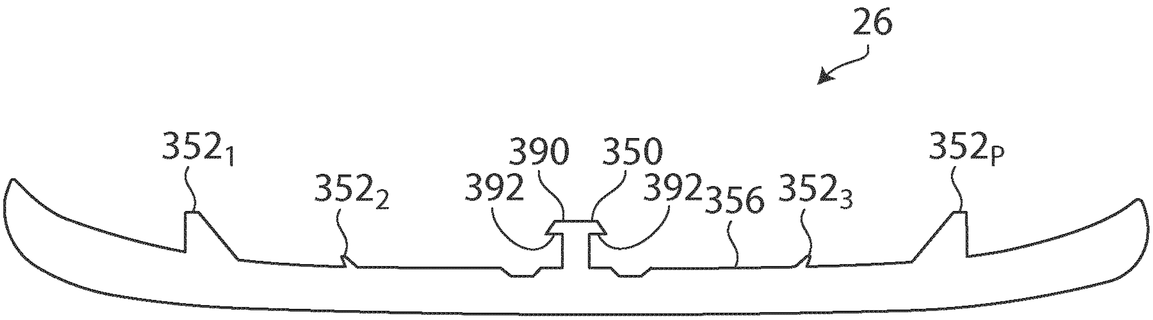
Figure 63:
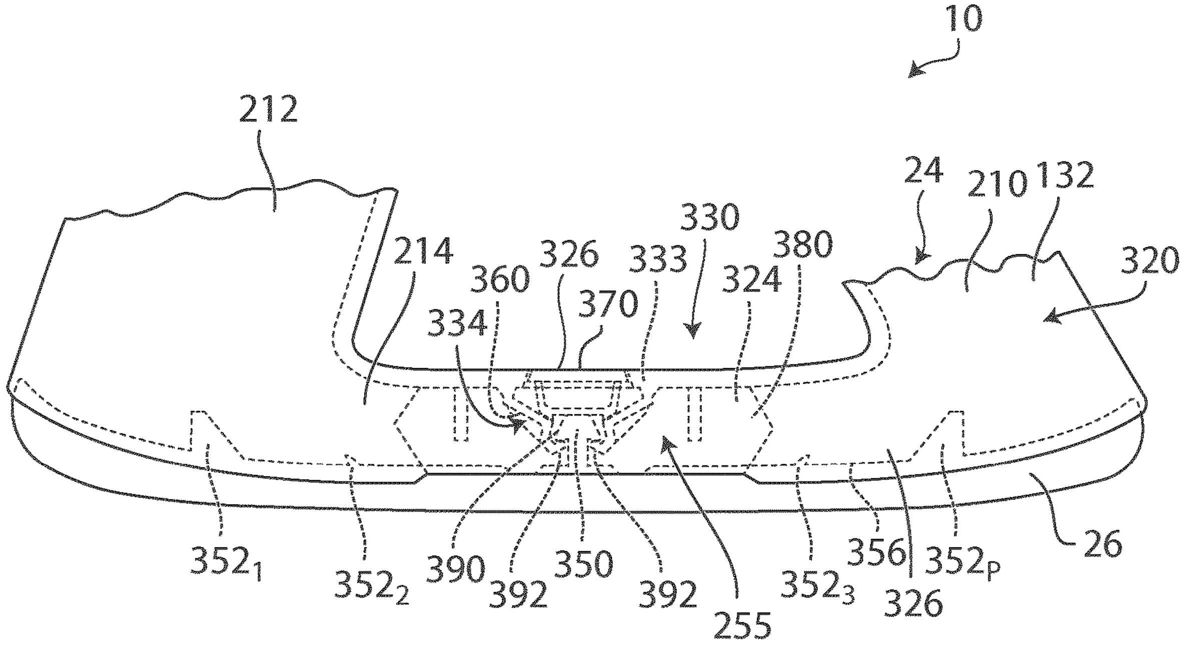
Figure 64:
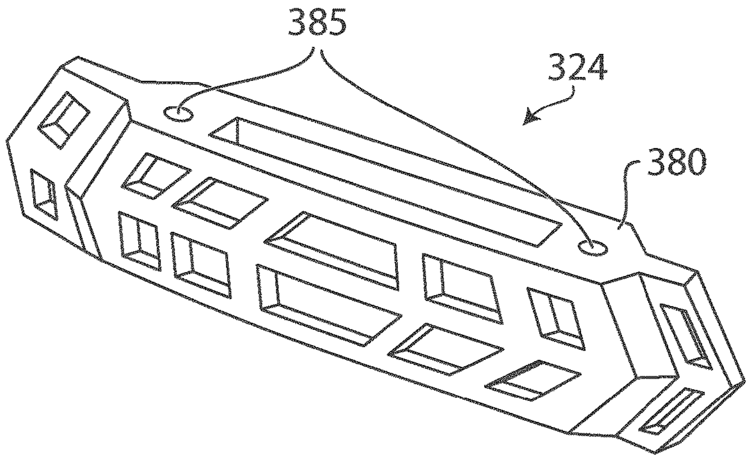
Figure 65:
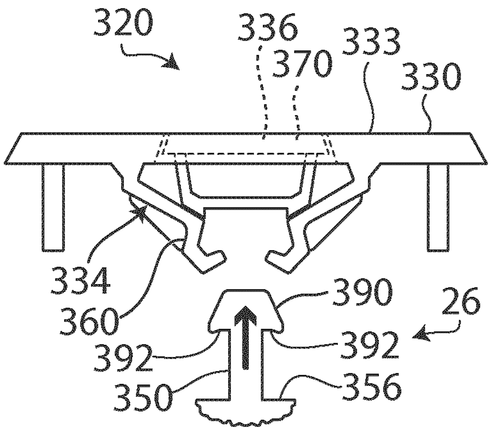
Figure 66:
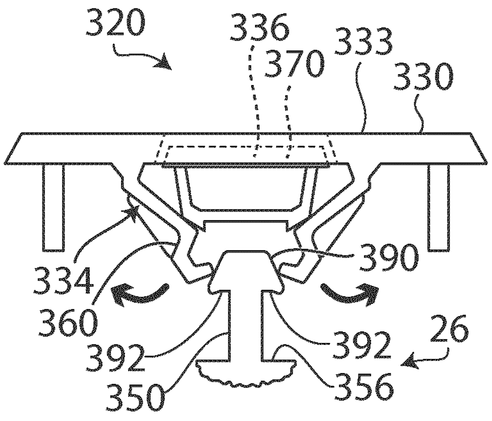
Figure 67:
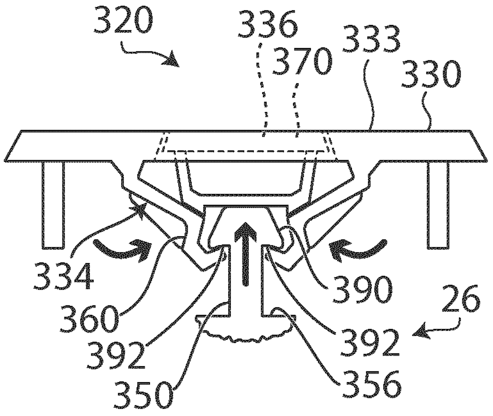
Figure 68:
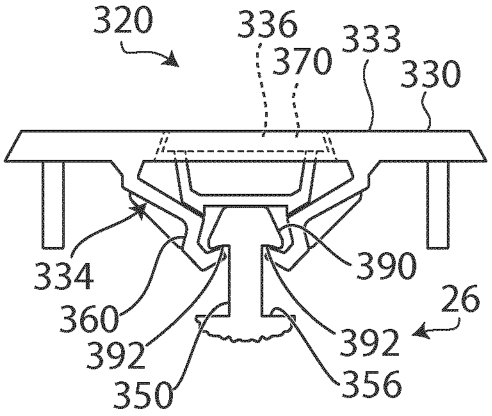
Figure 69:
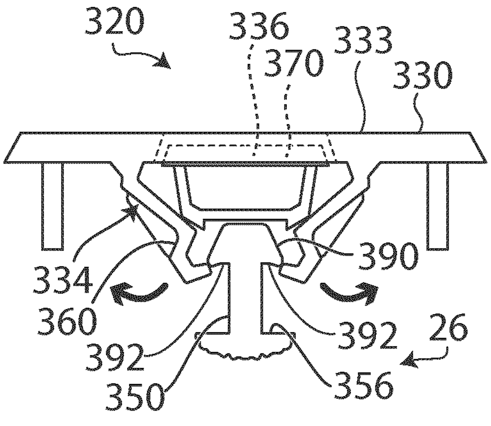
Figure 70:
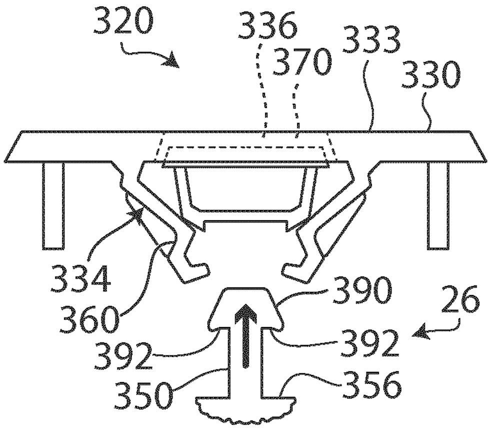
Figure 71:
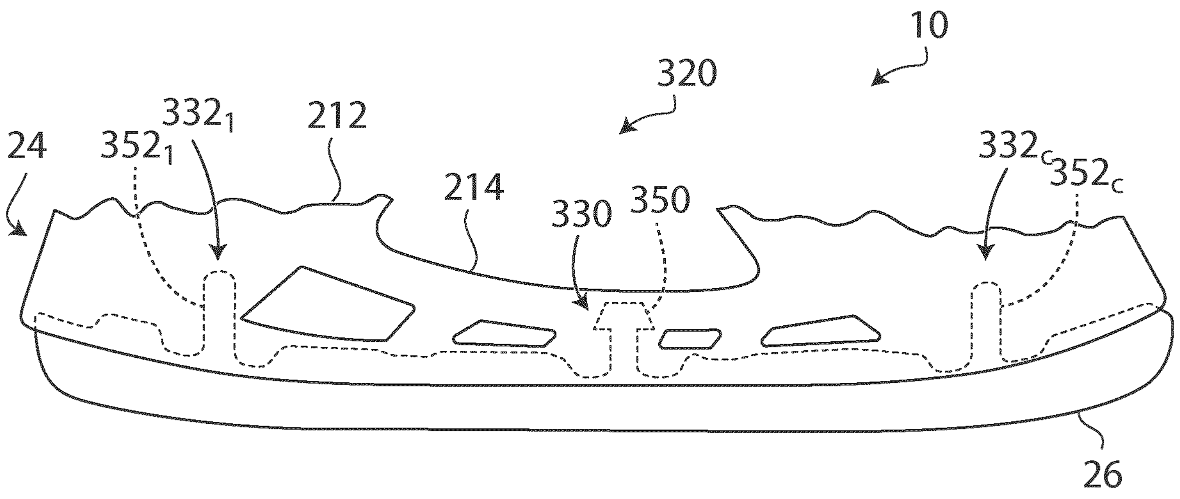
Figure 72:
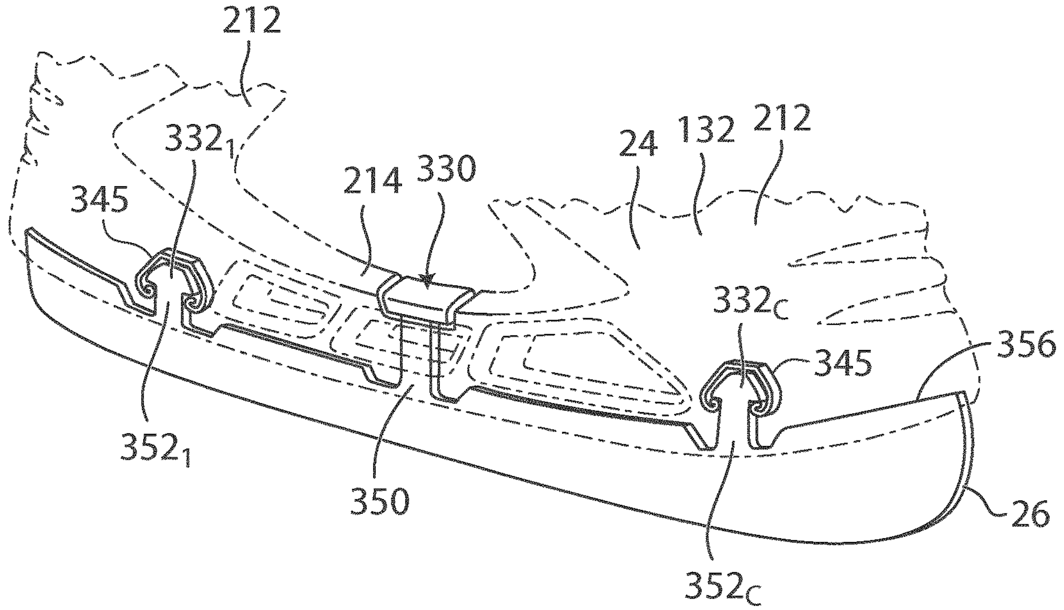
Figure 73:
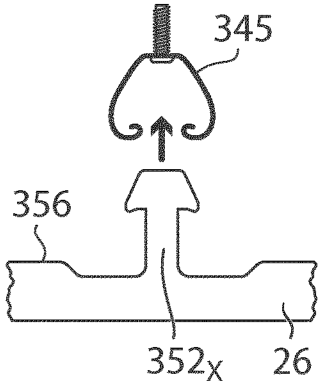
Figure 74:
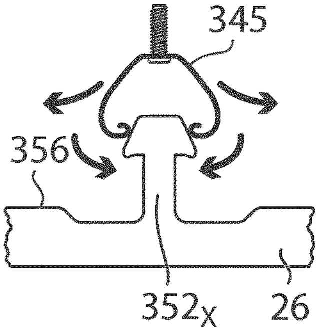
Figure 75:
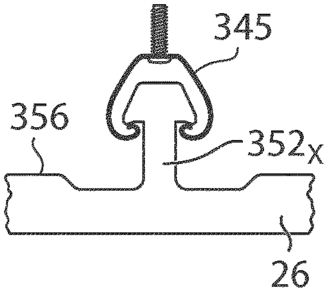

In this embodiment, the quick-connect system 320 is configured such that the blade 26 is attachable to and detachable from the blade holder 24 by a single translation of the blade 26 relative to the blade holder 24 in a heightwise direction of the skate. In other words, the quick-connect system 320 may be configured such that the blade 26 is attachable to and detachable from the blade holder 24 without rotating the blade 26 relative to the blade holder 24. Although this may be achieved by having connectors $\mathbf{352_1}$-$\mathbf{352_c}$ of the blade 26 having edges that may be oblique relative to a longitudinal direction of the blade 26, as shown in FIG. 62, in some embodiments, the connectors $\mathbf{352_1}$-$\mathbf{352_c}$ of the blade 26 may project from the blade 26 in a straight manner and perpendicularly relative to the longitudinal direction of the blade 26, as shown in FIG. 71.

In other embodiments, the connectors $\mathbf{332_1}$-$\mathbf{332_P}$ of the blade holder 24 are structurally substantially similar to the connector 330 of the blade holder 24 and the connectors $\mathbf{352_1}$-$\mathbf{352_p}$ of the blade 26 are structurally substantially similar to the connector 350 of the blade 26.

In particular, in this embodiment, the connector 330, the hand-engaging actuator 336 and the frame 324 of the quick-connect system 320 and the body 132 of the blade holder 24 comprise AM components $\mathbf{12}_1$-$\mathbf{12}_A$. More specifically, at least one of the connector 330, the hand-engaging actuator 336 and the frame 324 of the quick-connect system 320, and the body 132 of the blade holder 24 may be made by additive manufacturing. For example, in some cases, the frame 324 of the quick-connect system 320 may be integrally made, i.e. made of the same AM component $\mathbf{12}_x$, with the body 132 of the blade holder 24. In this embodiment, each one of the connector 330, the hand-engaging actuator 336 and the frame 324 of the quick-connect system 320 and the body 132 of the blade holder 24 comprises at least part of AM components $\mathbf{12}_1$-$\mathbf{12}_A$.

In other embodiments, as shown in FIGS. 72 to 75, the connectors $\mathbf{352}_1$-$\mathbf{352}_P$ of the blade 26 comprises two hooks to engage the connectors $\mathbf{332}_1$-$\mathbf{332}_P$ of the blade holder 24, each comprising a clip 345. Each clip 345 may be made of the same AM component $\mathbf{12}_x$ than that of the body 132 of the blade holder 24 such that the clip 345 is configured to retain a given one of the connectors $\mathbf{352}_1$-$\mathbf{352}_C$ of the blade 26 from being attached to or detached from the clip 345, but when an attaching or detaching force exceeds a pre-determined threshold, the clip 345 resiliently deforms to allow the given one of the connectors $\mathbf{352}_1$-$\mathbf{352}_C$ of the blade 26 to be attached to or detached from the clip 345 and returns to its original shape after the attachment or detachment.

Figure 76:
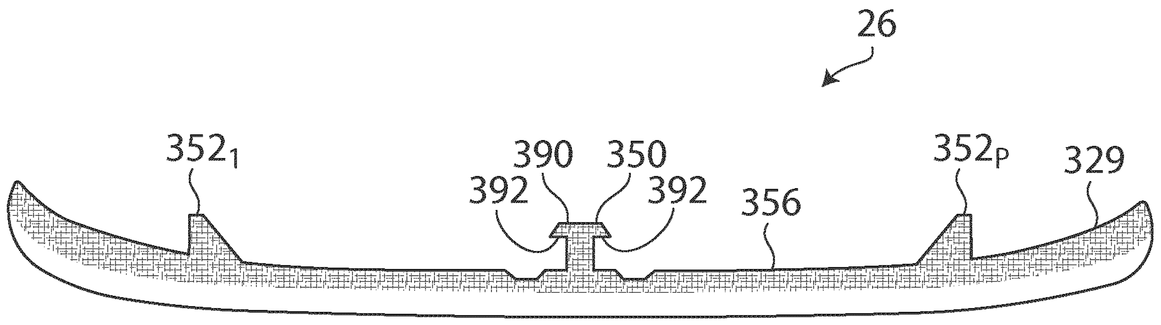

With additional reference to FIG. 76, in some embodiments, the upper portion of the blade 26 may comprise a silkscreen 329 that may serve as a visual indicator of the adjustment and alignment of the blade 26 relative to the blade holder 24 to ease attachment of the blade 26 to the blade holder 24.

In some embodiments, a lower portion of the blade 26 may also comprise the silkscreen 329, for example as a visual indicator of the use and condition of the blade 26. For instance, when the blade 26 is used for play, it needs to be sharpened and sharpening of the blade 26 reduces height of the blade 26 and the ice-contacting surface 222 of the blade 26 gets closer to the upper portion of the blade 26. In this example, the silkscreen 329 may comprise a mark indicating that the blade 26 needs to be changed for a new blade when the ice-contacting surface 222 meets the mark.

In some embodiments, the silkscreen 329 may be three-dimensional. As such, the silkscreen 329 may help reducing lateral movements of the blade 26 relative to the blade holder 24 and reduce loss of energy caused by these movements. For instance, the silkscreen 329 may comprise a material of the blade 26. In other cases, the silkscreen 329 may comprise a material that is softer and/or less rigid than the material of the blade 26, for instance aluminum or polymeric material. In some cases, the polymeric material may comprise an adhesive material.

More specifically, in this embodiment, the silkscreen 329 is additively manufactured and may be part of the AM component $\mathbf{12}_x$.

As another example, in some embodiments, the skate 10 may be an "intelligent" skate 10. That is, the skate 10 may comprise sensors $\mathbf{280}_1$-$\mathbf{280}_S$ to sense a force acting on the skate, a position, a speed, an acceleration and/or a deformation of the skate 10 during play or during a testing (e.g. of hockey sticks, of players, etc.). More particularly, in this embodiment, the lattice 40 comprises the sensors $\mathbf{280}_1$-$\mathbf{280}_S$. More specifically, in this embodiment, the sensors $\mathbf{280}_1$-$\mathbf{280}_S$ are associated with an additively-manufactured component of the lattice 40.

Figure 77:
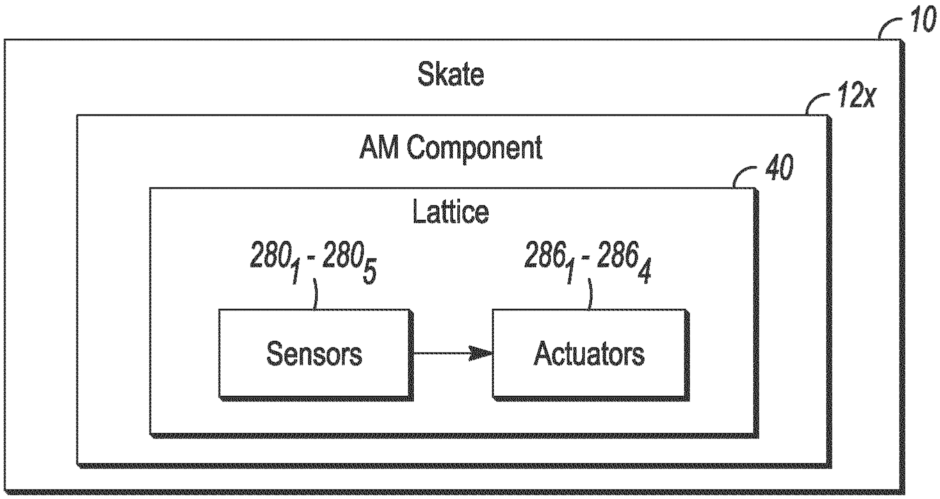
FIGS. 77 to 79 show a variant of the skate wherein the additively-manufactured components comprise sensors and actuators.
Figure 78:
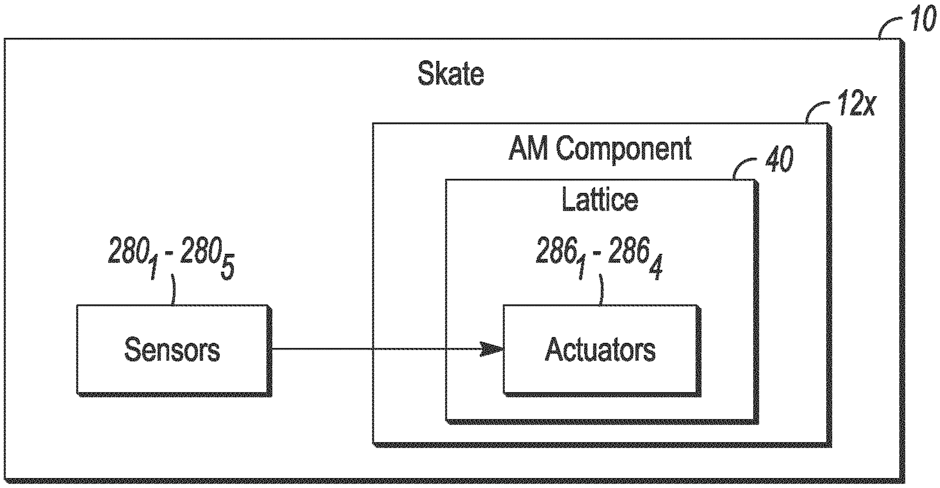

Further, in some embodiments, as shown in FIGS. 77 and 78, the skate 10 may comprise actuators $\mathbf{286}_1$-$\mathbf{286}_A$. Specifically, the actuators $\mathbf{286}_1$-$\mathbf{286}_A$ may be associated with at least some of sensors $\mathbf{280}_1$-$\mathbf{280}_S$ and may be configured to respond to a signal of the sensors $\mathbf{280}_1$-$\mathbf{280}_S$. In particular, the sensors $\mathbf{280}_1$-$\mathbf{280}_S$ (which may be disposed in the lattice 40, as shown in FIG. 77, or out of the AM component $\mathbf{12}_x$, as shown in FIG. 78) may be responsive to an event (e.g. an increase in acceleration of the skate 10, an increase of a force acting on the skate 10, an increase of the deformation of the skate 10, etc.) to cause the actuators $\mathbf{286}_1$-$\mathbf{286}_A$ to alter the additively-manufactured component to alter the lattice 40 (e.g. to increase resilience, to increase stiffness, etc.).

Figure 79:
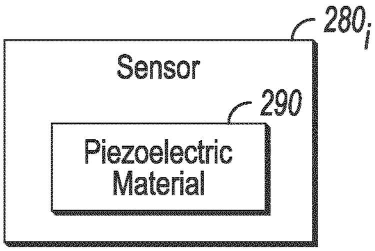

Practically, in this embodiment, this may be achieved using piezoelectric material 290 implementing the sensors $\mathbf{280}_1$-$\mathbf{280}_S$, the piezoelectric material 290 being comprised in the additively-manufactured component of the lattice 40, as shown in FIG. 79.

As another example, in some embodiments, more or less of the skate 10 may be latticed as discussed above.

Figure 80:
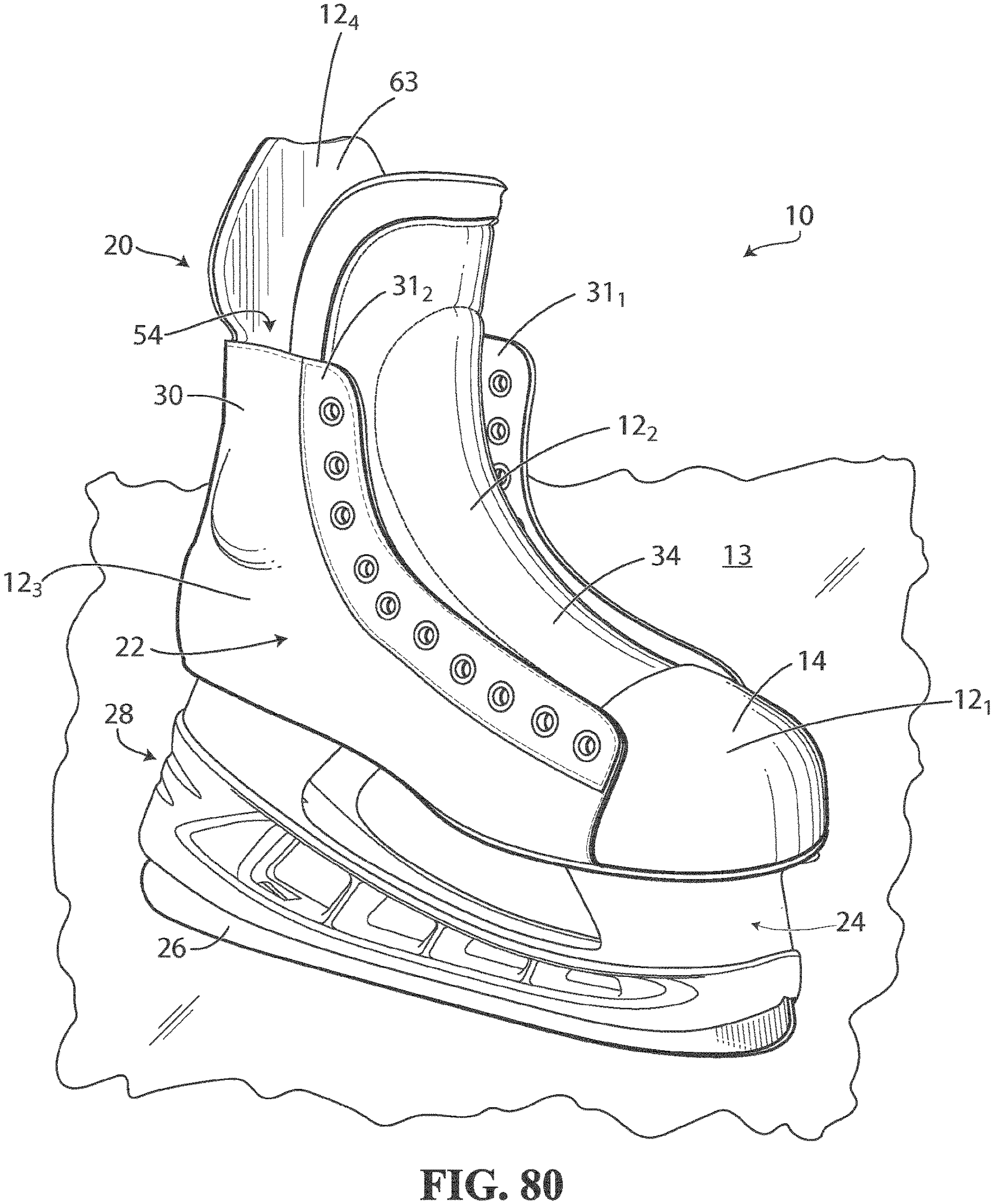
FIGS. 80 to 82 show variants of the skate.

In some embodiments, as shown in FIG. 80, the lattice 40 may constitute at least part (e.g., occupy at least a majority, i.e., a majority or an entirety) of the skate boot 22, but not constitute any part of the blade holder 24 and/or the blade 26. That is, the skate boot 22 may include AM components $\mathbf{12}_1$-$\mathbf{12}_A$, while the blade holder 24 and/or the blade 26 may not include any AM components $\mathbf{12}_1$-$\mathbf{12}_A$.

Figure 81:
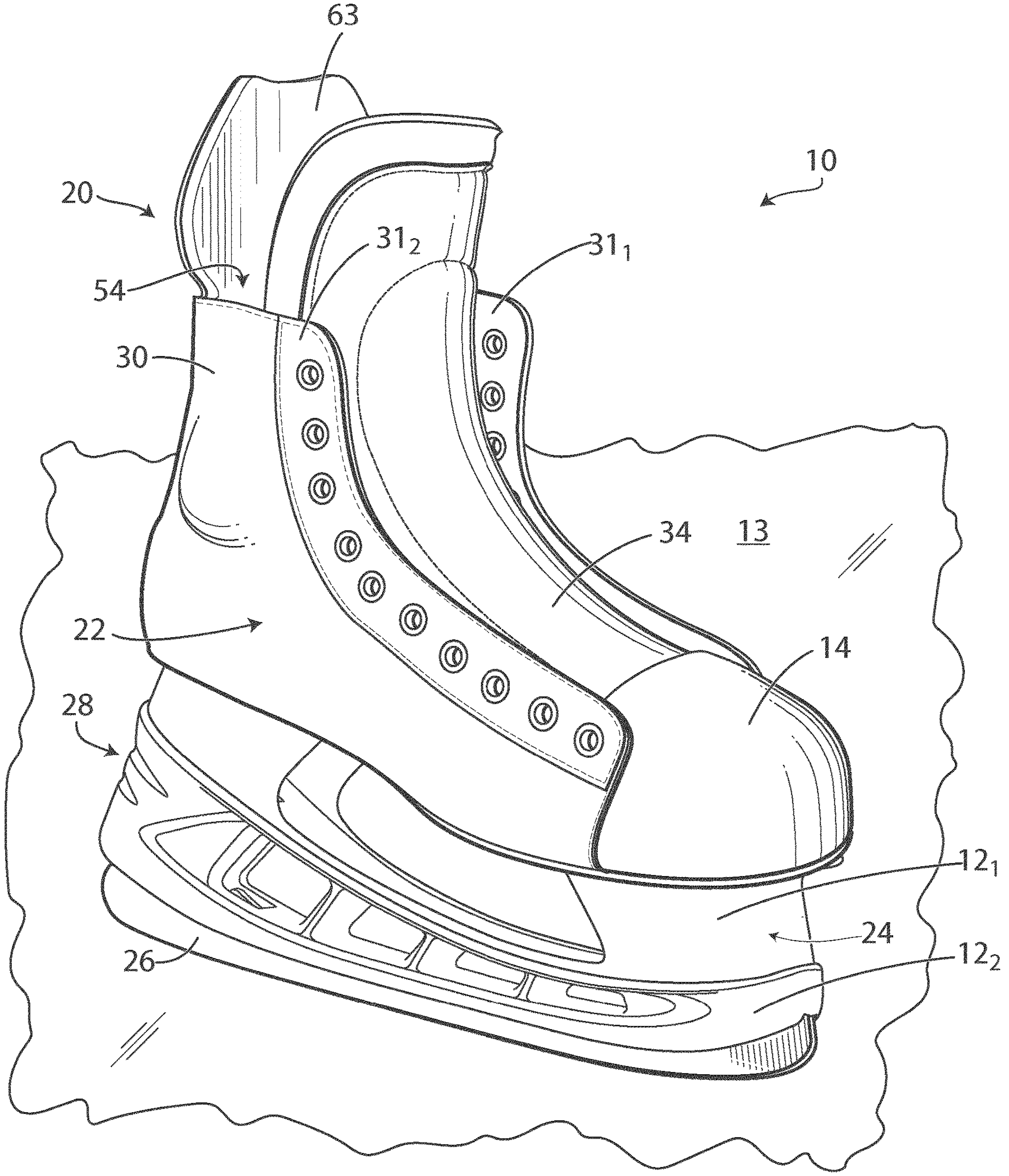

In another example, in some embodiments, as shown in FIG. 81, the lattice 40 may constitute at least part (e.g., occupy at least a majority, i.e., a majority or an entirety) of the blade holder 24, but not constitute any part of the skate boot 22 and/or the blade 26. That is, the blade holder 24 may include AM components $\mathbf{12}_1$-$\mathbf{12}_A$, while the skate boot 22 and/or the blade 26 may not include any AM components $\mathbf{12}_1$-$\mathbf{12}_A$.

Figure 82:
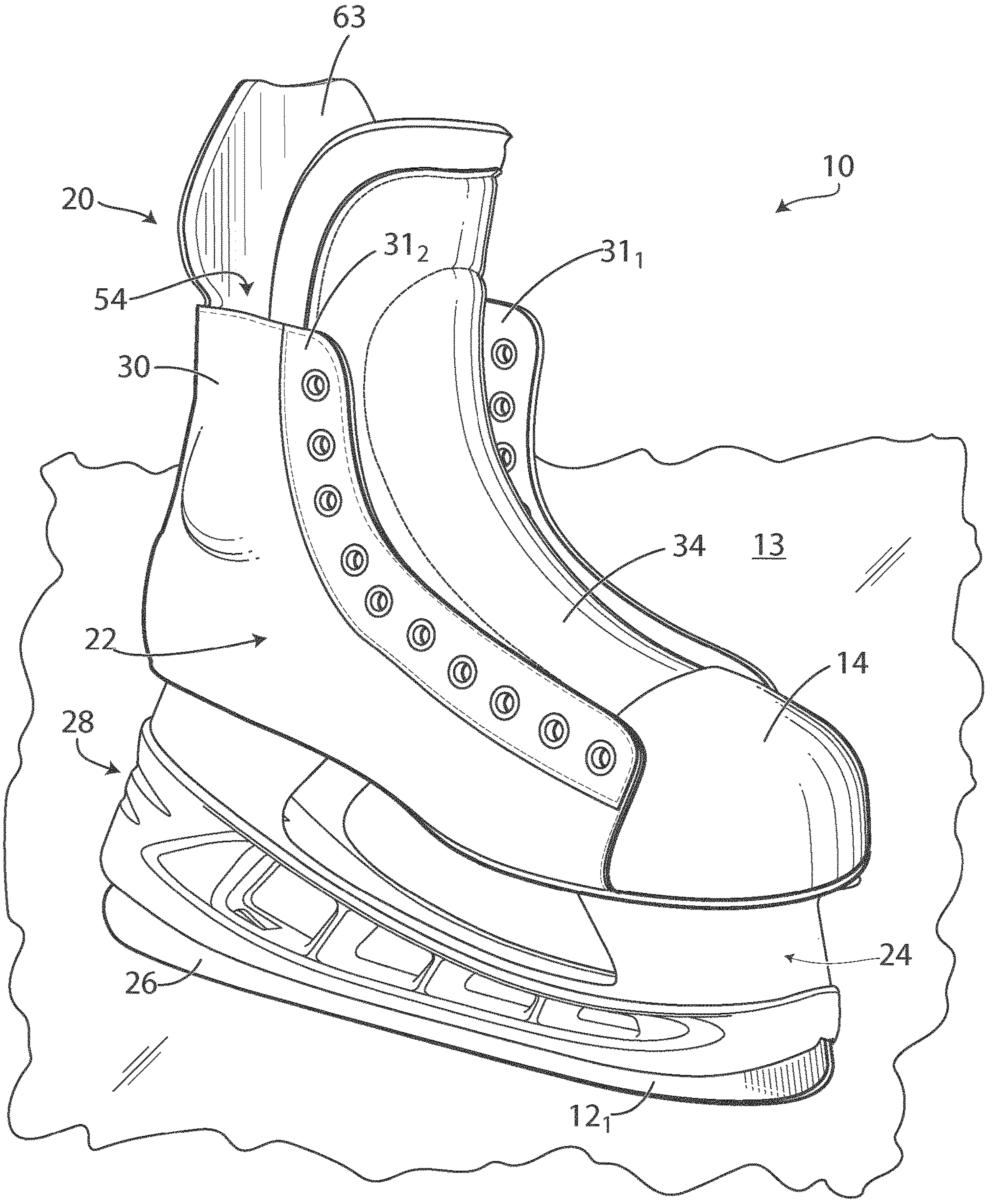

In another example, in some embodiments, as shown in FIG. 82, the lattice 40 may constitute at least part (e.g., occupy at least a majority, i.e., a majority or an entirety) of the blade 26, but not constitute any part of the skate boot 22 and/or blade holder 24. That is, the blade 26 may include AM components $\mathbf{12}_1$-$\mathbf{12}_A$, while the skate boot 22 and/or blade holder 24 may not include any AM components $\mathbf{12}_1$-$\mathbf{12}_A$.

Figure 83:
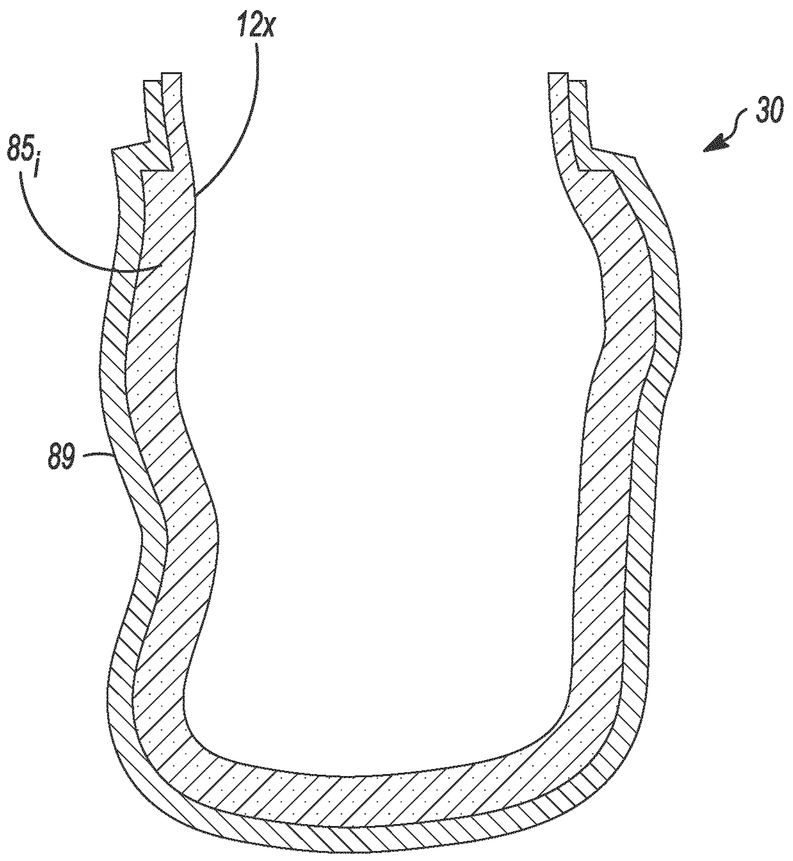
FIG. 83 shows a variant of the skate wherein the skate comprises a covering.

In some embodiments, the skate 10 may comprise one or more AM components $\mathbf{12}_1$-$\mathbf{12}_A$, instead of or in addition to the latticed AM components. That is, the lattice 40 is one example of an additively-manufactured component in embodiments where it is 3D-printed. Such one or more additively-manufactured components of the skate 10 may be 3D-printed as discussed above, using any suitable 3D-printing technology, similar to what was discussed above in relation to the lattice 40 in embodiments where the lattice 40 is 3D-printed. The skate 10 may comprise the lattice 40, which may or may not be additively-manufactured, or may not have any lattice in embodiments where the skate 10 comprises such one or more additively-manufactured components. For example, in some embodiments, as shown in FIG. 83, the AM components $\mathbf{12}_1$-$\mathbf{12}_A$ may comprise a non-lattice member 89 connected to the lattice 40. The non-lattice member 89 may configured to be positioned between the lattice and the user when the skate is worn. In this case, the non-lattice member is a thin member thinner than the lattice. In other case, the non-lattice member may be bulkier than the lattice. More specifically, in this embodiment, the non-lattice member 89 is a covering that covers at least part of the lattice and constitutes at least part of a surface of the additively-manufactured component. The covering 89 may be clear (i.e. translucent), while in other embodiments the covering 89 may be opaque.

In other embodiments, the covering 89 may be apart from the AM components $\mathbf{12}_1$-$\mathbf{12}_A$, i.e., may not be part of any AM components $\mathbf{12}_x$. For instance, the covering 89 may cover part of the skate boot 22 and/or the blade holder 24 by being applied over the skate boot 22 and/or the blade holder 24 in any suitable way. In some cases, the covering 89 may be provided as a polymeric sheet that is folded or wrapped over the skate boot 22 and/or the blade holder 24, while in other cases the covering 89 may be sprayed or injection molded around the skate boot 22 and/or the blade holder 24 to protect skate boot 22 and/or the blade holder 24 from premature wear and/or to protect graphical elements displayed by the skate boot 22 and/or the blade holder 24.

In some embodiments, also, the method of manufacture, the materials and the structure of each additively-manufactured component of the skate 10 may differ.

Although in embodiments considered above the skate 10 is designed for playing ice hockey on the skating surface 13 which is ice, in other embodiments, the skate 10 may be constructed using principles described herein for playing roller hockey or another type of hockey (e.g., field or street hockey) on the skating surface 13 which is a dry surface (e.g., a polymeric, concrete, wooden, or turf playing surface or any other dry surface on which roller hockey or field or street hockey is played). Thus, in other embodiments, instead of comprising the blade 26, the skating device 28 may comprise a set of wheels to roll on the dry skating surface 13 (i.e., the skate 10 may be an inline skate or other roller skate).

Figure 84:
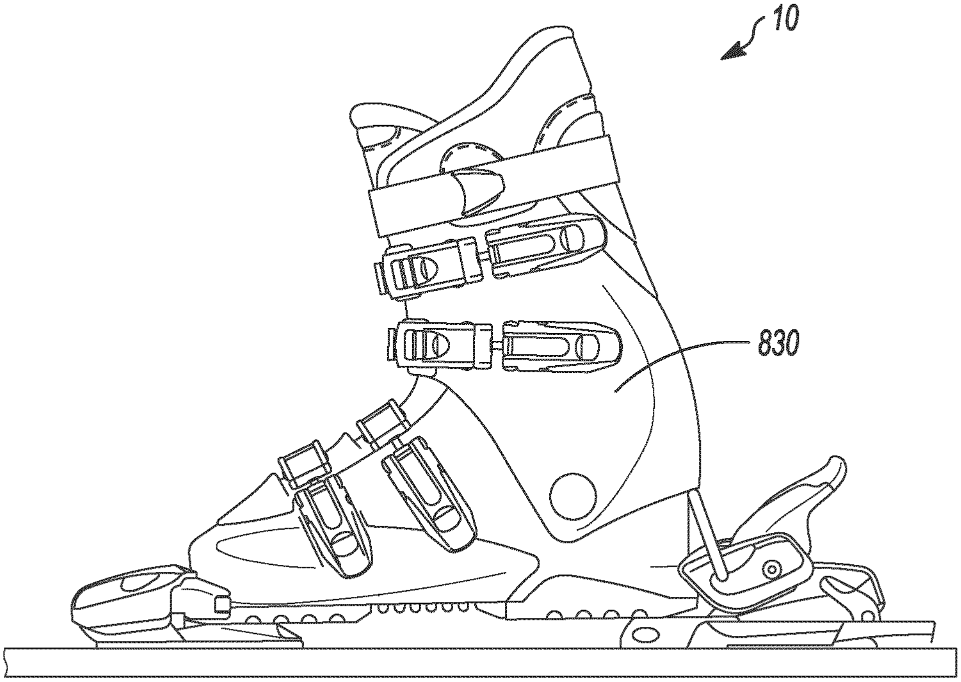
FIGS. 84 to 88 show examples of variants in which the footwear is a ski boot, a work boot, a snowboard boot, a sport cleat or a hunting boot.
Figure 85:
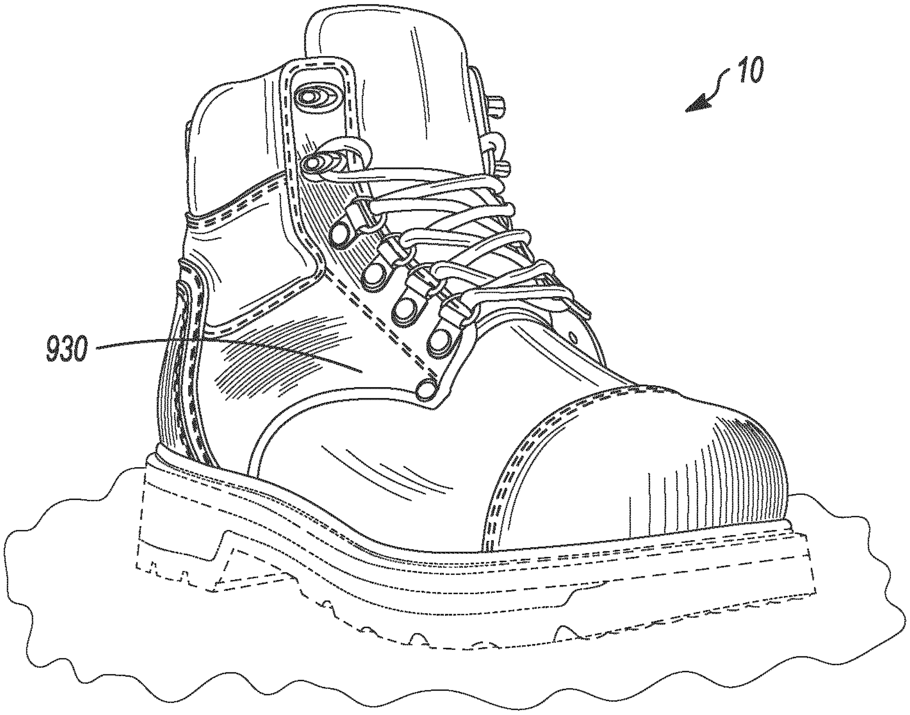
Figure 86:
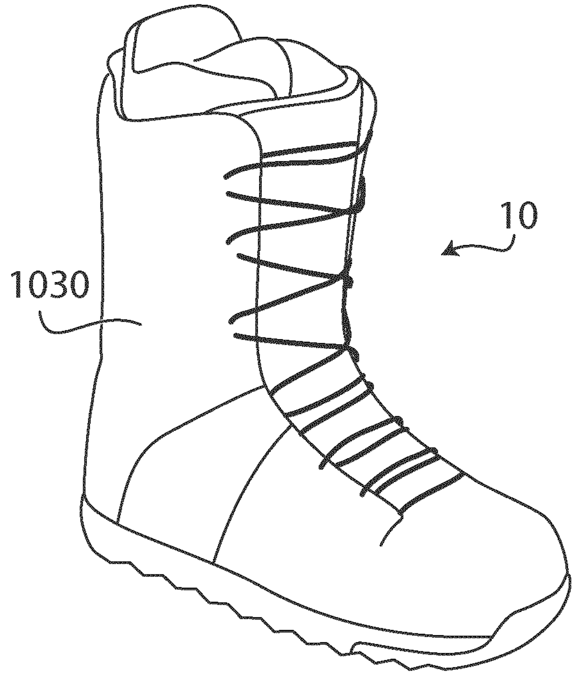
Figure 87:
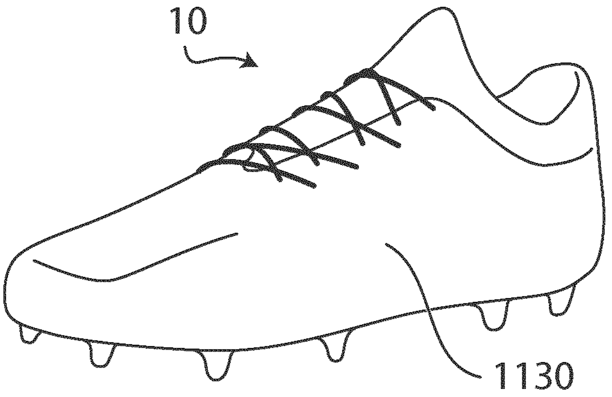
Figure 88:

Furthermore, although in embodiments considered above the footwear 10 is a skate for skating on the skating surface 13, in other embodiments, the footwear 10 may be any other suitable type of footwear. For example, as shown in FIG. 84, the footwear 10 may be a ski boot comprising a shell 830 which may be constructed in the manner described above with respect to the shell of the skate. In particular, the ski boot 10 is configured to be attachable and detachable from a ski 802 which is configured to travel on a ground surface 8 (e.g., snow). To that end, the ski boot 10 is configured to interact with an attachment mechanism 800 of the ski 802. In another example, as shown in FIG. 85, the footwear 10 may be a boot (e.g., a work boot or any other type of boot) comprising a shell 930 which can be constructed in the manner described above with respect to the shell of the skate. In another example, as shown in FIG. 86, the footwear 10 may be a snowboard boot comprising a shell 1030 which can be constructed in the manner described above with respect to the shell of the skate. In another example, as shown in FIG. 87, the footwear 10 may be a sport cleat comprising a shell 1130 which can be constructed in the manner described above with respect to the shell of the skate. In another example, as shown in FIG. 88, the footwear 10 may be a hunting boot comprising a shell 1230 which can be constructed in the manner described above with respect to the shell of the skate.

Certain additional elements that may be needed for operation of some embodiments have not been described or illustrated as they are assumed to be within the purview of those of ordinary skill in the art. Moreover, certain embodiments may be free of, may lack and/or may function without any element that is not specifically disclosed herein.

Any feature of any embodiment discussed herein may be combined with any feature of any other embodiment discussed herein in some examples of implementation.

In case of any discrepancy, inconsistency, or other difference between terms used herein and terms used in any document incorporated by reference herein, meanings of the terms used herein are to prevail and be used.

Although various embodiments and examples have been presented, this was for purposes of describing, but should not be limiting. Various modifications and enhancements will become apparent to those of ordinary skill and are within a scope of this disclosure.

The invention claimed is:

1. A skate comprising:

a skate boot configured to receive a foot of a user; and a skating device below the skate boot and configured to engage a skating surface, wherein:

the skating device comprises a blade with a body having a surface for engaging the skating surface and a connector portion that interfaces with a blade holder for connecting the blade to the skate boot;

the skate comprises a first additively-manufactured component comprising a plurality of distinct layers structurally different from one another and layered on one another;

a first one of the distinct layers is an outer zone of a shell of the skate boot that is configured to face at least one of a medial side and a lateral side of the user's foot and is stiffer than a second one of the distinct layers which is an inner zone of the shell of the skate boot that is disposed inwardly of the outer zone of the shell of the skate boot; and a second additively-manufactured component that forms an entirety of a material of the body of the blade and defines internal cells within the body of the blade.

2. The skate of claim 1, wherein the skate boot comprises at least part of the first additively-manufactured component.

3. The skate of claim 1, wherein: the skate is an ice skate and the skating surface is an ice surface.

4. The skate of claim 1, wherein the blade holder is a third additively-manufactured component.

5. The skate of claim 1, wherein the distinct layers of the first additively-manufactured component differ in stiffness.

6. The skate of claim 1, wherein the distinct layers of the first additively-manufactured component differ in resilience.

7. The skate of claim 1, wherein the distinct layers of the first additively-manufactured component include at least three distinct layers.

8. The skate of claim 1, wherein the first additively-manufactured component comprises a lattice.

9. The skate of claim 8, wherein the lattice comprises the distinct layers.

10. The skate of claim 9, wherein a density of the lattice in a first one of the distinct layers of the lattice is greater than the density of the lattice in a second one of the distinct layers of the lattice.

11. The skate of claim 9, wherein a spacing of elongate members of the lattice in a first one of the distinct layers of the lattice is less than the spacing of elongate members of the lattice in a second one of the distinct layers of the lattice.

12. The skate of claim 9, wherein elongate members of the lattice in a first one of the distinct layers of the lattice are cross-sectionally larger than elongate members of the lattice in a second one of the distinct layers of the lattice.

13. The skate of claim 9, wherein an orientation of elongate members of the lattice in a first one of the distinct layers of the lattice is different from the orientation of elongate members of the lattice in a second one of the distinct layers of the lattice.

14. The skate of claim 9, wherein a material composition of the lattice in a first one of the distinct layers of the lattice is different from the material composition of the lattice in a second one of the distinct layers of the lattice.

15. The skate of claim 8, wherein the first additively-manufactured component comprises a non-lattice member connected to the lattice.

16. The skate of claim 15, wherein the non-lattice member is configured to be positioned between the lattice and the user when the skate is worn.

17. The skate of claim 15, wherein the non-lattice member is thinner than the lattice.

18. The skate of claim 15, wherein the non-lattice member is a covering that covers at least part of the lattice and constitutes at least part of a surface of the first additively-manufactured component.

19. The skate of claim 1, wherein: the skate boot comprises a body and a pad configured to be disposed between the body of the skate boot and the user's foot; and the pad comprises at least part of the first additively-manufactured component.

20. The skate of claim 19, wherein the pad is an ankle pad configured to face an ankle of the user.

21. The skate of claim 1, wherein: the skate boot comprises a body and a liner disposed within the body of the skate boot; and the liner comprises at least part of the first additively-manufactured component.

22. The skate of claim 1, wherein: the skate boot comprises a body and a footbed disposed within the body of the skate boot; and the footbed comprises at least part of the first additively-manufactured component.

23. The skate of claim 1, wherein: the skate is an ice skate; the skating surface is an ice surface; and the second additively-manufactured component comprises a non-lattice member that constitutes an ice-contacting surface of the blade.

24. The skate of claim 1, wherein the first or second additively-manufactured component comprises fiber-reinforced composite material.

25. The skate of claim 24, wherein the fiber-reinforced composite material of the first or second additively-manufactured component is 3D-printed using continuous-fiber 3D printing.

26. The skate of claim 24, wherein at least one fiber of the fiber-reinforced composite material of the first or second additively-manufactured component extends along at least a majority of a length of the first or second additively-manufactured component.

27. The skate of claim 24, wherein at least one fiber of the fiber-reinforced composite material of the first or second additively-manufactured component extends along an entirety of a length of the first or second additively-manufactured component.

28. The skate of claim 1, wherein the second additively-manufactured component comprises 3D-printed metallic material constituting at least an ice-contacting surface of the blade.

29. A skate comprising:

a skate boot configured to receive a foot of a user; and a skating device below the skate boot and configured to engage a skating surface, the skating device comprising a blade with a body having a surface for engaging the skating surface and a connector portion that interfaces with a blade holder for connecting the blade to the skate boot;

wherein the skate comprises:

a first additively-manufactured component comprising a lattice having a plurality of distinct zones structurally different from one another, wherein:

a first one of the distinct zones is located where more force is applied during a skating stride compared to a second one of the distinct zones;

the first one of the distinct zones is stiffer than the second one of the distinct zones;

the first one of the distinct zones is a shell portion of the skate boot that is configured to face at least one of a medial side, a lateral side, and a plantar surface of the user's foot; and the second one of the distinct zones is a portion of a tendon guard of the skate boot that is configured to face at least part of an Achilles tendon of the user; and a second additively-manufactured component that forms an entirety of a material of the body of the blade and defines internal cells within the body of the blade.

30. The skate of claim 29, comprising a covering that covers at least a majority of an outer side of the lattice.

31. A skate comprising:

a skate boot configured to receive a foot of a user; and a skating device below the skate boot and configured to engage a skating surface, the skating device comprising a blade with a body having a surface for engaging the skating surface and a connector portion that interfaces with a blade holder for connecting the blade to the skate boot;

wherein the skate comprises:

a first additively-manufactured component comprising a lattice having a plurality of distinct zones structurally different from one another, wherein:

a first one of the distinct zones is located where more power transfer is desired during a skating stride compared to a second one of the distinct zones where more comfort is desired during the skating stride;

the first one of the distinct zones is stiffer than the second one of the distinct zones;

the first one of the distinct zones is a sole portion of the skate boot that is configured to face a plantar surface of the user's foot; and the second one of the distinct zones is an upper portion of the skate boot that is above the sole portion of the skate boot and configured to face an ankle of the user; and a second additively-manufactured component that forms an entirety of a material of the body of the blade and defines internal cells within the body of the blade.

32. The skate of claim 31, comprising an inner liner adjacent to the lattice.

33. A skate comprising:

a skate boot configured to receive a foot of a user; and a skating device below the skate boot and configured to engage a skating surface, the skating device comprising a blade with a body having a surface for engaging the skating surface and a connector portion that interfaces with a blade holder for connecting the blade to the skate boot;

wherein the skate comprises:

a first additively-manufactured component comprising a lattice having a plurality of distinct zones structurally different from one another, wherein:

a first one of the distinct zones is stiffer than a second one of the distinct zones;

the first one of the distinct zones is a toe portion of the skate boot that is configured to enclose toes of the user's foot; and the second one of the distinct zones is an upper portion of the skate boot that is above the toe portion of the skate boot and configured to face an ankle of the user; and a second additively-manufactured component that forms an entirety of a material of the body of the blade and defines internal cells within the body of the blade.

* * * * *